US009315728B2

(12) United States Patent
Hirai

(10) Patent No.: US 9,315,728 B2
(45) Date of Patent: Apr. 19, 2016

(54) POLYMERIZABLE LIQUID CRYSTAL COMPOSITION AND HOMOGENEOUS-ALIGNED LIQUID CRYSTAL FILM

(75) Inventor: Yoshiharu Hirai, Chiba (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 959 days.

(21) Appl. No.: 12/654,106

(22) Filed: Dec. 10, 2009

(65) Prior Publication Data
US 2010/0143612 A1 Jun. 10, 2010

(30) Foreign Application Priority Data

Dec. 10, 2008 (JP) ................. 2008-314826
Mar. 24, 2009 (JP) ................. 2009-072228
Oct. 20, 2009 (JP) ................. 2009-241359

(51) Int. Cl.
C09K 19/00 (2006.01)
C09K 19/32 (2006.01)
C09K 19/20 (2006.01)
C09K 19/28 (2006.01)
C09K 19/04 (2006.01)

(52) U.S. Cl.
CPC ............. *C09K 19/32* (2013.01); *C09K 19/20* (2013.01); *C09K 19/28* (2013.01); *C09K 2019/0444* (2013.01); *C09K 2019/0448* (2013.01); *Y10T 428/1005* (2015.01); *Y10T 428/1018* (2015.01); *Y10T 428/1023* (2015.01)

(58) Field of Classification Search
CPC ............ Y10T 428/10; Y10T 428/1005; Y10T 428/1018; Y10T 428/1023; C09K 19/20; C09K 19/28; C09K 19/32; C09K 2019/0448; C09K 2019/0444; C08G 61/02; C08G 61/10; G02F 1/133711; G02F 1/133723; G02F 2001/133726

USPC ............ 428/1.1, 1.2, 1.25, 1.26; 252/299.01, 252/299.61, 299.62, 299.64, 299.65; 560/56, 76
See application file for complete search history.

(56) References Cited

U.S. PATENT DOCUMENTS

2003/0207208 A1* 11/2003 Uenishi ................ 430/272.1
2004/0222403 A1 11/2004 Sasada et al.
2006/0222784 A1 10/2006 Saigusa et al.
2006/0278851 A1 12/2006 Ito et al.

FOREIGN PATENT DOCUMENTS

JP 2002-372623 12/2002
JP 2006-111571 4/2006
JP 2006-285014 10/2006

OTHER PUBLICATIONS

Machine English translation of JP 2006-111571, May 15, 2012.*
Abstract of JP 2006307150 published Nov. 9, 2006.
Abstract of JP 2004231638 published Aug. 19, 2004.
Abstract of JP 2007016213 published Jan. 25, 2007.

* cited by examiner

*Primary Examiner* — Ruiyun Zhang
(74) *Attorney, Agent, or Firm* — Wenderoth, Lind & Ponack, L.L.P.

(57) ABSTRACT

A polymerizable liquid crystal composition is provided that can exhibit a uniform homogeneous alignment by coating the composition on a supporting substrate having been subjected to an alignment treatment. The polymerizable liquid crystal composition contains a mixture of polymerizable compounds containing a compound selected from a group of compounds represented by the formula (1-1) as a component A and a compound selected from a group of compounds represented by the formula (2-1) as a component B as essential components, and optionally containing a compound selected from a group of compounds represented by the formulae (3-1) to (3-3) as a component C and/or a compound selected from a group of compounds represented by the formula (4-1) as a component D, and contains at least one nonionic surfactant as a component E. Examples of each of the components are shown in the disclosure.

17 Claims, 1 Drawing Sheet

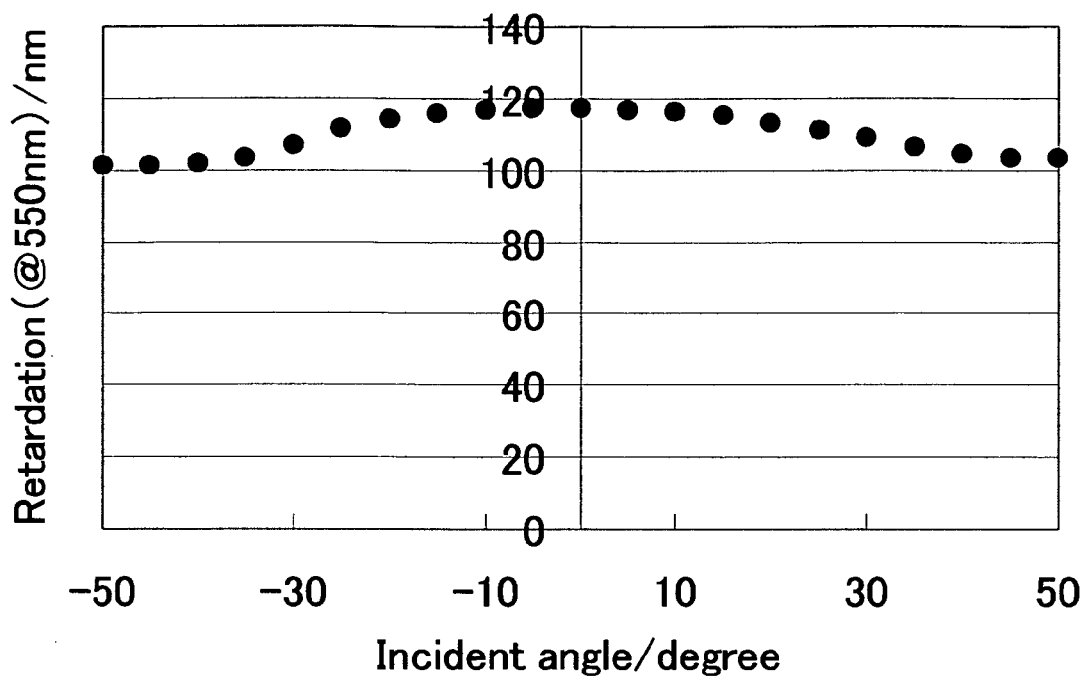

POLYMERIZABLE LIQUID CRYSTAL COMPOSITION AND HOMOGENEOUS-ALIGNED LIQUID CRYSTAL FILM

This application claims priority to Japanese Application Nos. JP 2008-314826, JP 2009-72228 and JP 2009-241359, filed Dec. 10, 2008, Mar. 24, 2009, and Oct. 20, 2009, respectively.

FIELD OF THE INVENTION

The present invention relates to a polymerizable liquid crystal composition containing a polymerizable triptycene derivative, a homogenous-aligned liquid crystal film obtained from the composition, use thereof and the like.

BACKGROUND OF THE INVENTION

A polymer having such a function as optical compensation can be obtained by polymerizing a polymerizable compound having a liquid crystal phase. The function is exhibited by fixing the alignment of the liquid crystal molecules through polymerization. Several polymerizable compounds are developed for utilizing such the function of polymerizable compound. However, the function may not be sufficiently exhibited with only one kind of polymerizable compound. Accordingly, such attempts have been made that a composition is prepared with plural kinds of polymerizable compounds, and the composition is polymerized to provide a polymer (see JP-A-2006-307150 and JP-A-2004-231638).

In this specification, the fact that a liquid crystal skeleton has an alignment state, such as a homogeneous alignment, a tilted alignment, a homeotropic alignment, a twisted alignment or the like may be referred to as "having a homogeneous alignment", "having a tilted alignment", "having a homeotropic alignment", "having a twisted alignment" or the like, respectively. For example, a liquid crystal film having a homogeneous molecular alignment, i.e., a homogeneous-aligned liquid crystal film, may be referred to as a liquid crystal film having a homogeneous alignment.

A polymer having a homogeneous alignment can be used in combination, for example, with a ½ wavelength plate, a ¼ wavelength plate or a film having another optical function (see JP-A-2002-372623).

In the aforementioned use, there are case where the polymerizable liquid crystal material is laminated on a glass substrate, a glass substrate which is coated on the surface thereof with a plastic thin film (such as an overcoated film formed on a color filter), a color filter substrate (see JP-A-2006-285014) or a plastic substrate. Examples of a material used as the plastic substrate include such polymers as TAC (triacetyl cellulose), polycarbonate, PET (polyethylene terephthalate) and a cycloolefin resin.

The inventors have found a polymerizable liquid crystal composition that can stably maintain a liquid crystal phase at room temperature and shows uniform alignment property (see JP-A-2007-16213). However, the composition may sometimes be difficult to control the optical characteristics thereof, particularly birefringence (Δn), and thus leave room for improvement. As a method for controlling birefringence, utilization of a compound having an aromatic ring in the short axis direction of mesogen (a compound having a triptycene ring) has been proposed, but it is still difficult to control birefringence by the proposal (see JP-A-2006-111571).

SUMMARY OF THE INVENTION

An object of the invention is to provide a polymerizable liquid crystal composition that is capable of forming a uniform homogeneous alignment by coating on a supporting substrate having been subjected to an alignment treatment, such as a transparent plastic film, a color filter and glass. Another object of the invention is to provide a liquid crystal layer, that is controlled in alignment, being comprised of the polymerizable liquid crystal composition, a liquid crystal film obtained by polymerising the polymerizable liquid crystal composition, and an optically compensation film containing the liquid crystal film. Still another object of the invention is to provide an image display device, such as a liquid crystal display device, an organic EL display device and a plasma display device (PDP), containing the optically compensation film.

The inventors have found that a homogeneous alignment state is stabilized, and birefringence can be effectively controlled by using a polymerizable triptycene derivative and a polymerizable compound having a bisphenol skeleton as components of a polymerizable liquid crystal composition and further combining a nonionic surfactant therewith, and thus the invention has been completed. The polymerizable triptycene derivative has at least one acryloyloxy group and can be polymerized as similar to a polymerizable liquid crystal compound. A polymer obtained from the polymerizable liquid crystal composition exhibits a uniform homogeneous alignment by coating on a supporting substrate having been subjected to a mechanical surface treatment, such as rubbing, or a chemical surface treatment.

BRIEF DESCRIPTION OF THE DRAWING

FIG. 1 is a diagram showing measurement results of retardation of a liquid crystal film of Example 1.

DETAILED DESCRIPTION OF THE INVENTION

The terms used in this specification will be explained. The term "liquid crystal compound" is a generic term for a compound having a liquid crystal phase and a compound having no liquid crystal phase but being useful as a component of a liquid crystal composition. The term "liquid crystal phase" means a nematic phase, a smectic phase, a cholesteric phase and the like, and means a nematic phase in many cases. The term "polymerizability" means a capability of providing a polymer through polymerization of a monomer by means of light, heat, a catalyst or the like. A compound represented by the formula (1-1) may be referred to as a compound (1-1). Compounds represented by the other formulae may be referred in the similar manner. The term "arbitrary" used upon defining the chemical structural formulae means that not only the position but also the number may be arbitrarily determined. The term "(meth)acrylic acid" is a generic term for acrylic acid and methacrylic acid. The term "(meth)acrylate" is a generic term for acrylate and methacrylate. The term "(meth)acryloyloxy" is a generic term for acryloyloxy and methacryloyloxy. In the chemical structural formulae, a group represented by a symbol containing a letter (such as "A") surrounded by a hexagon means a group having a ring structure (ring A).

The invention includes embodiments shown in the items [1] to [17] below.

[1] A polymerizable liquid crystal composition containing a mixture of polymerizable compounds containing at least one compound selected from a group of compounds represented by the formula (1-1) as a component A and at least one compound selected from a group of compounds represented by the formula (2-1) as a component B, and optionally containing at least one compound selected from a group of compounds represented by the formulae (3-1) to (3-3) as a component C and/or at least one compound selected from a group of compounds represented by the formula (4-1) as a component D, and at least one nonionic surfactant as a component E:

$Z^3$ independently represents hydrogen, fluorine, methyl or trifluoromethyl; $W^3$ independently represents hydrogen, halogen, alkyl having from 1 to 3 carbon atoms or fluoroalkyl having from 1 to 3 carbon atoms; $W^{31}$ independently repre-

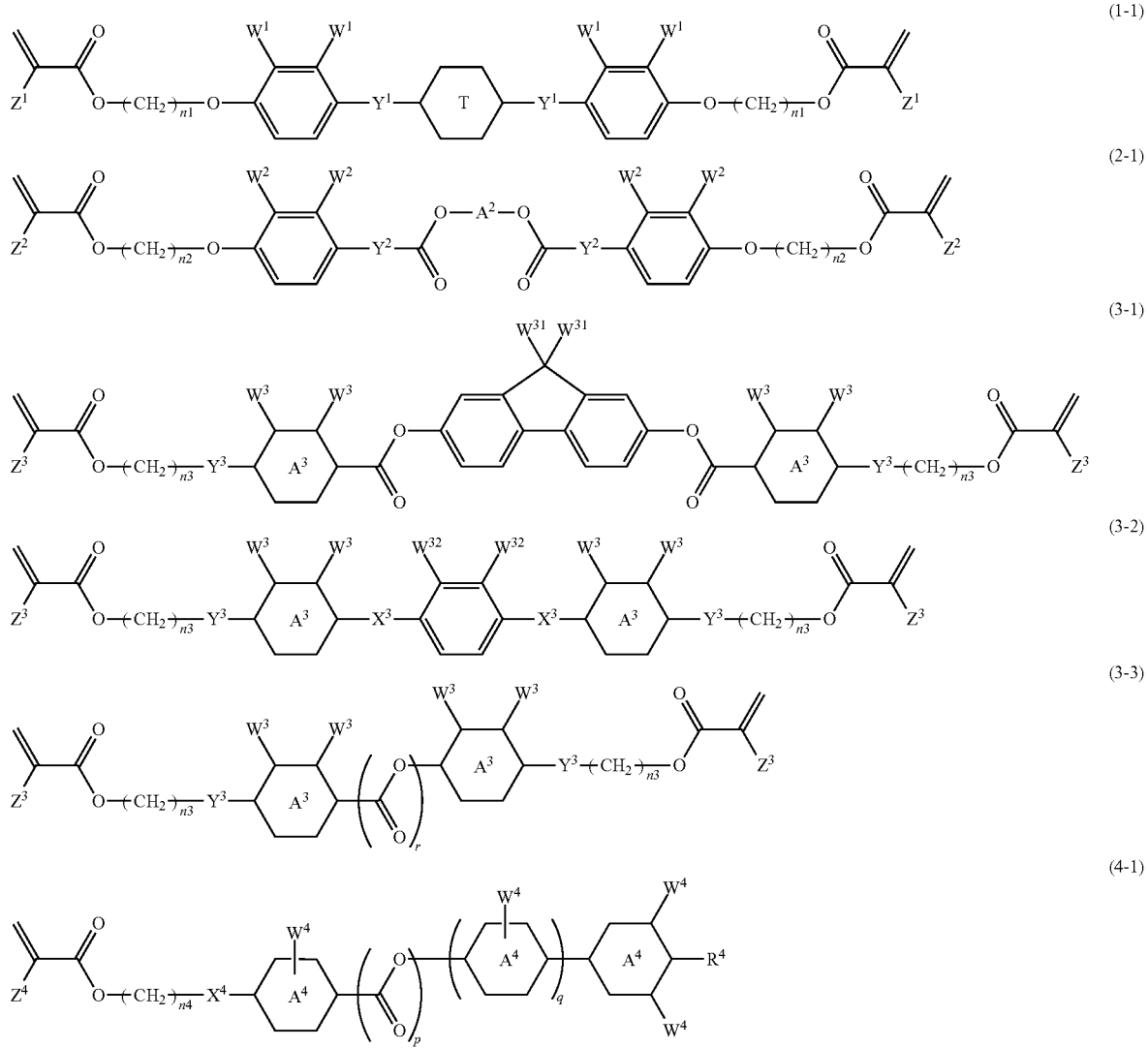

wherein
in the formula (1-1),
ring T represents triptycen-1,4-diyl; $Z^1$ independently represents hydrogen, fluorine, chlorine, methyl or trifluoromethyl; $W^1$ independently represents hydrogen, halogen, alkyl having from 1 to 3 carbon atoms or fluoroalkyl having from 1 to 3 carbon atoms; $Y^1$ independently represents a single bond, —COO—, —OCO—, —CH=CH—COO—, —OCO—CH=CH—, —(CH$_2$)$_2$—COO— or —OCO—(CH$_2$)$_2$—; and n1 independently represents an integer of from 2 to 15, in the formula (2-1),
$Z^2$ independently represents hydrogen, fluorine, methyl or trifluoromethyl; $W^2$ independently represents hydrogen, halogen, alkyl having from 1 to 3 carbon atoms or fluoroalkyl having from 1 to 3 carbon atoms; $Y^2$ independently represents a single bond, —CH=CH— or —(CH$_2$)$_2$—; and n2 independently represents an integer of from 2 to 15, in the formulae (3-1) to (3-3), sents hydrogen, halogen, alkyl having from 1 to 3 carbon atoms or fluoroalkyl having from 1 to 3 carbon atoms; $W^{32}$ independently represents hydrogen, halogen, alkyl having from 1 to 8 carbon atoms or fluoroalkyl having from 1 to 8 carbon atoms; ring $A^3$ independently represents 1,4-phenylene or 1,4-cyclohexylene; $X^3$ independently represents a single bond, —COO—, —OCO—, —CH=CH—COO—, —OCO—CH=CH—, —(CH$_2$)$_2$—COO—, —OCO—(CH$_2$)$_2$—, —(CH$_2$)$_2$—CH$_2$O— or —OCH$_2$—; $Y^3$ independently represents a single bond, alkylene having from 1 to 20 carbon atoms, —O—, —COO—, —OCO— or —OCOO—; r represents 0 or 1; and n3 independently represents an integer of from 0 to 20, provided that when n3 is 0, $Y^3$ represents a single bond or alkylene having from 1 to 20 carbon atoms, in the formula (4-1),
$Z^4$ represents hydrogen, fluorine, methyl or trifluoromethyl; $W^4$ independently represents hydrogen, halogen, alkyl having from 1 to 3 carbon atoms or fluoroalkyl having from 1 to 3 carbon atoms; $X^4$ represents a single bond, —O—, alkylene having from 1 to 20 carbon atoms, —COO— or —OCO—; ring $A^4$ independently represents 1,4-phenylene or 1,4-cyclohexylene; $R^4$ represents hydrogen, fluorine, chlorine, cyano, alkyl having from 1 to 20 carbon atoms or alkoxy having from 1 to 20 carbon atoms, in which in the alkyl and the alkoxy, arbitrary hydrogen may be replaced by halogen; n4 represents an integer of from 0 to 20; and p and q each independently represent 0 or 1, provided that when n4 is 0, $X^4$ represents a single bond or alkylene having from 1 to 20 carbon atoms, and in the formula (2-1), $A^2$ represents a divalent group represented by one of the formulae (A2-1) to (A2-19):

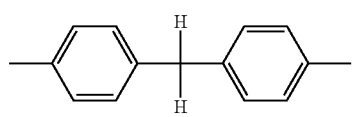 (A2-1)

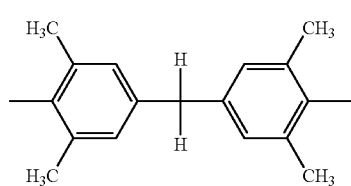 (A2-2)

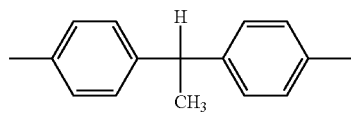 (A2-3)

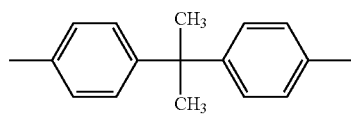 (A2-4)

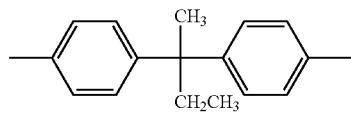 (A2-5)

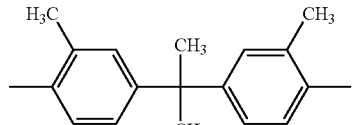 (A2-6)

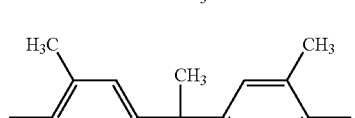 (A2-7)

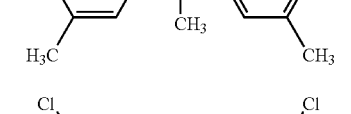 (A2-8)

-continued

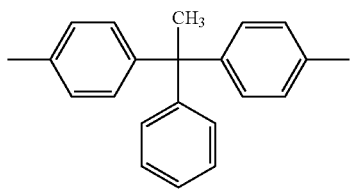 (A2-9)

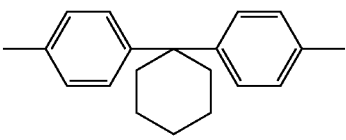 (A2-10)

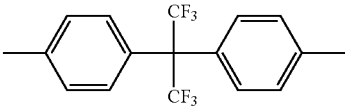 (A2-11)

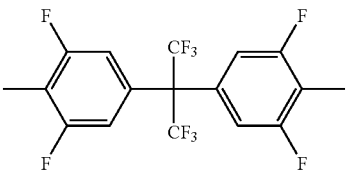 (A2-12)

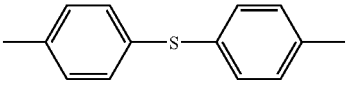 (A2-13)

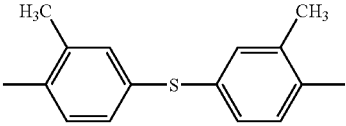 (A2-14)

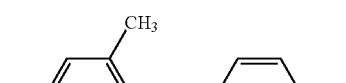 (A2-15)

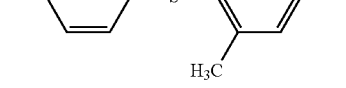 (A2-16)

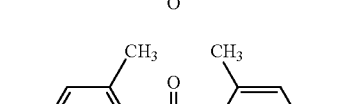 (A2-17)

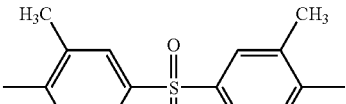 (A2-18)

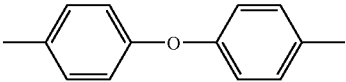 (A2-19)

[2] The polymerizable liquid crystal composition according to the item [1], wherein:

in the formula (1-1), ring T represents triptycen-1,4-diyl; $Z^1$ independently represents hydrogen, fluorine, methyl or trifluoromethyl; $W^1$ independently represents hydrogen, fluorine, methyl or trifluoromethyl; $Y^1$ independently represents —COO—, —OCO—, —CH═CH—COO—, —OCO—CH═CH—, —(CH$_2$)$_2$—COO— or —OCO—(CH$_2$)$_2$—; and n1 independently represents an integer of from 2 to 10, in the formula (2-1), $A^2$ represents a divalent group represented by one of the formulae (A2-1) to (A2-18); $Z^2$ independently represents hydrogen, fluorine, methyl or trifluoromethyl; $W^2$ independently represents hydrogen or fluorine; $Y^2$ independently represents a single bond, —CH═CH— or —(CH$_2$)$_2$—; and n2 independently represents an integer of from 2 to 10, in the formulae (3-1) to (3-3), $Z^3$ independently represents hydrogen, fluorine, methyl or trifluoromethyl; $W^3$ independently represents hydrogen, fluorine, methyl or trifluoromethyl; $W^{31}$ independently represents hydrogen, methyl or ethyl; $W^{32}$ independently represents hydrogen, methyl, isopropyl, tert-butyl or trifluoromethyl; ring $A^3$ independently represents 1,4-phenylene or 1,4-cyclohexylene; $X^3$ independently represents a single bond, —COO—, —OCO—, —CH═CH—COO—, —OCO—CH═CH—, —(CH$_2$)$_2$—COO— or —OCO—(CH$_2$)$_2$—; $Y^3$ independently represents a single bond, —O—, —COO—, —OCO— or —OCOO—; r represents 0 or 1; and n3 independently represents an integer of from 2 to 12, in the formula (4-1), $Z^4$ represents hydrogen, fluorine, methyl or trifluoromethyl; $W^4$ independently represents hydrogen, fluorine, methyl or trifluoromethyl; $X^4$ represents a single bond or —O—; ring $A^4$ represents 1,4-phenylene or 1,4-cyclohexylene; $R^4$ represents cyano, fluorine, alkyl having from 1 to 10 carbon atoms or alkoxy having from 1 to 10 carbon atoms, in which in the alkyl and the alkoxy, arbitrary hydrogen may be replaced by halogen; n4 represents an integer of from 2 to 12; and p and q each independently represent 0 or 1, the nonionic surfactant is a fluorine nonionic surfactant, a silicone nonionic surfactant or a hydrocarbon nonionic surfactant, a ratio of the component A is from 10 to 60% by weight, a ratio of the component B is from 1 to 20% by weight, a ratio of the component C is from 0 to 89% by weight, and a ratio of the component D is from 0 to 89% by weight, based on a total weight of the mixture of polymerizable compounds, and a ratio of the component E is from 0.0001 to 0.03 in terms of weight ratio based on the mixture.

[3] The polymerizable liquid crystal composition according to the item [1], wherein:

in the formula (1-1), ring T represents triptycen-1,4-diyl; $Z^1$ independently represents hydrogen, fluorine, methyl or trifluoromethyl; $W^1$ independently represents hydrogen or fluorine; $Y^1$ independently represents —COO— or —OCO—; and n1 independently represents an integer of from 2 to 8, in the formula (2-1), $A^2$ represents a divalent group represented by one of the formulae (A2-1) to (A2-18); $Z^2$ independently represents hydrogen or methyl; $W^2$ independently represents hydrogen or fluorine; $Y^2$ independently represents a single bond, —CH═CH— or —(CH$_2$)$_2$—; and n2 independently represents an integer of from 2 to 8, in the formulae (3-1) to (3-3), $Z^3$ independently represents hydrogen or methyl; $W^3$ independently represents hydrogen, fluorine, methyl or trifluoromethyl; $W^{31}$ independently represents hydrogen or methyl; $W^{32}$ independently represents hydrogen, methyl, isopropyl, tert-butyl or trifluoromethyl; ring $A^3$ independently represents 1,4-phenylene or 1,4-cyclohexylene; $X^3$ independently represents —COO—, —OCO—, —CH═CH—COO—, —OCO—CH═CH—, —(CH$_2$)$_2$—COO— or —OCO—(CH$_2$)$_2$—; $Y^3$ independently represents a single bond, —O—, —COO—, —OCO— or —OCOO—; r represents 0 or 1; and n3 independently represents an integer of from 2 to 12, in the formula (4-1), $Z^4$ represents hydrogen or methyl; $W^4$ independently represents hydrogen, fluorine, methyl or trifluoromethyl; $X^4$ represents a single bond or —O—; ring $A^4$ represents 1,4-phenylene or 1,4-cyclohexylene; $R^4$ represents cyano, fluorine, alkyl having from 1 to 8 carbon atoms or alkoxy having from 1 to 8 carbon atoms, in which in the alkyl and the alkoxy, arbitrary hydrogen may be replaced by halogen; n4 represents an integer of from 2 to 12; and p and q each independently represent 0 or 1, the nonionic surfactant is a fluorine nonionic surfactant, a silicone nonionic surfactant or a hydrocarbon nonionic surfactant, a ratio of the component A is from 15 to 55% by weight, a ratio of the component B is from 1 to 17% by weight, a ratio of the component C is from 0 to 84% by weight, and a ratio of the component D is from 0 to 84% by weight, based on a total weight of the mixture of polymerizable compounds, and a ratio of the component E is from 0.0003 to 0.02 in terms of weight ratio based on the mixture.

[4] The polymerizable liquid crystal composition according to the item [1], wherein:

in the formula (1-1), ring T represents triptycen-1,4-diyl; $Z^1$ represents hydrogen; $W^1$ independently represents hydrogen or fluorine; $Y^1$ independently represents —COO— or —OCO—; and n1 independently represents an integer of from 4 to 6, in the formula (2-1), $A^2$ represents a divalent group represented by one of the formulae (A2-1), (A2-4), (A2-10), (A2-11) and (A2-16); $Z^2$ represents hydrogen; $W^2$ independently represents hydrogen or fluorine; $Y^2$ independently represents a single bond, —CH═CH— or —(CH$_2$)$_2$—; and n2 independently represents an integer of from 4 to 6, in the formulae (3-1) to (3-3), $Z^3$ represents hydrogen; $W^3$ independently represents hydrogen, fluorine or methyl; $W^{31}$ independently represents hydrogen or methyl; $W^{32}$ represents hydrogen, methyl, isopropyl, tert-butyl or trifluoromethyl; ring $A^3$ represents 1,4-phenylene; $X^3$ independently represents —COO—, —OCO—, —CH═CH—COO—, —OCO—CH═CH—, —(CH$_2$)$_2$—COO— or —OCO—(CH$_2$)$_2$—; $Y^3$ independently represents a single bond or —O—; r represents 0 or 1; and n3 independently represents an integer of from 2 to 12, in the formula (4-1), $Z^4$ represents hydrogen; $W^4$ represents hydrogen; $X^4$ represents a single bond or —O—; ring $A^4$ represents 1,4-phenylene or 1,4-cyclohexylene; $R^4$ represents cyano, fluorine, alkyl having from 1 to 8 carbon atoms or alkoxy having from 1 to 8 carbon atoms; n4 represents an integer of from 2 to 10; and p and q each independently represent 0 or 1, the nonionic surfactant is a fluorine nonionic surfactant or a silicone nonionic surfactant, a ratio of the component A is from 20 to 50% by weight, a ratio of the component B is from 1 to 15% by weight, a ratio of the component C is from 0 to 79% by weight, and a ratio of the component D is from 0 to 79% by weight, based on a total weight of the mixture of polymerizable compounds, and a ratio of the component E is from 0.0005 to 0.02 in terms of weight ratio based on the mixture.

[5] The polymerizable liquid crystal composition according to the item [4], wherein:

a ratio of the component A is from 25 to 45% by weight, a ratio of the component B is from 1 to 13% by weight, a ratio of the component C is from 0 to 74% by weight, and a ratio of the component D is from 0 to 74% by weight, based on a total weight of the mixture of polymerizable compounds, and a ratio of the component E is from 0.0005 to 0.01 in terms of weight ratio based on the mixture.

[6] A polymerizable liquid crystal layer having a homogeneous alignment containing the polymerizable liquid crystal composition according to one of the items [1] to [5] having been coated on a supporting substrate having been subjected to an alignment treatment.

[7] The polymerizable liquid crystal layer according to the item [6], wherein the supporting substrate is a glass substrate.

[8] The polymerizable liquid crystal layer according to the item [6], wherein the supporting substrate is a glass substrate having coated thereon a plastic thin film, or a plastic film substrate.

[9] The polymerizable liquid crystal layer according to the item [6], wherein the supporting substrate is a glass substrate having coated thereon a plastic thin film having a surface subjected to a rubbing treatment, or a plastic film substrate having a surface subjected to a rubbing treatment.

[10] The polymerizable liquid crystal layer according to the item [6], wherein the supporting substrate is a glass substrate having coated thereon a plastic thin film, or a plastic film substrate, and a surface of the substrate is subjected to a corona treatment or a plasma treatment, and is further subjected to a rubbing treatment.

[11] The polymerizable liquid crystal layer according to one of the items [8] to [10], wherein a plastic material constituting the plastic thin film or the plastic film is one selected from polyimide, polyamideimide, polyamide, polyetherimide, polyetheretherketone, polyetherketone, polyketonesulfide, polyethersulfone, polysulfone, polyphenylene sulfide, polyphenylene oxide, polyethylene terephthalate, polybutylene terephthalate, polyethylene naphthalate, polyacetal, polycarbonate, polyarylate, an acrylic resin, polyvinyl alcohol, polypropylene, cellulose, triacetyl cellulose, a partially saponified product of triacetyl cellulose, an epoxy resin, a phenol resin and a cycloolefin resin.

[12] The polymerizable liquid crystal layer according to the item [11], wherein a plastic material constituting the plastic thin film or the plastic film is one selected from polyimide, polyvinyl alcohol, triacetyl cellulose, a partially saponified product of triacetyl cellulose and a cycloolefin resin.

[13] A homogeneous-aligned liquid crystal film obtained by polymerizing the polymerizable liquid crystal layer according to one of the items [6] to [12].

[14] An optical compensation device containing the liquid crystal film according to the item [13].

[15] An optical device containing the liquid crystal film according to the item [13] and a polarizing plate.

[16] A liquid crystal display device containing the optical compensation device according to the item [14] on an inner surface or an outer surface of a liquid crystal cell.

[17] A liquid crystal display device containing the optical device according to the item [15] on an outer surface of a liquid crystal cell.

The polymerizable liquid crystal composition of the invention contains the mixture of liquid crystal compounds containing the component A and the component B as essential components, and may contain the component C and/or the component D as an optional component.

The component A is at least one compound selected from a group of compounds represented by the formula (1-1).

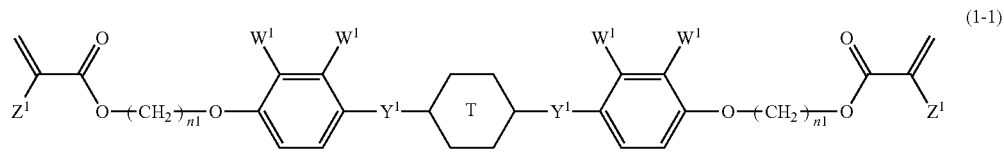

In the formula (1-1), ring T represents triptycen-1,4-diyl. $Z^1$ independently represents hydrogen, fluorine, chlorine, methyl or trifluoromethyl. Preferred examples of $Z^1$ include hydrogen, fluorine, methyl and trifluoromethyl, and the most preferred example thereof is hydrogen. $W^1$ independently represents hydrogen, halogen, alkyl having from 1 to 3 carbon atoms or fluoroalkyl having from 1 to 3 carbon atoms. Preferred examples of $W^1$ include hydrogen, fluorine, methyl and trifluoromethyl, and more preferred examples thereof include hydrogen and fluorine. The most preferred example of $W^1$ is hydrogen. $Y^1$ independently represents a single bond, —COO—, —OCO—, —CH=CH—COO—, —OCO—CH=CH—, —(CH$_2$)$_2$—COO— or —OCO—(CH$_2$)$_2$—. Preferred examples of $Y^1$ include —COO—, —OCO—, —CH=CH—COO—, —OCO—CH=CH—, —(CH$_2$)$_2$—COO— or —OCO—(CH$_2$)$_2$—, and more preferred examples thereof include —COO— and —OCO—. n1 independently represents an integer of from 2 to 15. n1 preferably represents an integer of from 2 to 10, more preferably an integer of from 2 to 8, and most preferably an integer of from 4 to 6.

The component B is at least one compound selected from a group of compounds represented by the formula (2-1).

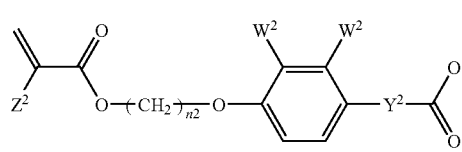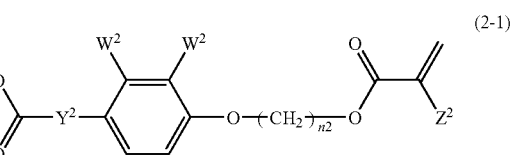
(2-1)
In the formula (2-1), $A^2$ represents a divalent group represented by one of the formulae (A2-1) to (A2-19):
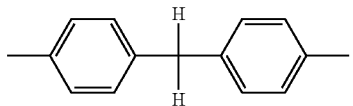 (A2-1)
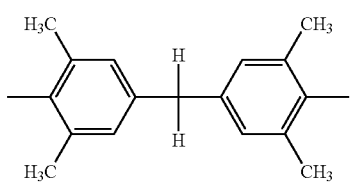 (A2-2)
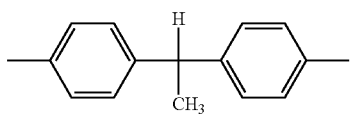 (A2-3)
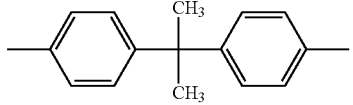 (A2-4)
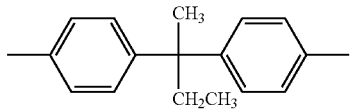 (A2-5)
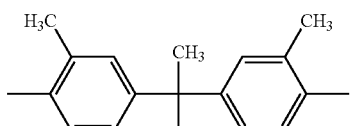 (A2-6)
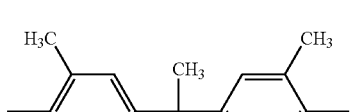 (A2-7)
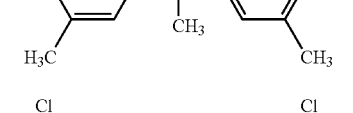 (A2-8)
-continued
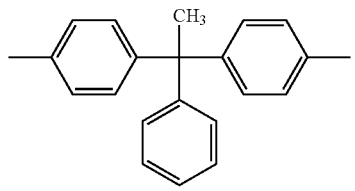 (A2-9)
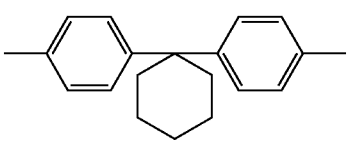 (A2-10)
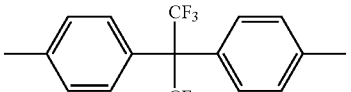 (A2-11)
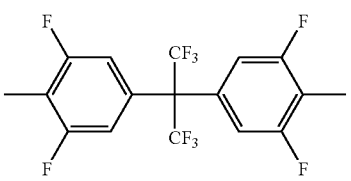 (A2-12)
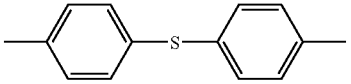 (A2-13)
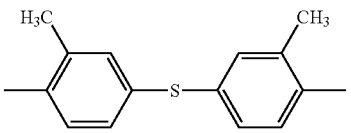 (A2-14)
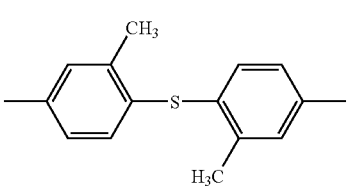 (A2-15)
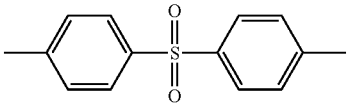 (A2-16)
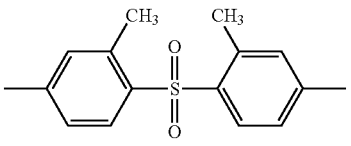 (A2-17)

-continued

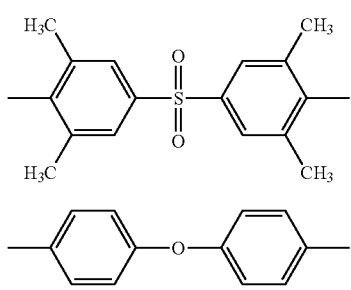

(A2-18)

(A2-19)

Preferred examples of $A^2$ include the groups represented by the formulae (A2-1) to (A2-18), and more preferred examples thereof include the groups represented by the formulae (A2-1), (A2-4), (A2-10), (A2-11) and (A2-16).

In the formula (2-1), $Z^2$ independently represents hydrogen, fluorine, methyl or trifluoromethyl. Preferred examples of $Z^2$ include hydrogen and methyl, and the most preferred example thereof is hydrogen. $W^2$ independently represents hydrogen, halogen, alkyl having from 1 to 3 carbon atoms or fluoroalkyl having from 1 to 3 carbon atoms. Preferred examples of $W^2$ include hydrogen and fluorine. $Y^2$ independently represents a single bond, —CH=CH— or —(CH$_2$)$_2$—, and preferably represents a single bond. n2 independently represents an integer of from 2 to 15. n2 preferably represents an integer of from 2 to 10, more preferably an integer of from 2 to 8, and particularly preferably an integer of from 4 to 6.

The component C is at least one compound selected from a group of compounds represented by the formulae (3-1) to (3-3).

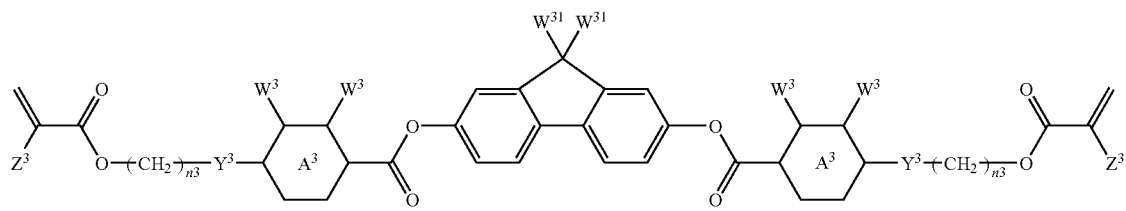

(3-1)

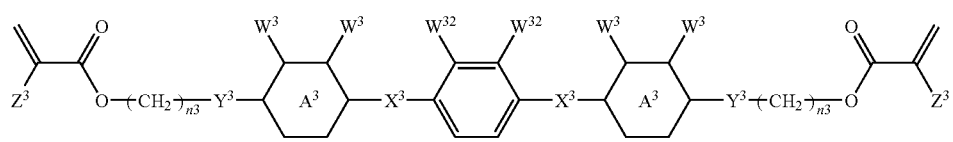

(3-2)

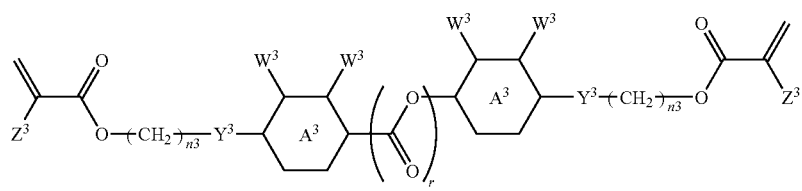

(3-3)

In the formulae (3-1) to (3-3), $Z^3$ independently represents hydrogen, fluorine, methyl or trifluoromethyl. Preferred examples of $Z^3$ include hydrogen and methyl, and the most preferred example thereof is hydrogen. $W^3$ independently represents hydrogen, halogen, alkyl having from 1 to 3 carbon atoms or fluoroalkyl having from 1 to 3 carbon atoms. Preferred examples of $W^3$ include hydrogen, fluorine, methyl and trifluoromethyl, and more preferred examples thereof include hydrogen, fluorine and methyl. $W^{31}$ independently represents hydrogen, halogen, alkyl having from 1 to 3 carbon atoms or fluoroalkyl having from 1 to 3 carbon atoms. Preferred examples of $W^{31}$ include hydrogen, methyl and ethyl, and the most preferred example thereof is methyl. $W^{32}$ independently represents hydrogen, halogen, alkyl having from 1 to 8 carbon atoms or fluoroalkyl having from 1 to 8 carbon atoms. Preferred examples of $W^{32}$ include hydrogen, methyl, isopropyl, tert-butyl and trifluoromethyl. Ring $A^3$ independently represents 1,4-phenylene or 1,4-cyclohexylene, and preferably 1,4-phenylene. $X^3$ independently represents a single bond, —COO—, —OCO—, —CH=CH—COO—, —OCO—CH=CH—, —(CH$_2$)$_2$—COO—, —OCO—(CH$_2$)$_2$—, —(CH$_2$)$_2$—, —C≡C—, —CH$_2$O— or —OCH$_2$—. Preferred examples of $X^3$ include a single bond, —COO—, —OCO—, —CH=CH—COO—, —OCO—CH=CH—, —(CH$_2$)$_2$—COO— and —OCO—(CH$_2$)$_2$—, and more preferred examples thereof include —COO—, —OCO—, —CH=CH—COO—, —OCO—CH=CH—, —(CH$_2$)$_2$—COO— and —OCO—(CH$_2$)$_2$—. $Y^3$ independently represents a single bond, alkylene having from 1 to 20 carbon atoms, —O—, —COO—, —OCO— or —OCOO—. Preferred examples of $Y^3$ include a single bond, —O—, —COO—, —OCO— and —OCOO—, and more preferred examples thereof include a single bond and —O—. represents 0 or 1. n3 independently represents an integer of from 0 to 20. n3 preferably represents an integer of from 2 to 12. And, when n3 is 0, $Y^3$ represents a single bond or alkylene having from 1 to 20 carbon atoms.

The component D is at least one compound selected from a group of compounds represented by the formula (4-1).

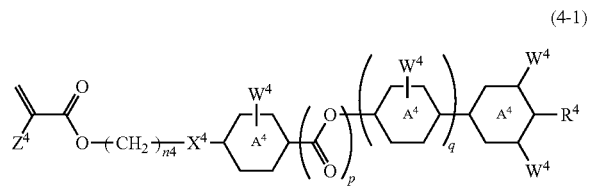

(4-1)

In the formula (4-1), $Z^4$ represents hydrogen, fluorine, methyl or trifluoromethyl. Preferred examples of $Z^4$ include hydrogen and methyl, and the most preferred example thereof is hydrogen. $W^4$ independently represents hydrogen, halogen, alkyl having from 1 to 3 carbon atoms or fluoroalkyl having from 1 to 3 carbon atoms. Preferred examples of $W^4$ include hydrogen, fluorine, methyl and trifluoromethyl, and more preferred examples thereof include hydrogen and fluorine. $X^4$ represents a single bond, —O—, alkylene having from 1 to 20 carbon atoms, —COO— or —OCO—. Preferred examples of $X^4$ include a single bond and —O—. Ring $A^4$ independently represents 1,4-phenylene or 1,4-cyclohexylene. $R^4$ represents hydrogen, fluorine, chlorine, cyano, alkyl having from 1 to 20 carbon atoms or alkoxy having from 1 to 20 carbon atoms. Preferred examples of $R^4$ include cyano, fluorine, alkyl having from 1 to 10 carbon atoms and alkoxy having from 1 to 10 carbon atoms. More preferred examples of $R^4$ include cyano, fluorine, alkyl having from 1 to 8 carbon atoms and alkoxy having from 1 to 8 carbon atoms. When $R^4$ is the alkyl or the alkoxy, arbitrary hydrogen in the group may be replaced by halogen. Preferred examples of the halogen include fluorine. n4 represents an integer of from 0 to 20. n4 preferably represents an integer of from 2 to 12, and more preferably an integer of from 2 to 10. p and q each independently represent 0 or 1.

The polymerizable liquid crystal composition of the invention contains the mixture of liquid crystal compounds containing the component A and the component B as essential components, and may contain the component C and/or the component D as an optional component, and at least one nonionic surfactant as a component E. The nonionic surfactant is preferably a fluorine nonionic surfactant, silicone nonionic surfactant or a hydrocarbon nonionic surfactant. Preferred examples of the nonionic surfactant include a fluorine nonionic surfactant and a silicone nonionic surfactant.

The polymerizable liquid crystal composition of the invention has a nematic phase at room temperature. The polymerizable liquid crystal composition of the invention exhibits a homogeneous alignment on a substrate that has a surface having been subjected to an alignment treatment, such as a rubbing treatment. Examples of the substrate include a plastic substrate, a supporting substrate having coated on the surface thereof a plastic thin film, a color filter and a glass substrate.

The characteristic features of the compounds used in the polymerizable liquid crystal composition of the invention will be described.

The compound (1-1) has a skeleton containing triptycene and having aromatic rings in the short axis direction of mesogen, and has two polymerizable groups. The compound may not exhibit liquid crystallinity. A polymer of the polymerizable compound can have a three-dimensional structure, and thus the compound provides a harder polymer than a compound having one polymerizable group. The compound has good compatibility with another liquid crystal compound to maintain liquid crystallinity upon using in a large amount, and has a function of decreasing the birefringence.

The compound (2-1) has a bisphenol skeleton and two polymerizable groups. A polymer of the polymerizable compound can have a three-dimensional structure, and thus the compound provides a harder polymer than a compound having one polymerizable group. The compound may not exhibit liquid crystallinity. The compound has a function of decreasing the melting point of the polymerizable liquid crystal composition. The use of the compound with other polymerizable liquid crystal compound provides a function of accelerating decrease of the birefringence.

The compounds (3-1) to (3-3) each have a liquid crystal skeleton and two polymerizable groups. A polymer of the polymerizable compounds can have a three-dimensional structure, and thus the compounds provide a harder polymer than a compound having one polymerizable group. The compounds are liable to exhibit a homogeneous alignment while it depends on the conditions including the supporting substrate, the additives and the like. The compounds exhibit a liquid crystal phase within a wide temperature range. In the following description, the compounds (3-1) to (3-3) may be referred to as a compound (3) as a generic term.

The compound (4-1) has a liquid crystal skeleton and one polymerizable group. The compound has a function of controlling the melting point and the birefringence of the mixture and the tilt angle of the liquid crystal molecules.

The nonionic surfactant has a function of controlling the tilt angle of the polymerizable liquid crystal composition and enhancing the coating property of the composition.

The ratios of the components in the mixture of polymerizable liquid crystal compounds used in the composition of the invention will be described.

The ratio of the component A is preferably from 10 to 60% by weight, more preferably from 15 to 55% by weight, further preferably from 20 to 50% by weight, and particularly preferably from 25 to 45% by weight.

The ratio of the component B is preferably from 1 to 20% by weight, more preferably from 1 to 17% by weight, further preferably from 1 to 15% by weight, and particularly preferably from 1 to 13% by weight.

The ratio of the component C is preferably from 0 to 89% by weight, more preferably from 0 to 84% by weight, further preferably from 0 to 79% by weight, and particularly preferably from 0 to 74% by weight.

The ratio of the component D is preferably from 0 to 89% by weight, more preferably from 0 to 84% by weight, further preferably from 0 to 79% by weight, and particularly preferably from 0 to 74% by weight.

The polymerizable liquid crystal composition of the invention contains the mixture of the components A to D and the nonionic surfactant as the component E. The ratio of the component E is preferably from 0.0001 to 0.03, more preferably from 0.0003 to 0.02, further preferably from 0.0005 to 0.02, and particularly preferably from 0.0005 to 0.01, in terms of weight ratio based on the total amount of the components A to D.

Preferred embodiments of the components of the polymerizable liquid crystal composition of the invention have been described. The items (2) to (5) above are examples of combinations of the preferred embodiments.

The polymerizable liquid crystal composition of the invention may contain other polymerizable compound that is different from the compound (1-1), the compound (2-1), the compounds (3-1) to (3-3) and the compound (4-1). The composition may contain an additive, such as a polymerization initiator and a photosensitizer that are suitable for polymerization reaction. The composition may contain an additive, such as an ultraviolet ray absorbent, an antioxidant, a radical scavenger and a light stabilizer, for enhancing the characteristics of the polymer. The composition may contain a coupling agent for enhancing the adhesion to a substrate. However, upon adding a coupling agent, the kind and amount thereof are determined to prevent the homogeneous alignment from being hindered. For example, the amount of a coupling agent added is preferably not more than 0.01 in terms of weight ratio based on the total amount of the components A to D. The composition may be used after dissolving in an organic solvent for forming a coated film (paint film) having a uniform thickness.

The amount of the other polymerizable compound added is generally from 0 to 0.20, and preferably from 0 to 0.10, in terms of weight ratio based on the total amount of the components A to D. When additives such as a polymerization initiator and a coupling agent are used, the amount of the additives used may be a minimum amount in which a purpose thereof can be attained.

The compounds used in the invention can be synthesized by appropriately combining the synthesis methods in organic chemistry described, for example, in: Houben-Wyle, Methoden der Organischen Chemie, Georg Thieme Valag, Stuttgart; Organic Reactions, John Wiley & Sons, Inc.; Organic Syntheses, John Wiley & Sons, Inc.; Comprehensive Organic Synthesis, Pergamon Press; and New Experimental Chemistry Course (Shin Jikken Kagaku Kouza), Maruzen, Inc.

A synthesis method of the compound (1-1) is disclosed in JP-A-2006-111571. Ring T in the formula (1-1) is a triptycene ring shown below, which can be produced, for example, by the method disclosed in P. D. Bartlett, et al., J. Am, Chem. Soc., vol. 64, p. 2649 (1942).

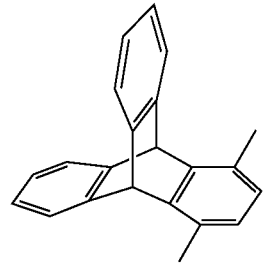 [SMILES: Cc1ccc(C)c2c1C1c3ccccc3C2c2ccccc21]

A synthesis method of the compound (2-1) is disclosed in JP-A-2007-16213 and JP-A-2008-133344.

A synthesis method of the compound (3-1) is disclosed in JP-A-2003-238491 and WO 2008/136265. A synthesis method of the compound (3-2) is disclosed in Makromol. Chem., vol. 190, pp. 2255-2268 (1989), WO 97/00600 and the like. In a method for introducing α-fluoroacryloyloxy ($CH_2$=CF—COO—), α-fluoroacrylic acid or α-fluoroacrylic acid chloride may be used, and a method of acting α-fluoroacrylic acid fluoride ($CH_2$=CFCOOF) can be advantageously employed. A synthesis method of α-fluoroacrylic acid fluoride is disclosed in J. Org. Chem., vol. 54, p. 5640 (1989), JP-A-60-158137, JP-A-61-85345 and the like, and α-fluoroacrylic acid fluoride can be synthesized according to the method. The compounds (3-1) and (3-2) can be synthesized from these compounds as starting materials. A synthesis method of the compound (3-3) is disclosed in JP-A-2004-137281, JP-A-1-271402, WO 2008/61606 and the like.

A synthesis method of the compound (4-1) is disclosed in Macromolecules, vol. 26, pp. 6132-6134 (1993), Makromol. Chem., vol. 183, pp. 2311-2321 (1982), JP-A-2005-187618, JP-A-7-53961, WO 97/34862, EP 1626079, JP-A-2005-179557 and the like.

Examples of the component compounds will be described.
Preferred examples of the compound (1-1) include the following compounds.

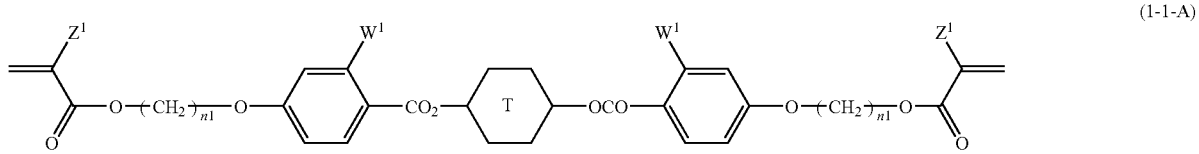

(1-1-A)

-continued
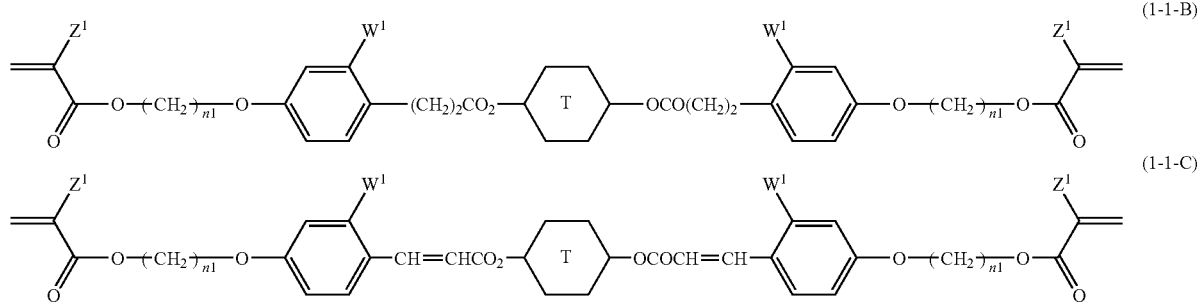
In the formulae (1-1-A) to (1-1-C), $Z^1$ represents hydrogen, fluorine, chlorine, methyl or trifluoromethyl; $W^1$ represents hydrogen or fluorine; and n1 represents an integer of from 2 to 15.
Preferred examples of the compound (2-1) include the following compounds.
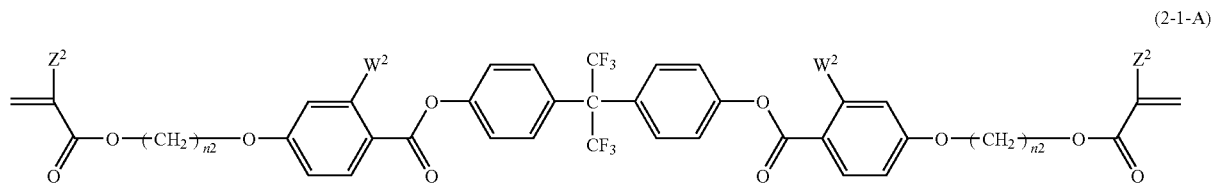
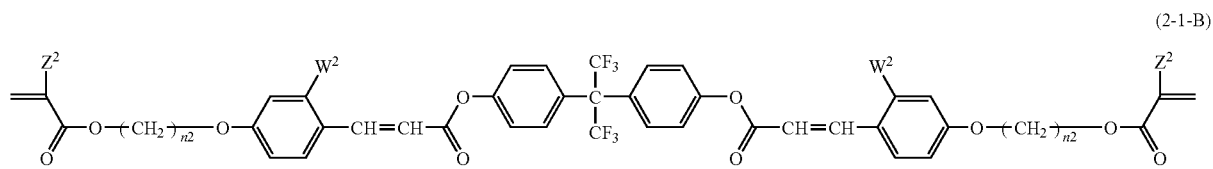
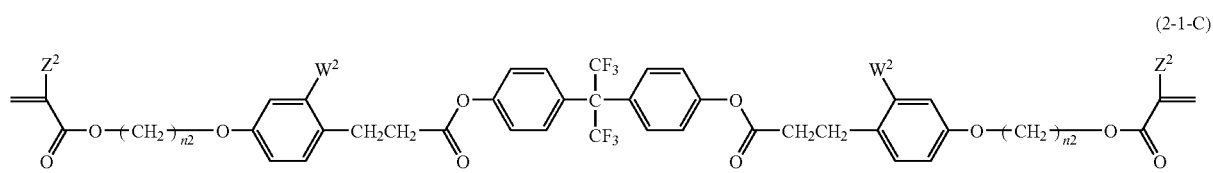
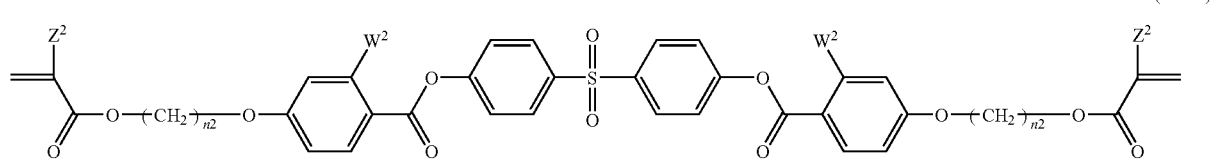
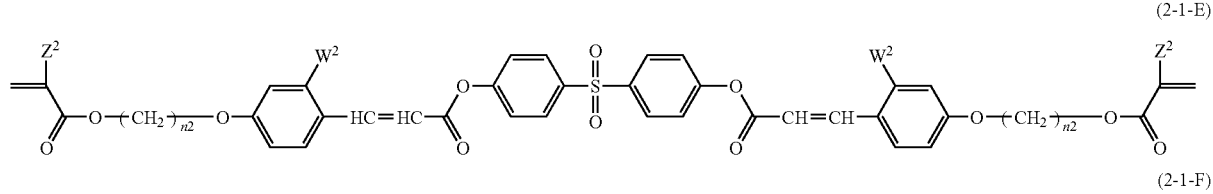
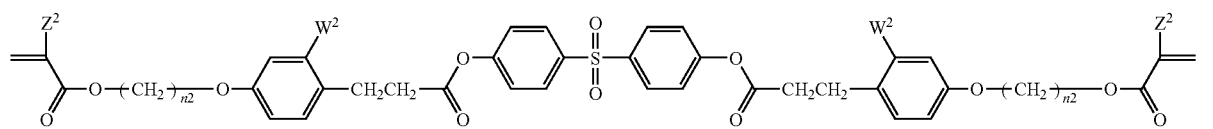

(2-1-G)
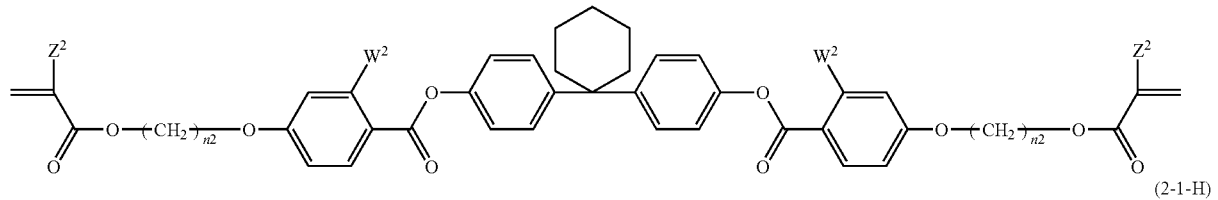
(2-1-H)
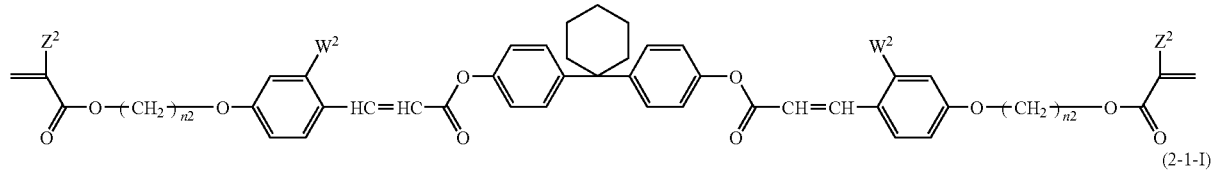
(2-1-I)
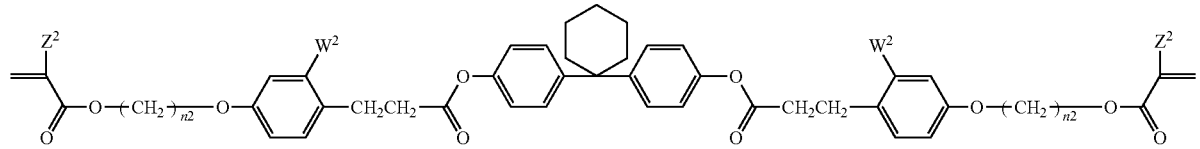
In the formulae (2-1-A) to (2-1-I), $Z^2$ represents hydrogen, fluorine, methyl or trifluoromethyl; $W^2$ represents hydrogen or fluorine; and n2 represents an integer of from 2 to 15.
Preferred examples of the compound (3-1) include the following compounds.
(3-1-A)
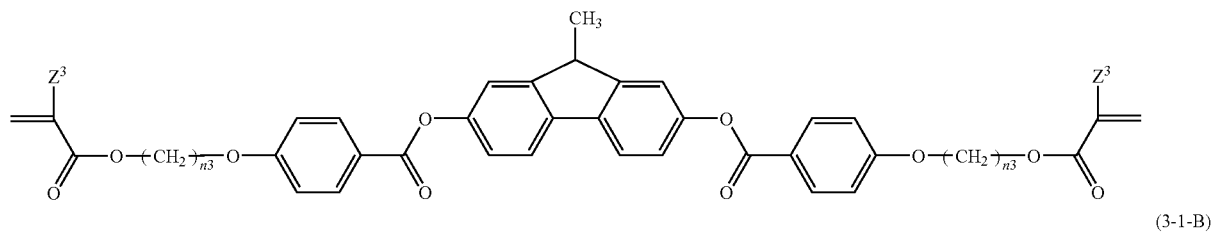
(3-1-B)
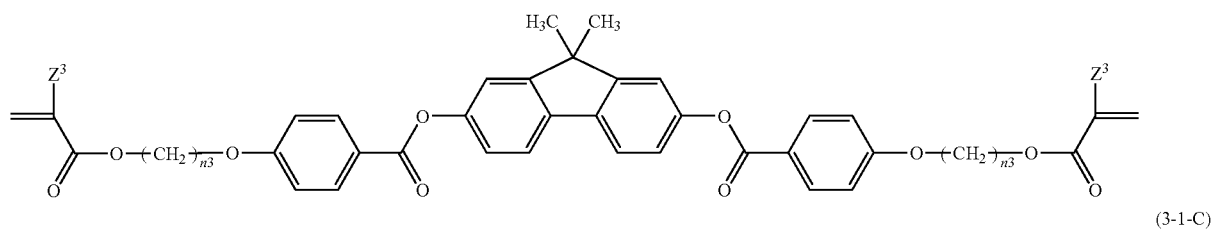
(3-1-C)
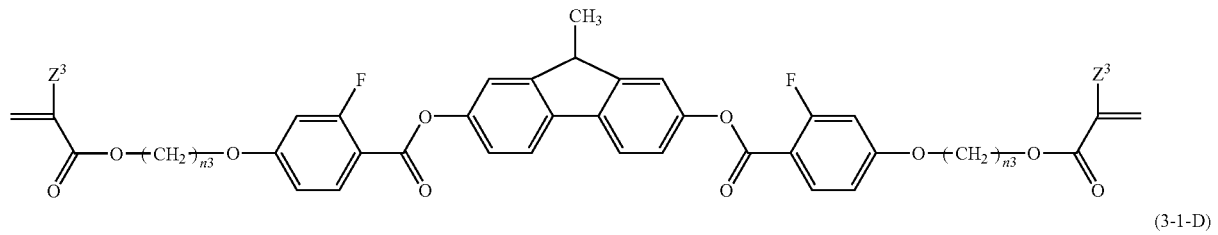
(3-1-D)
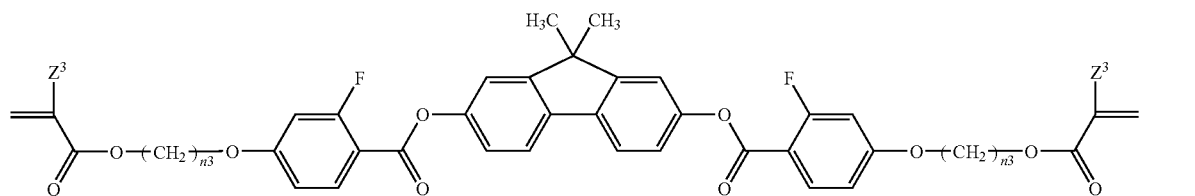

-continued
(3-1-E)
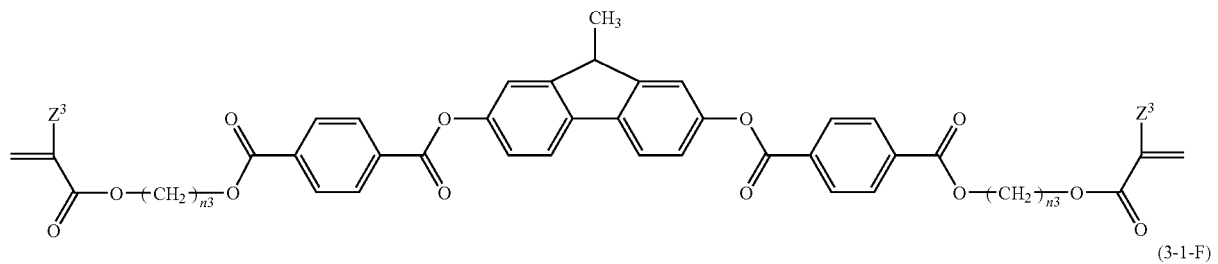
(3-1-F)
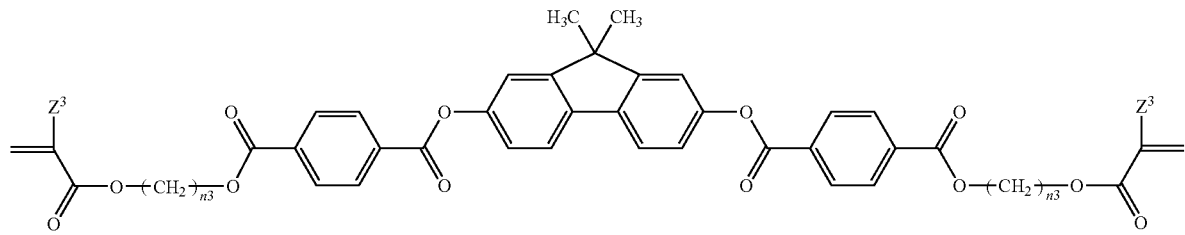
Preferred examples of the compound (3-2) include the following compounds.
(3-2-A)
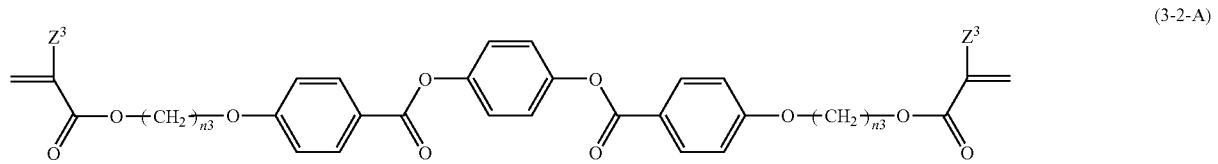
(3-2-B)
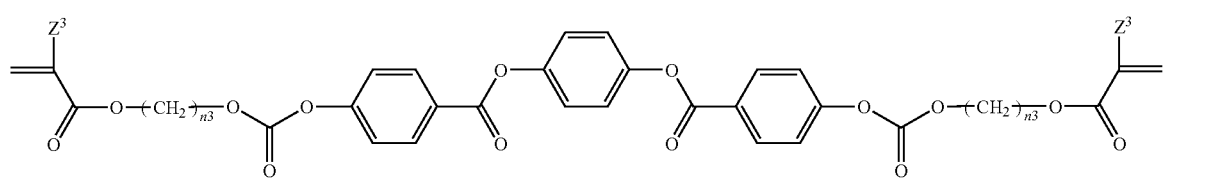
(3-2-C)
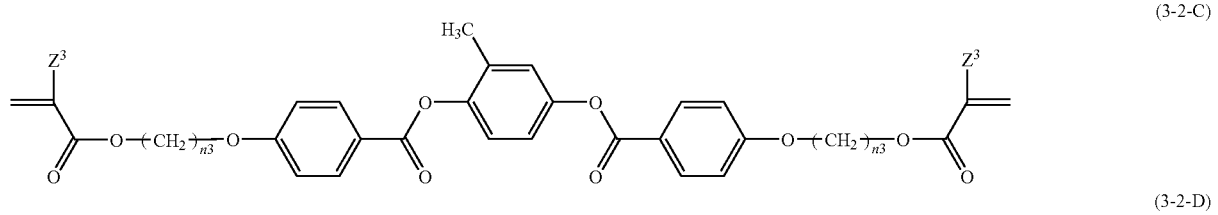
(3-2-D)
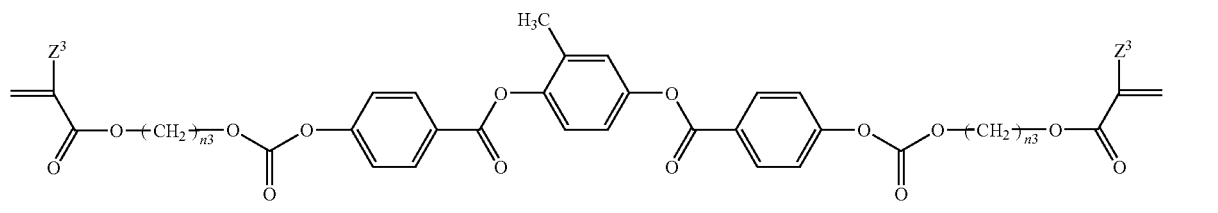
(3-2-E)
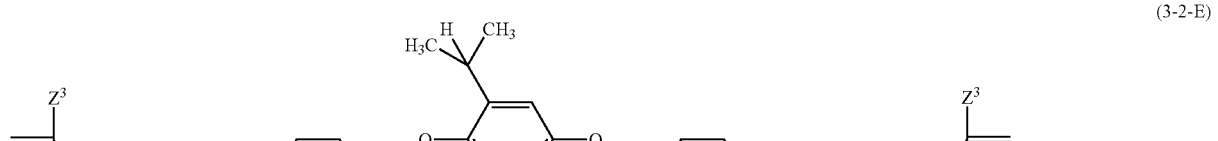
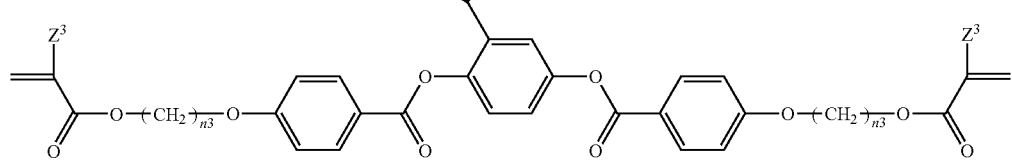

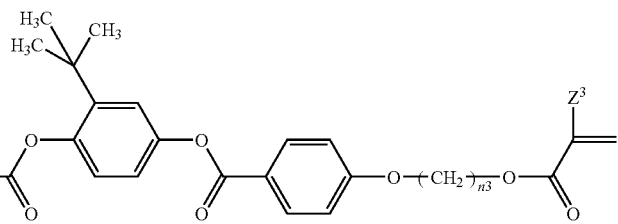
(3-2-F)
Preferred examples of the compound (3-3) include the following compounds.
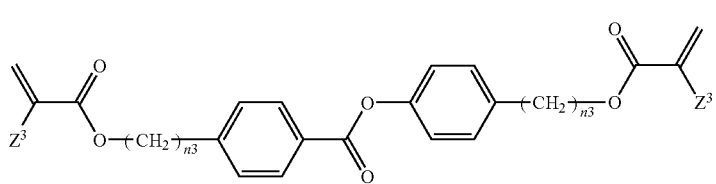
(3-3-A)
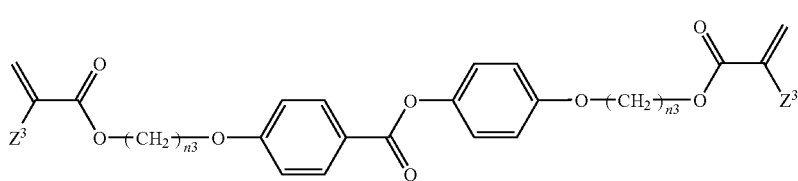
(3-3-B)
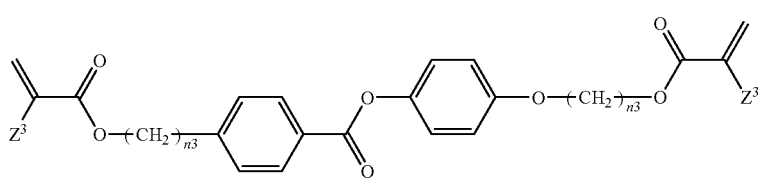
(3-3-C)
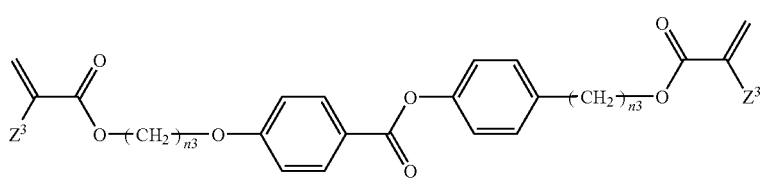
(3-3-D)
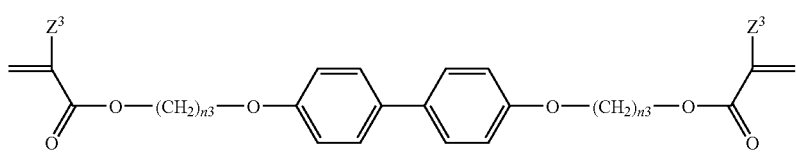
(3-3-E)
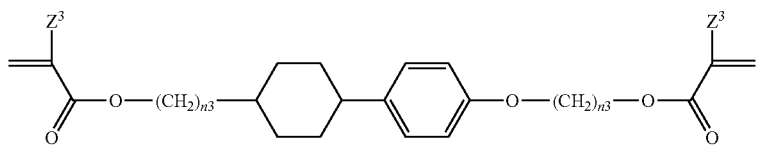
(3-3-F)
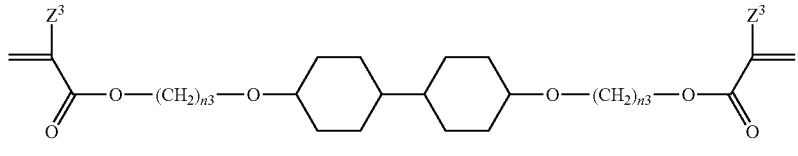
(3-3-G)

(3-3-H)
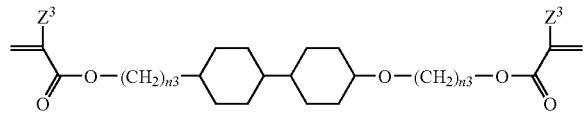
(3-3-I)
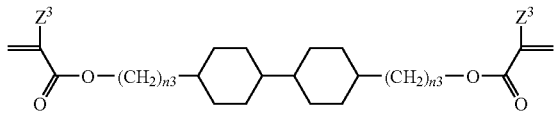
In the formulae (3-1-A) to (3-1-F), (3-2-A) to (3-2-D), and (3-3-A) to (3-3-I), $Z^3$ independently represents hydrogen, fluorine, methyl or trifluoromethyl; and n3 represents an integer of from 2 to 12.
Preferred examples of the compound (4-1) include the following compounds.
(4-1-A)
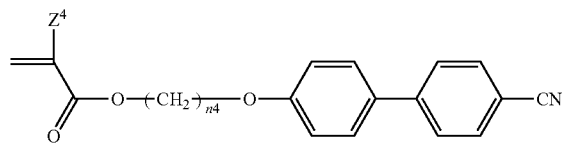
(4-1-B)
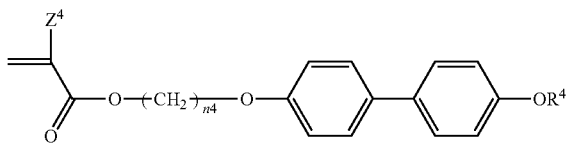
(4-1-C)
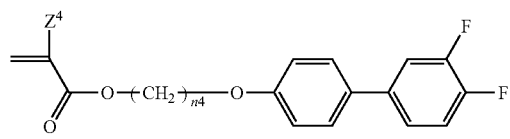
(4-1-D)
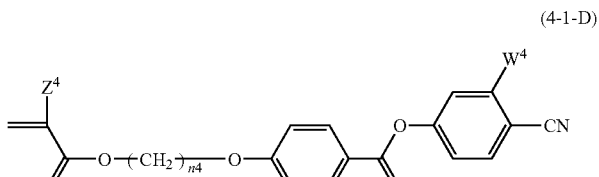
(4-1-E)
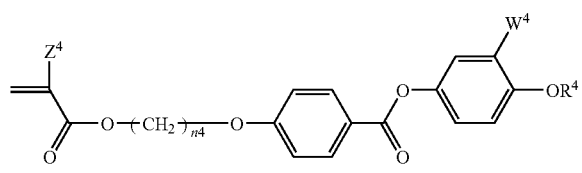
(4-1-F)
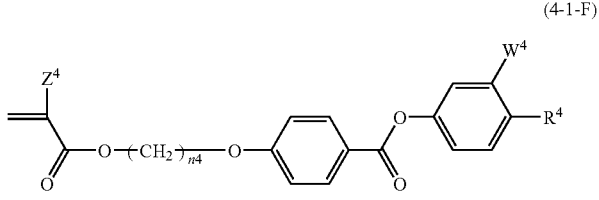
(4-1-G)
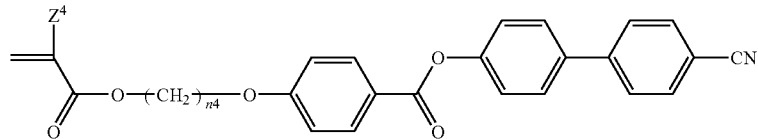
(4-1-H)
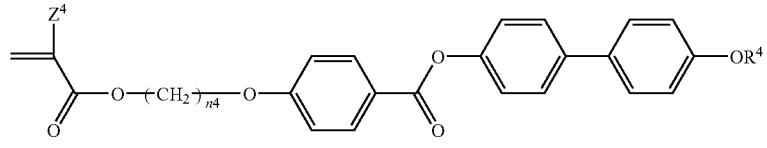
(4-1-I)
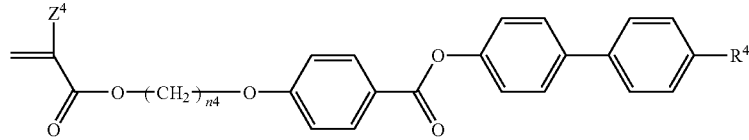
(4-1-J)
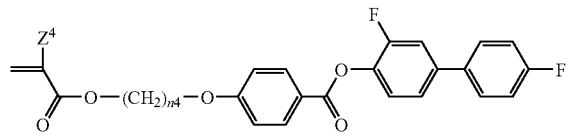
(4-1-K)
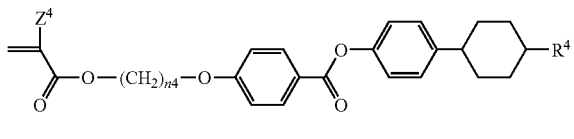

-continued
(4-1-L) 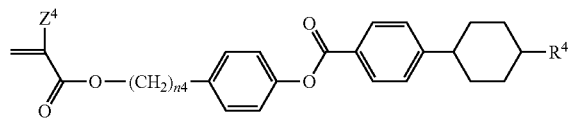
(4-1-M) 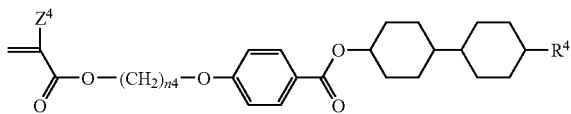
(4-1-N) (4-1-O)
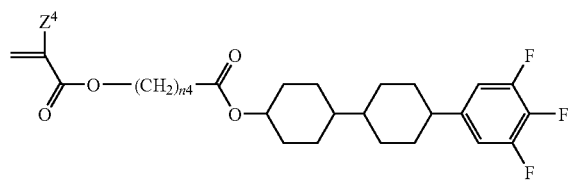
(4-1-P) (4-1-Q)
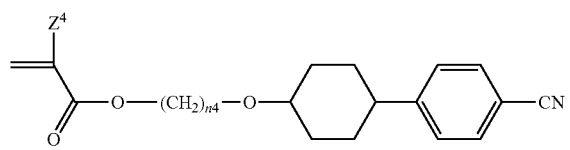
(4-1-R) (4-1-S)
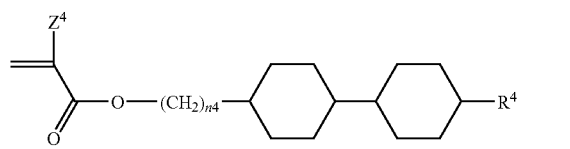
(4-1-T) (4-1-U)
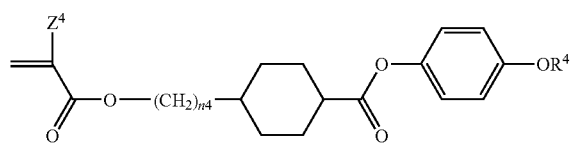
(4-1-V)
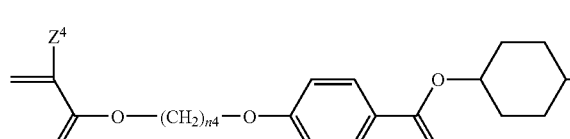
In the formulae (4-1-A) to (4-1-V), $Z^4$ represents hydrogen, fluorine, methyl or trifluoromethyl; $W^4$ represents hydrogen or fluorine; $R^4$ represents alkyl having from 1 to 20 carbon atoms or —$CF_3$; and n4 represents an integer of from 2 to 20.
Specific examples of the compound (1-1), the compound (2-1), the compounds (3-1) to (3-3) and the compound (4-1) are shown below.
(1-1-A1)
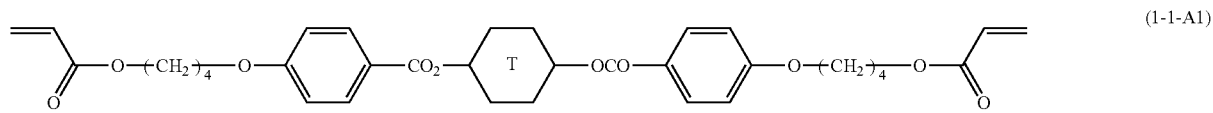

-continued
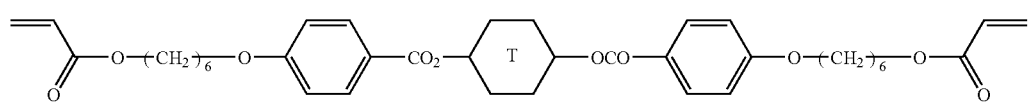
(1-1-A2)
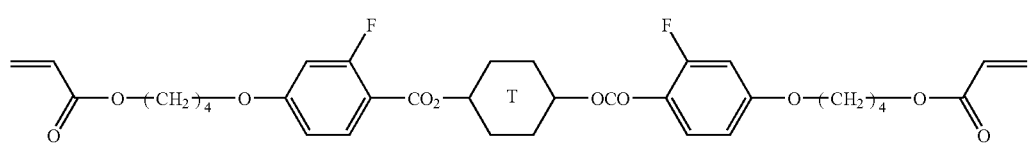
(1-1-A3)
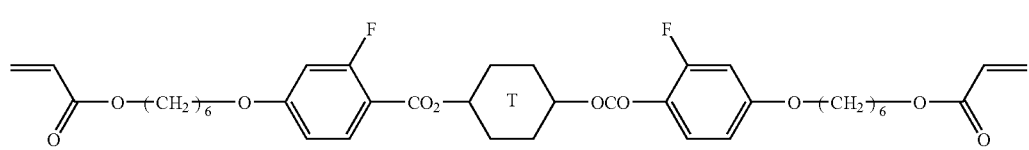
(1-1-A4)
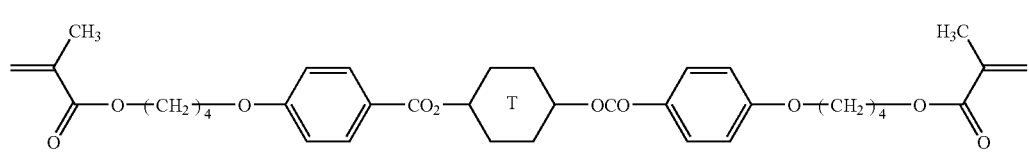
(1-1-A5)
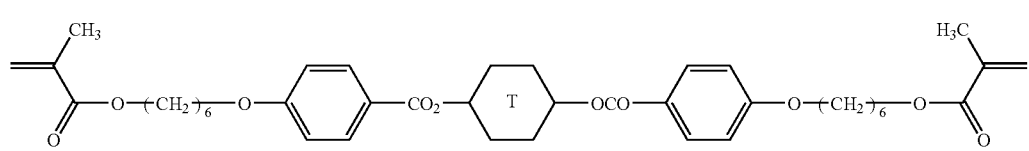
(1-1-A6)
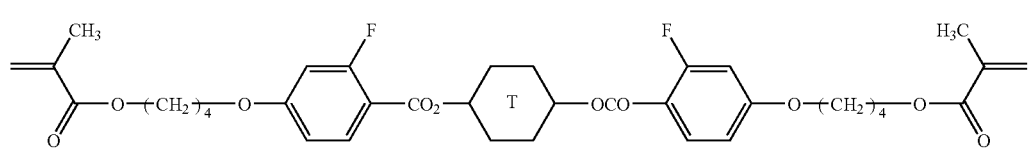
(1-1-A7)
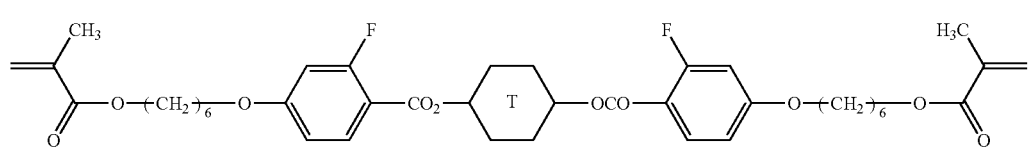
(1-1-A8)
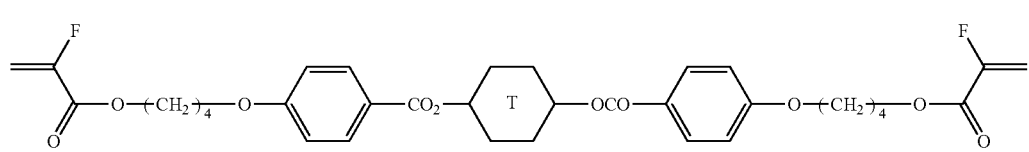
(1-1-A9)
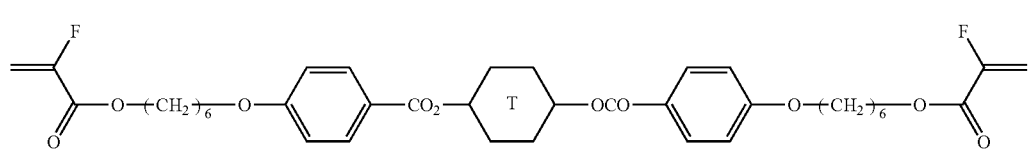
(1-1-A10)
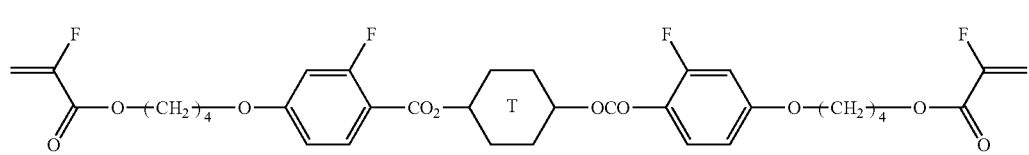
(1-1-A11)
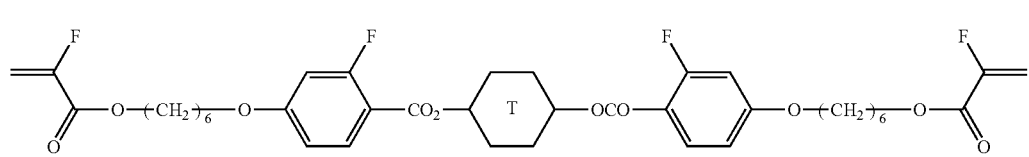
(1-1-A12)

-continued
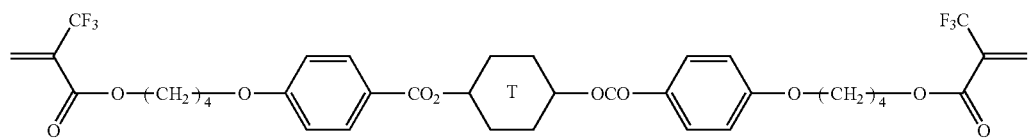
(1-1-A13)
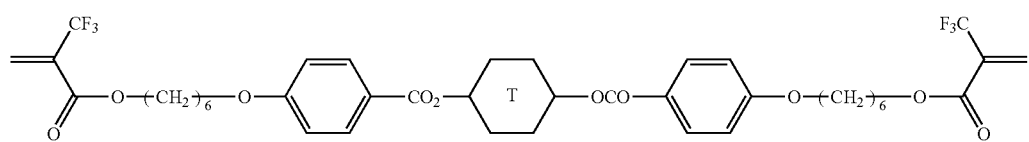
(1-1-A14)
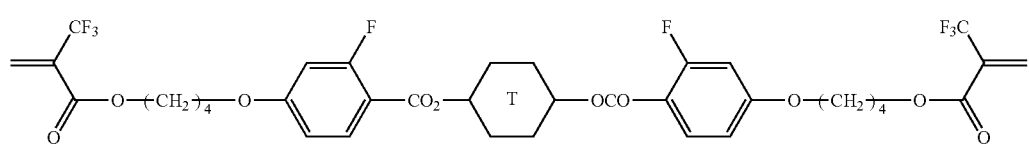
(1-1-A15)
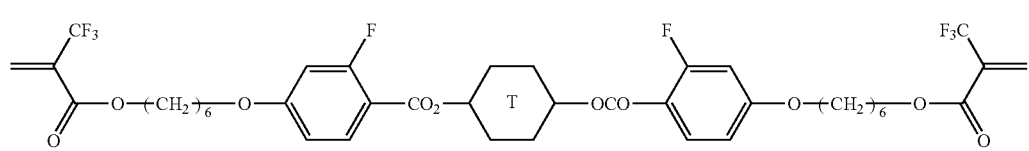
(1-1-A16)
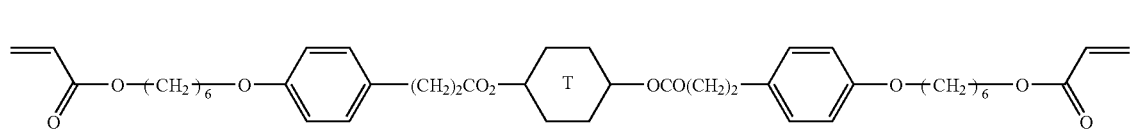
(1-1-B1)
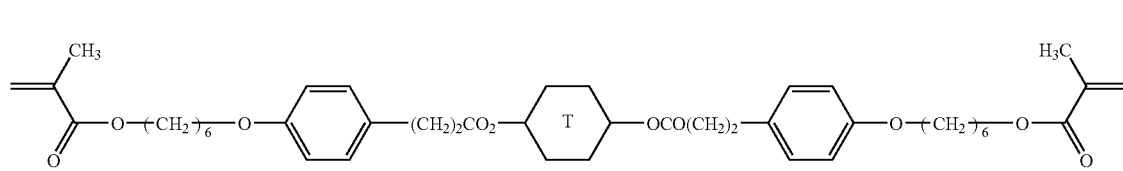
(1-1-B2)
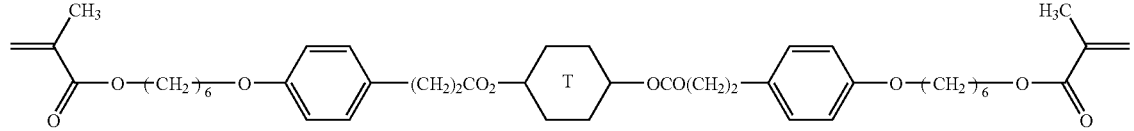
(1-1-B3)
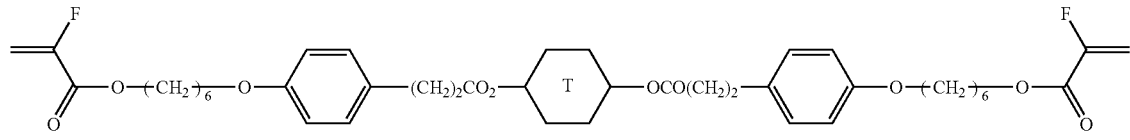
(1-1-B4)
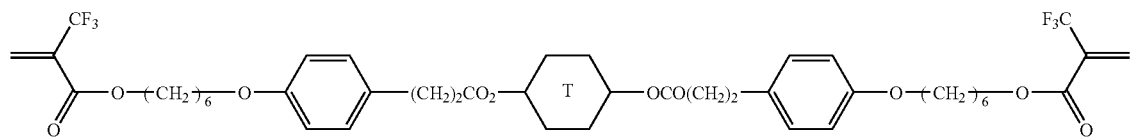
(1-1-B5)
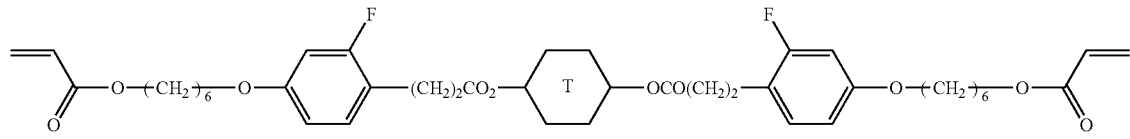
(1-1-B6)
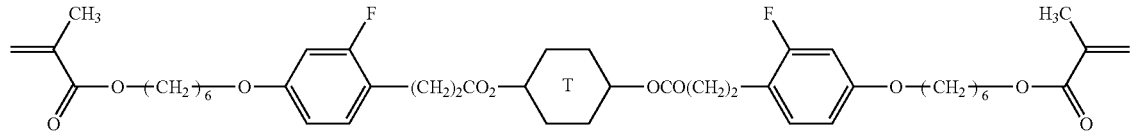

(1-1-B7)
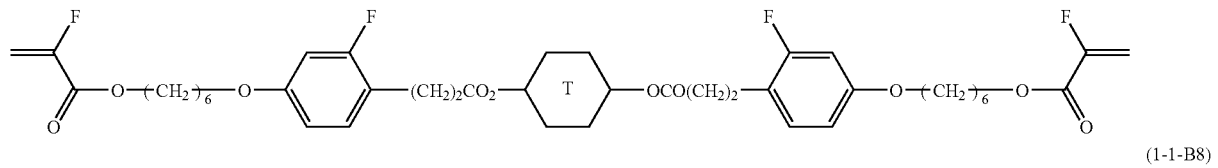
(1-1-B8)
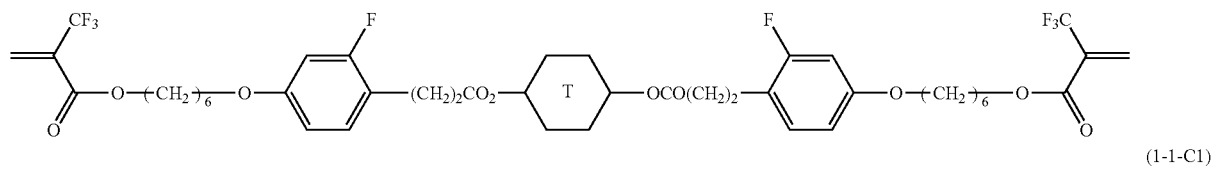
(1-1-C1)
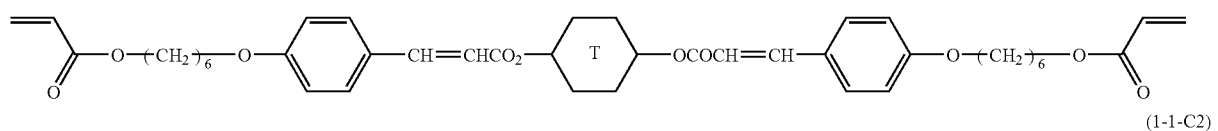
(1-1-C2)
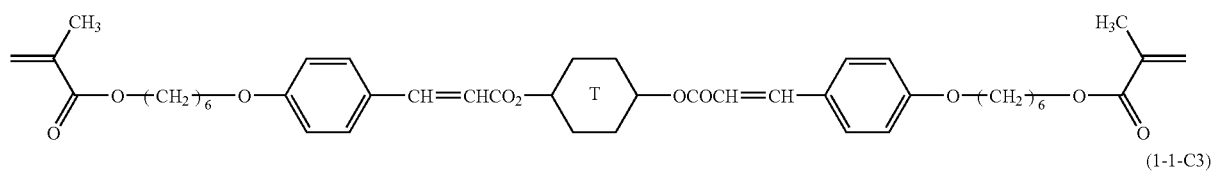
(1-1-C3)
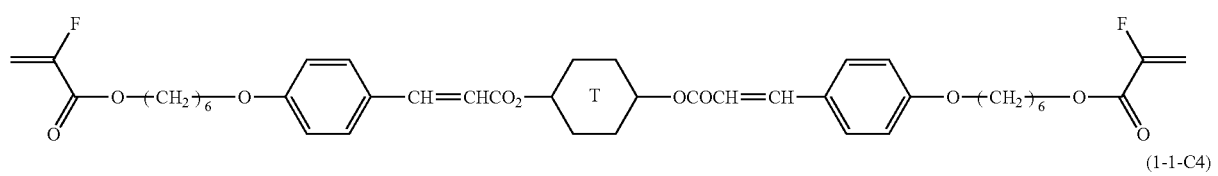
(1-1-C4)
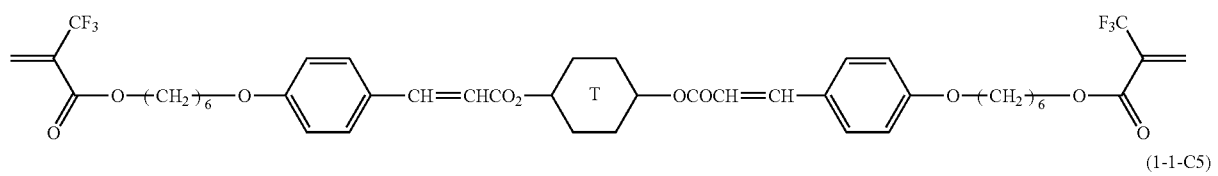
(1-1-C5)
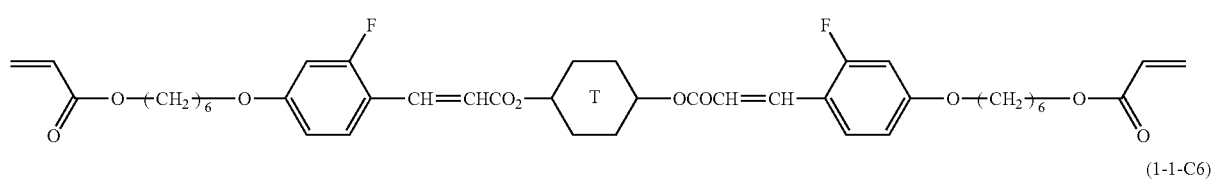
(1-1-C6)
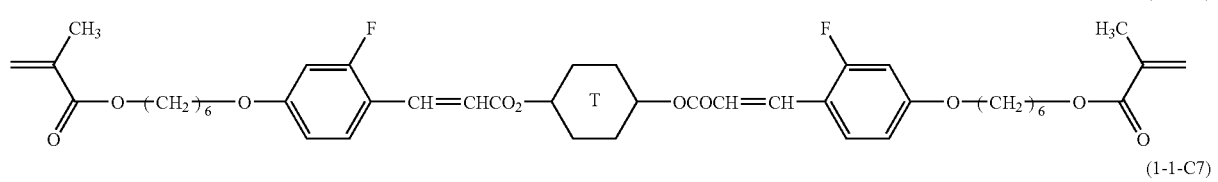
(1-1-C7)
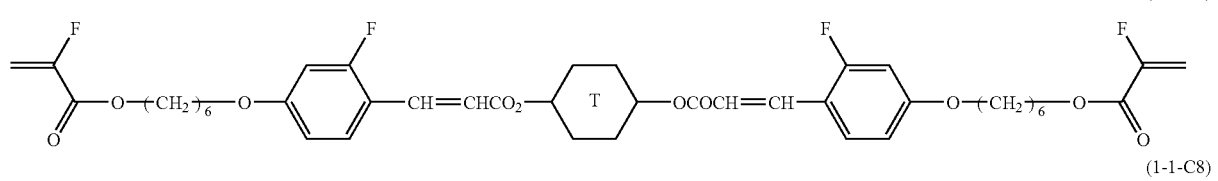
(1-1-C8)
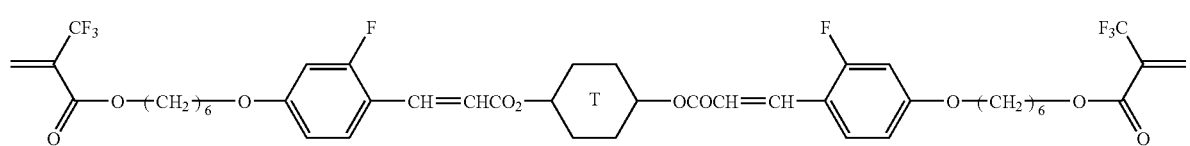

(2-1-A1)
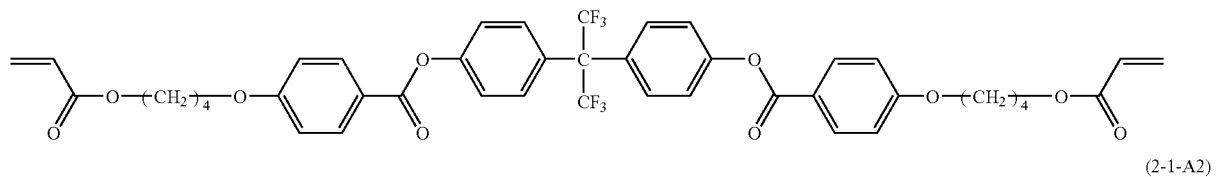
(2-1-A2)
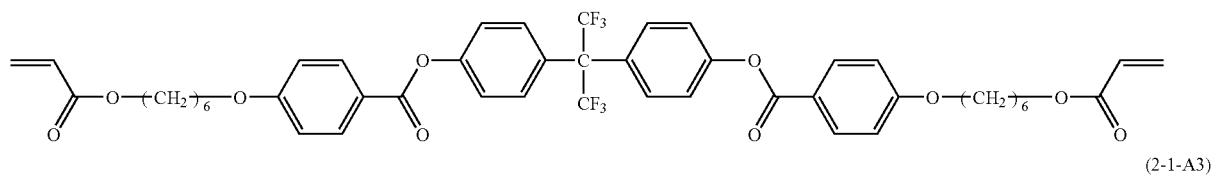
(2-1-A3)
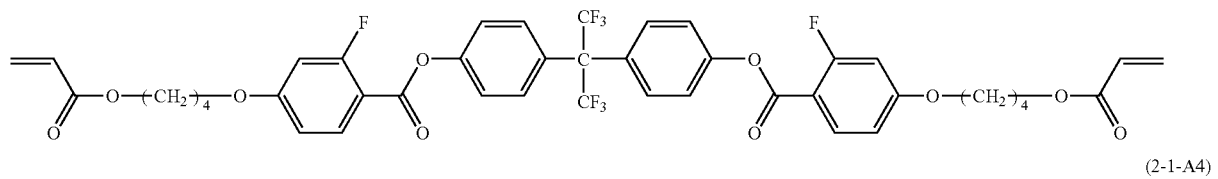
(2-1-A4)
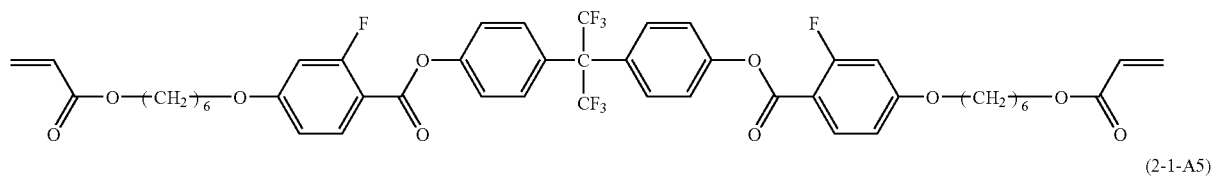
(2-1-A5)
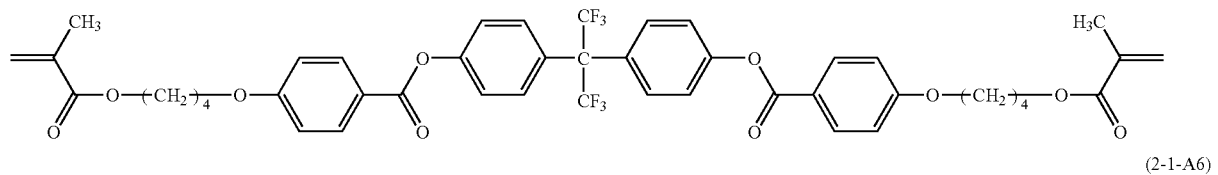
(2-1-A6)
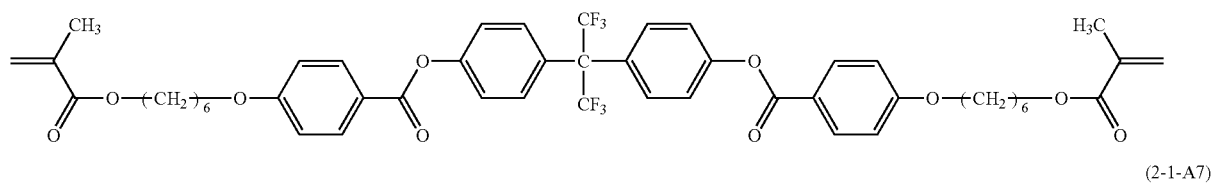
(2-1-A7)
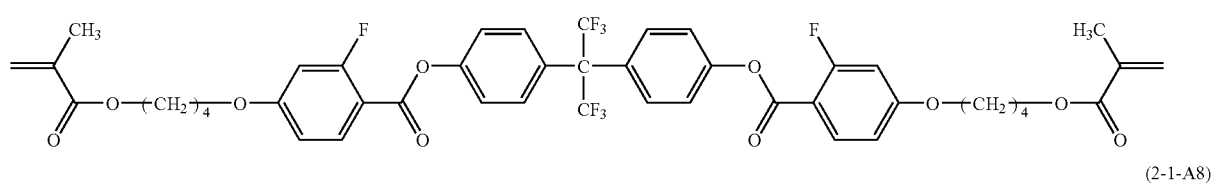
(2-1-A8)
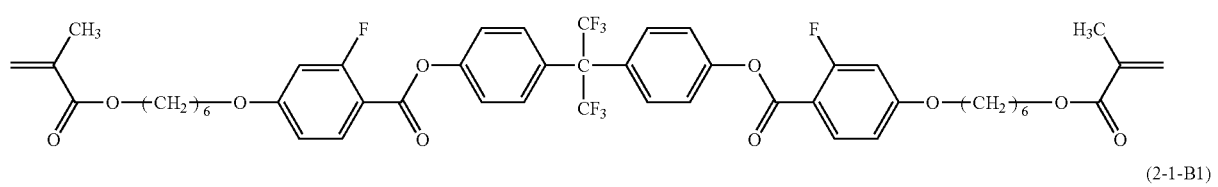
(2-1-B1)
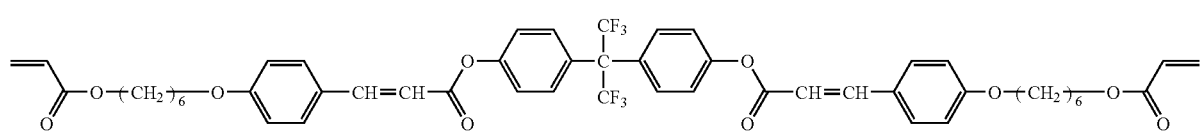

-continued
(2-1-B2)
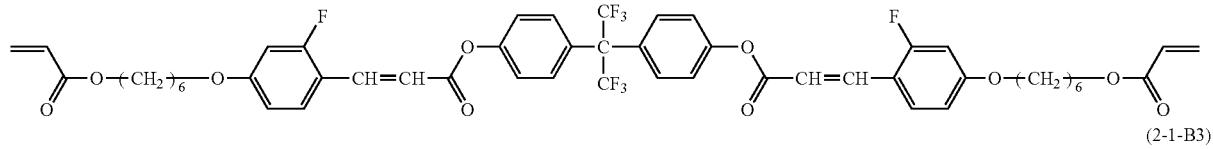
(2-1-B3)
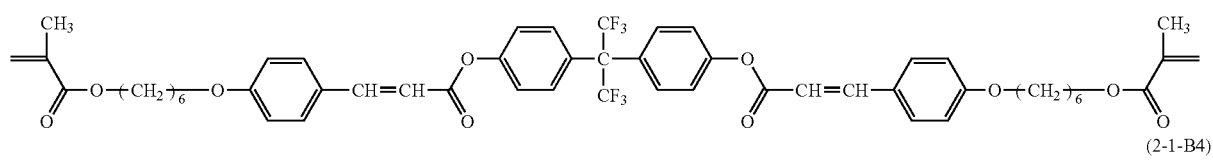
(2-1-B4)
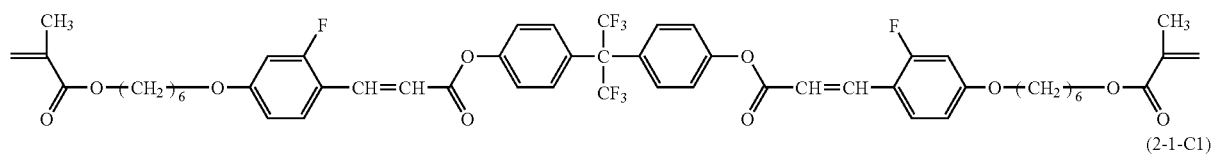
(2-1-C1)
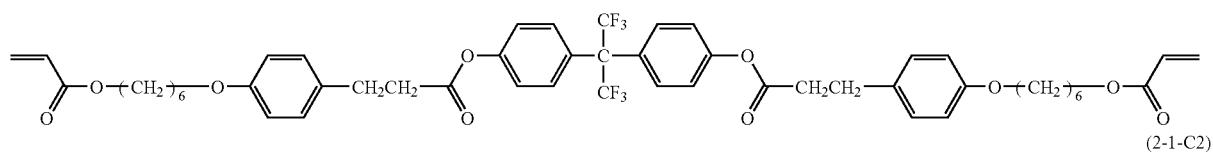
(2-1-C2)
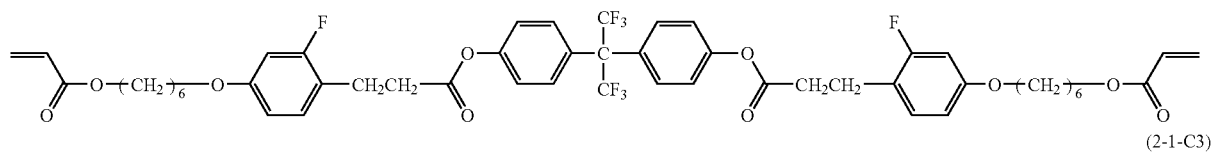
(2-1-C3)
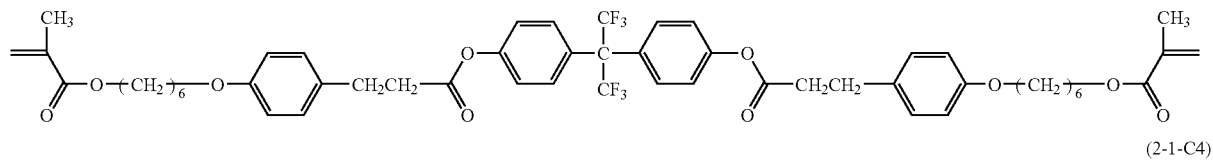
(2-1-C4)
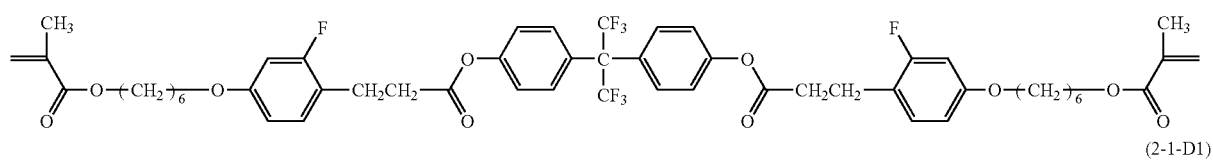
(2-1-D1)
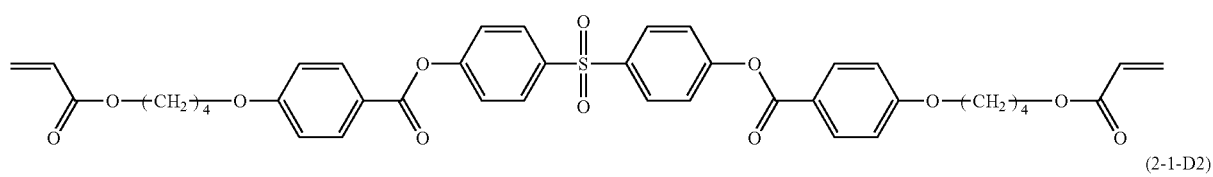
(2-1-D2)
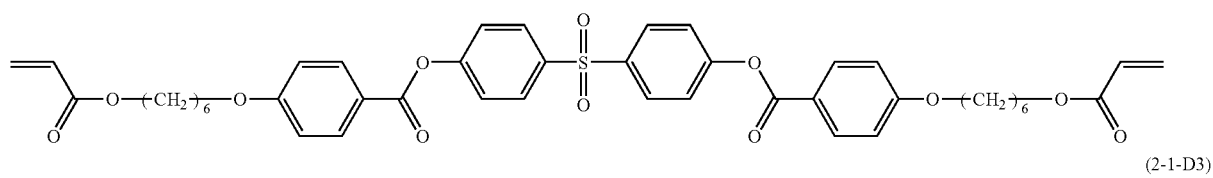
(2-1-D3)
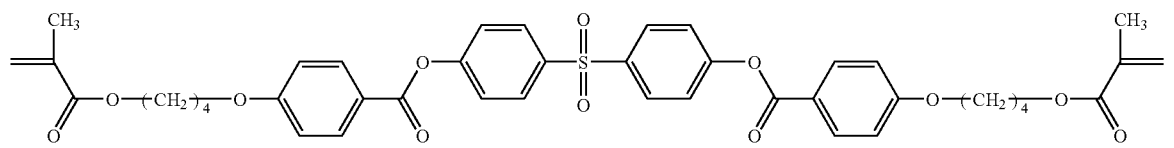

-continued
(2-1-D4)
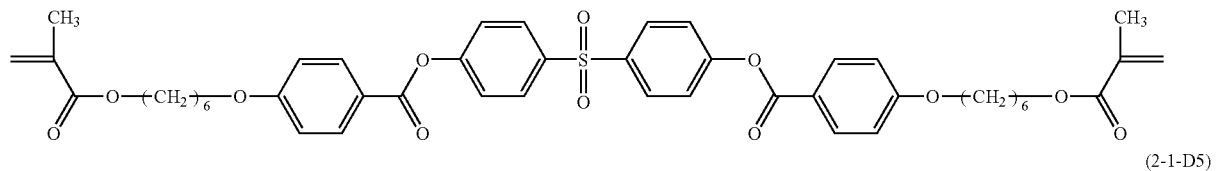
(2-1-D5)
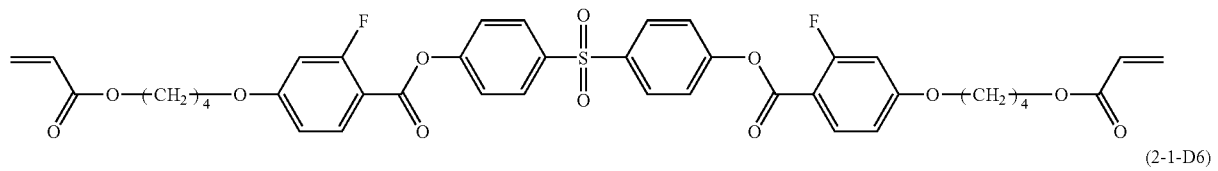
(2-1-D6)
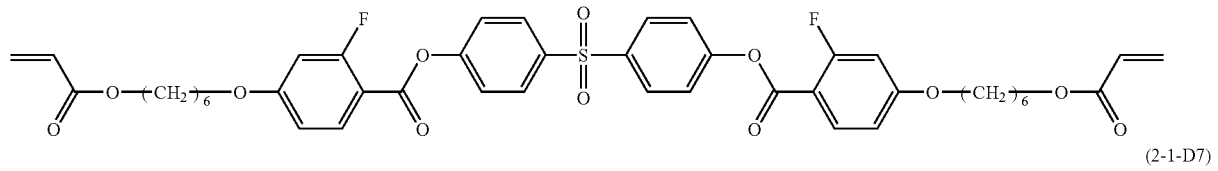
(2-1-D7)
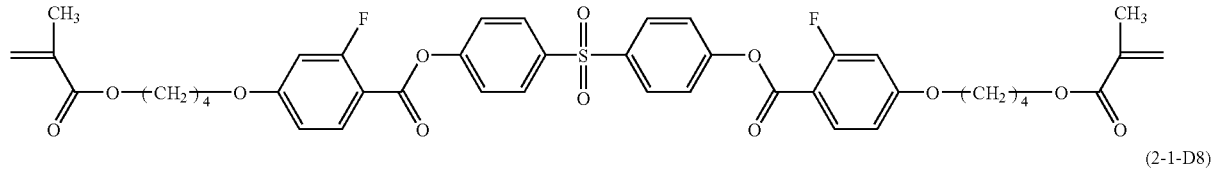
(2-1-D8)
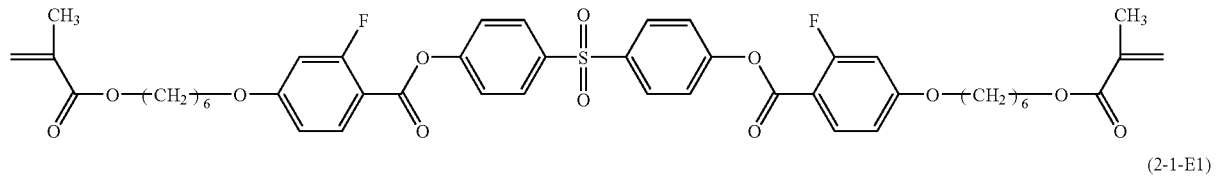
(2-1-E1)
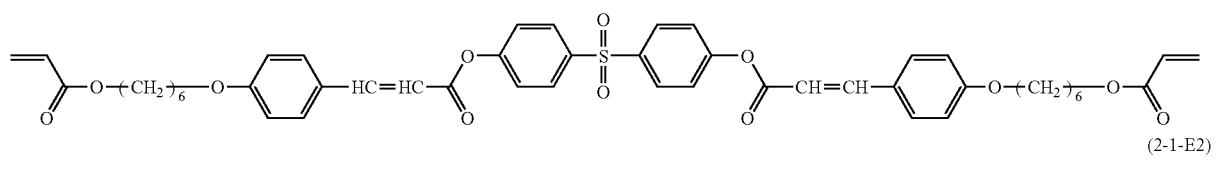
(2-1-E2)
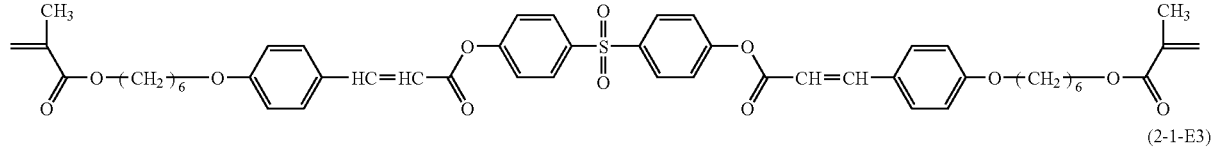
(2-1-E3)
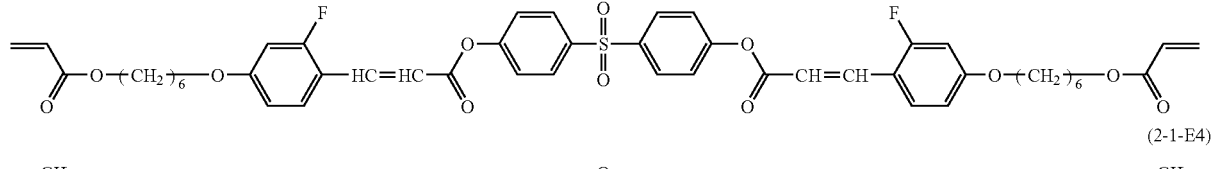
(2-1-E4)
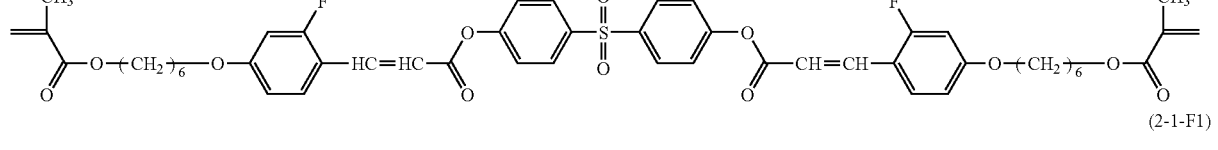
(2-1-F1)
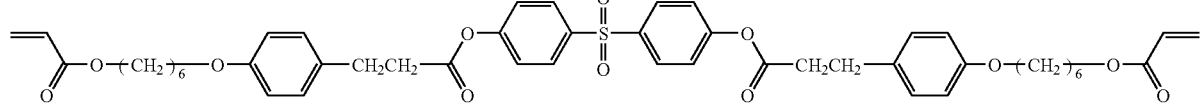

-continued
(2-1-F2)
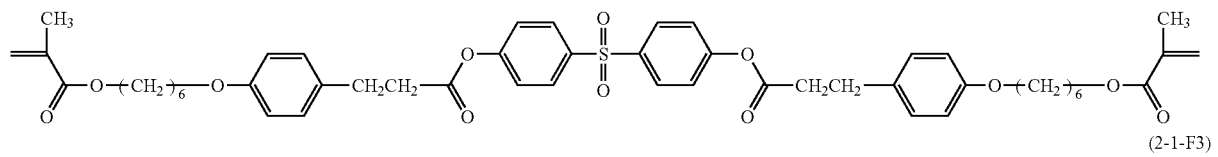
(2-1-F3)
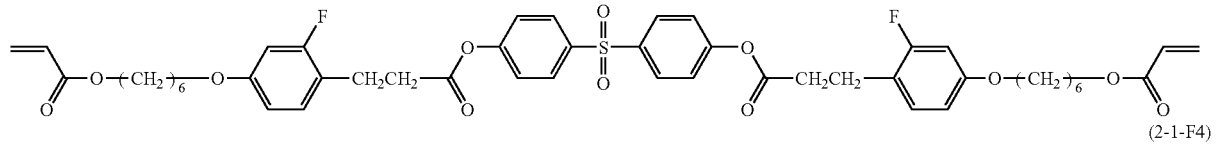
(2-1-F4)
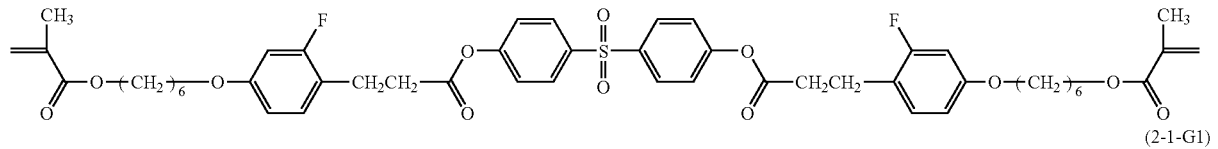
(2-1-G1)
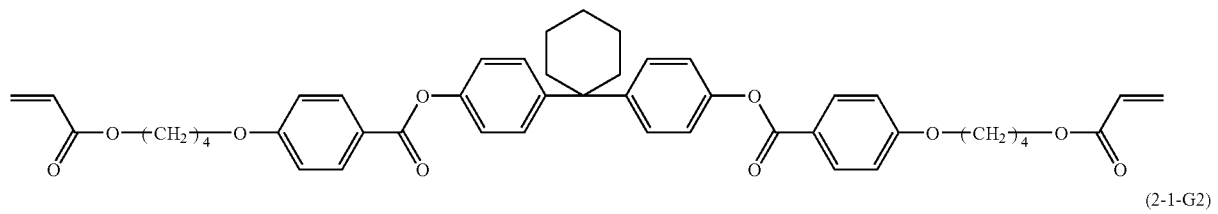
(2-1-G2)
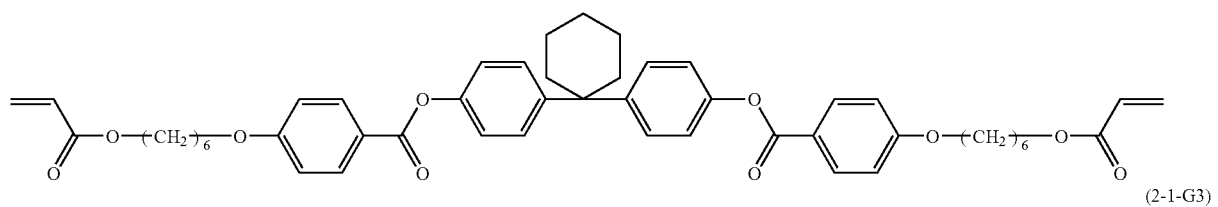
(2-1-G3)
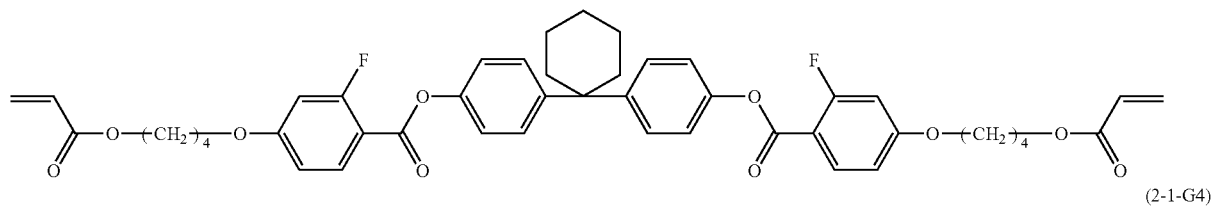
(2-1-G4)
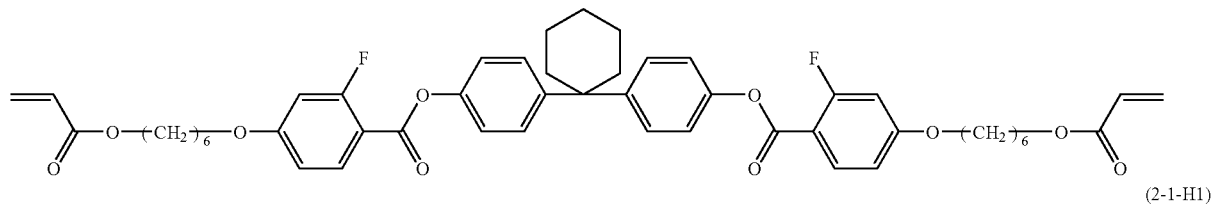
(2-1-H1)
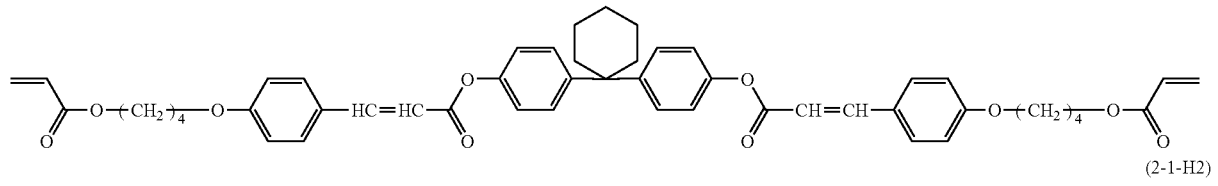
(2-1-H2)
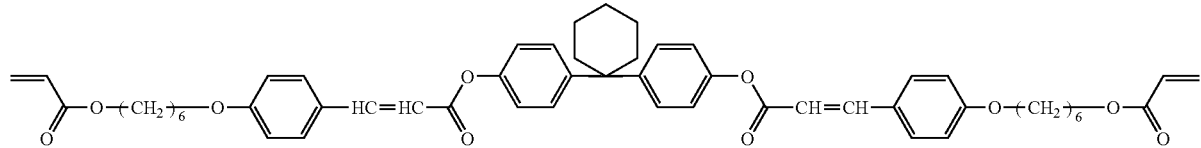

-continued
(2-1-H3)
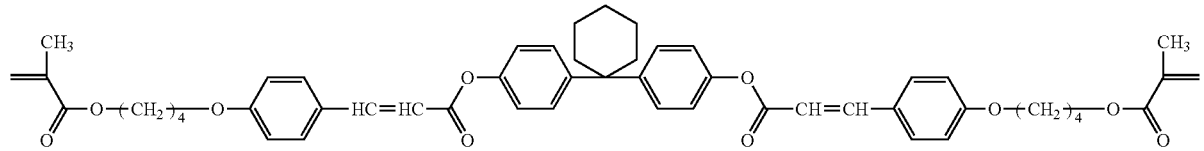
(2-1-H4)
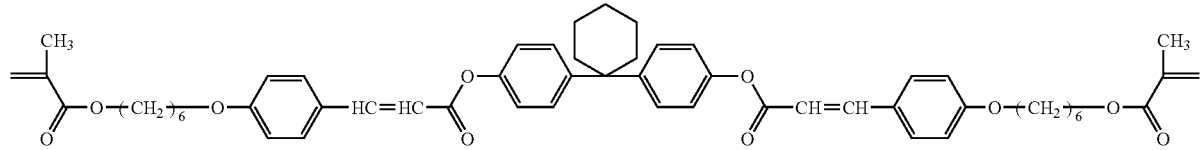
(2-1-I1)
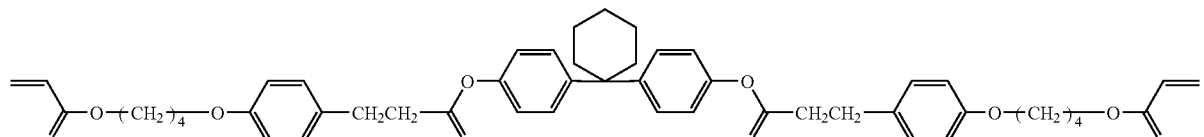
(2-1-I2)
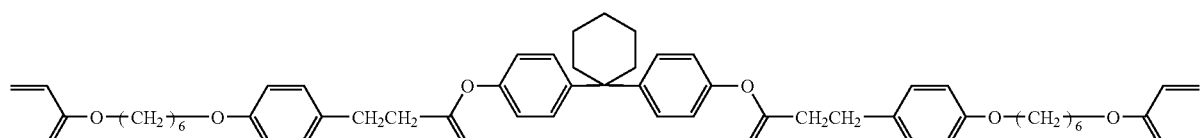
(2-1-I3)
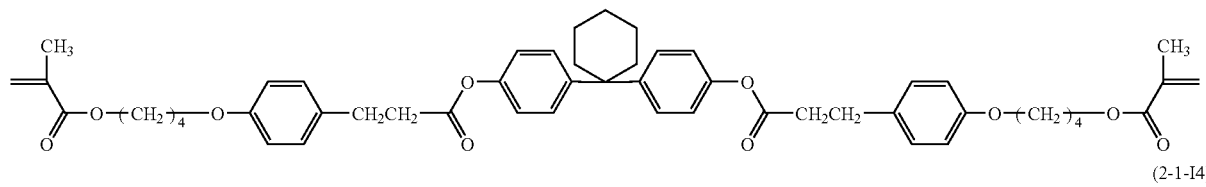
(2-1-I4)
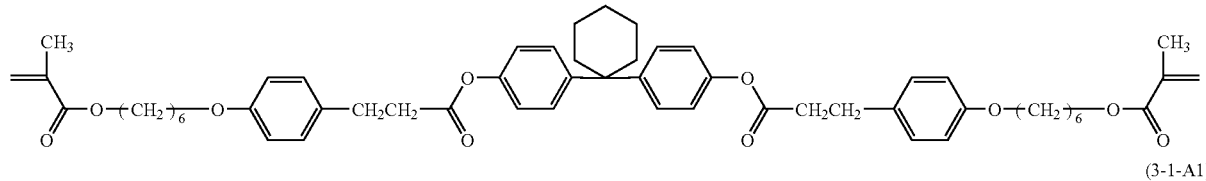
(3-1-A1)
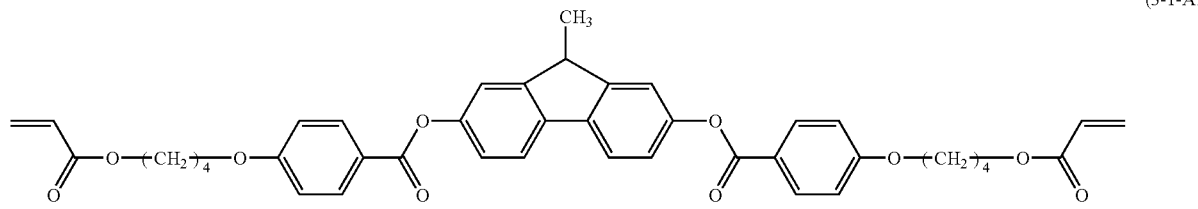
(3-1-A2)
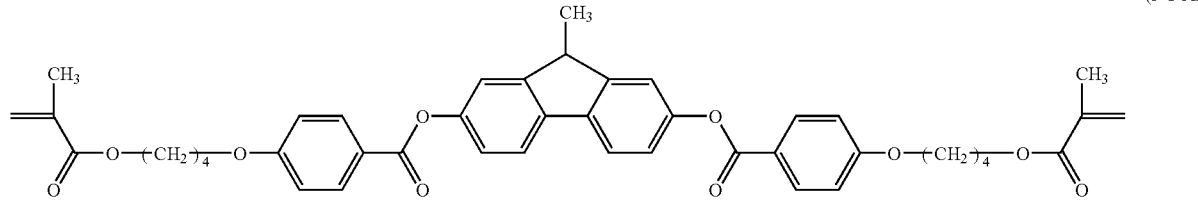

-continued
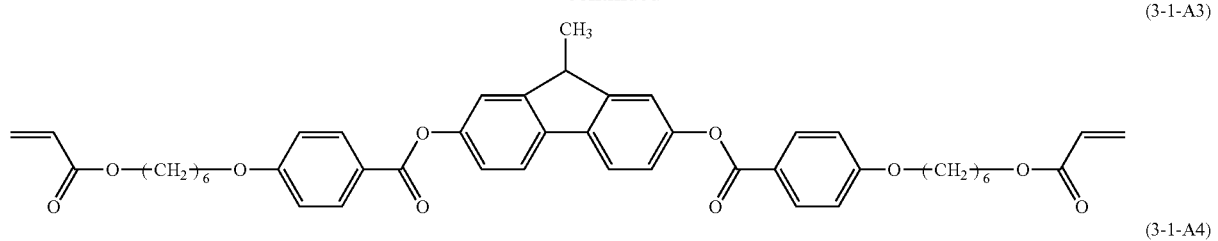
(3-1-A3)
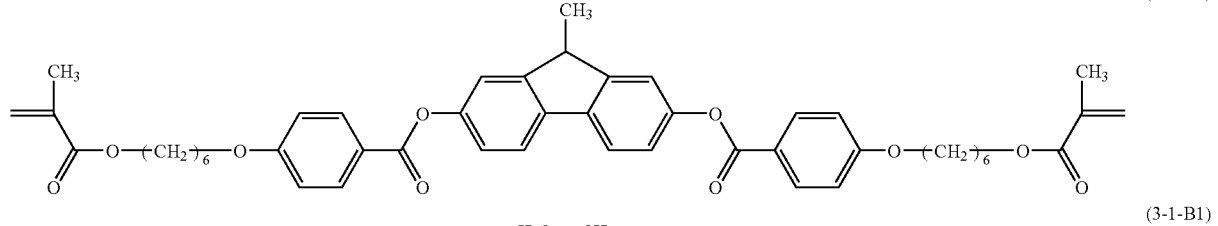
(3-1-A4)
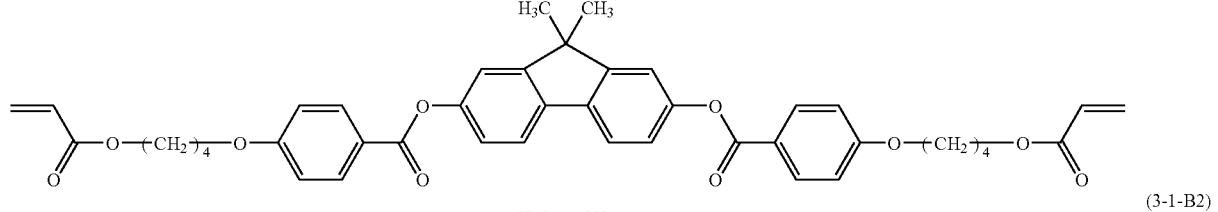
(3-1-B1)
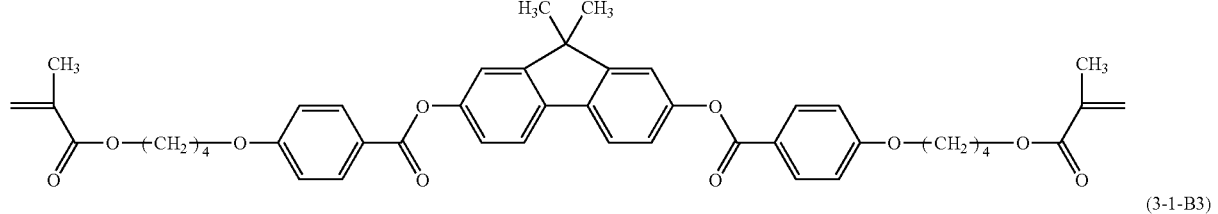
(3-1-B2)
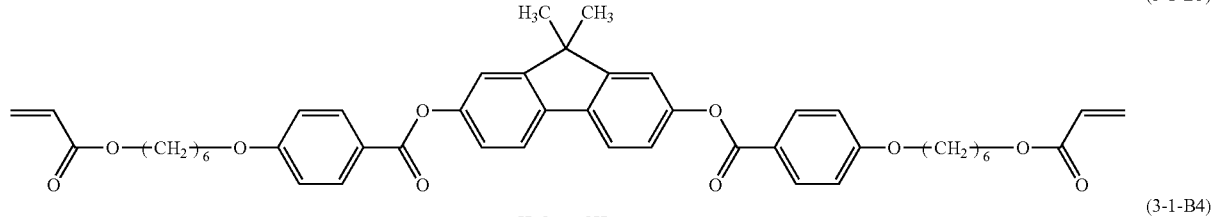
(3-1-B3)
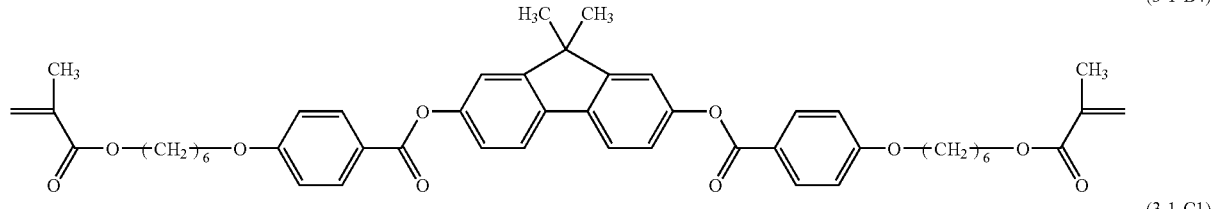
(3-1-B4)
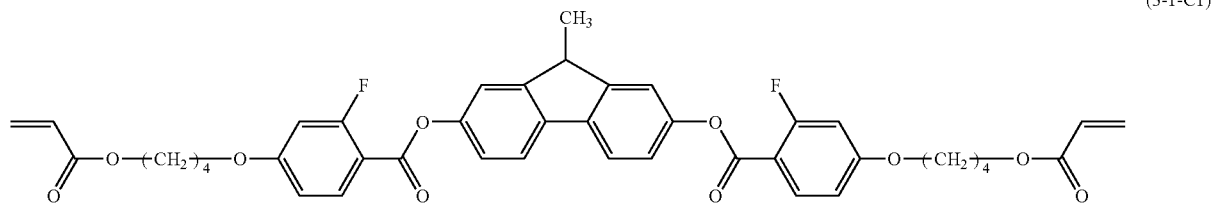
(3-1-C1)
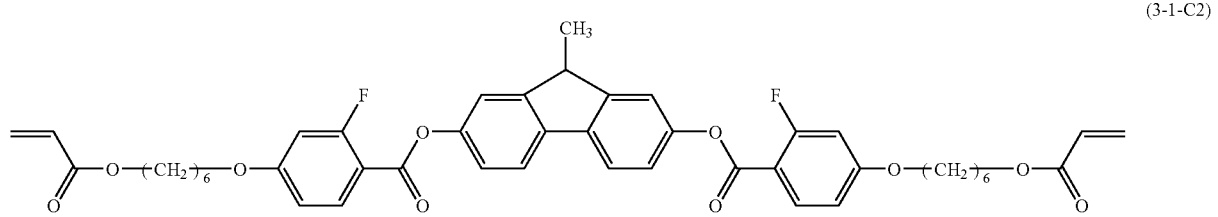
(3-1-C2)

-continued
(3-1-C3)
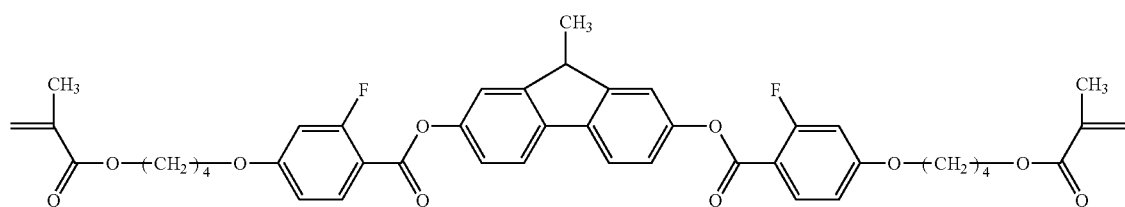
(3-1-C4)
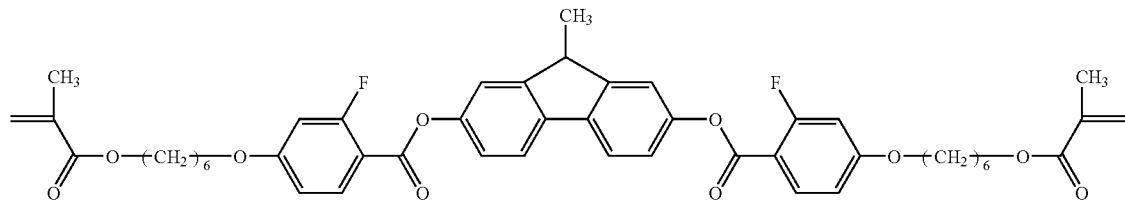
(3-1-D1)
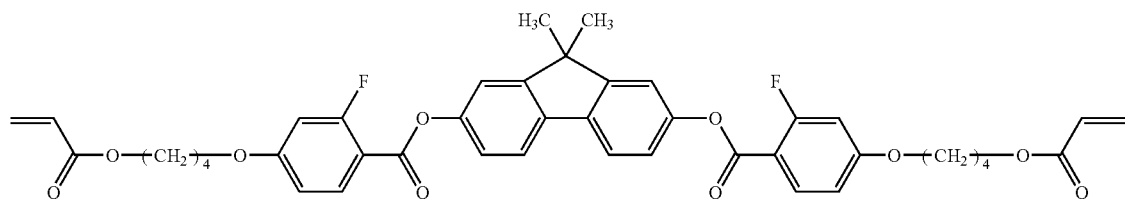
(3-1-D2)
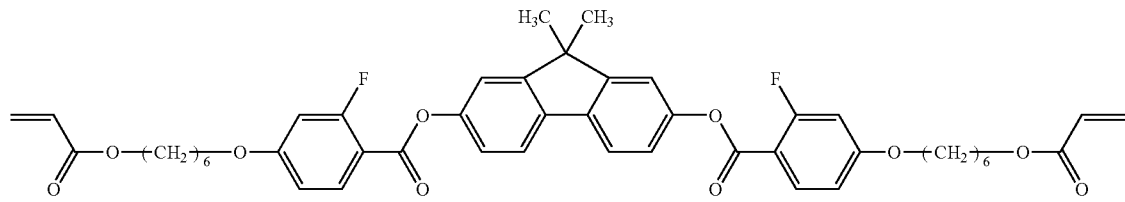
(3-1-D3)
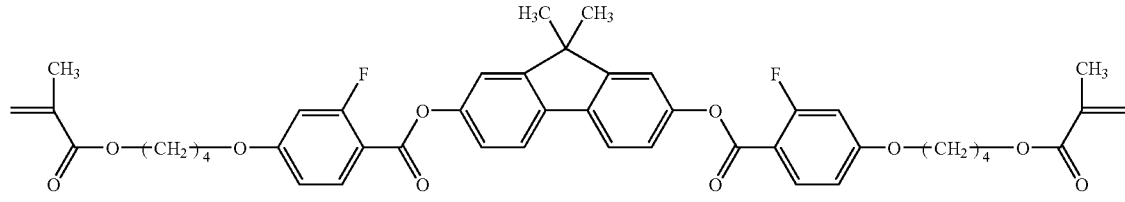
(3-1-D4)
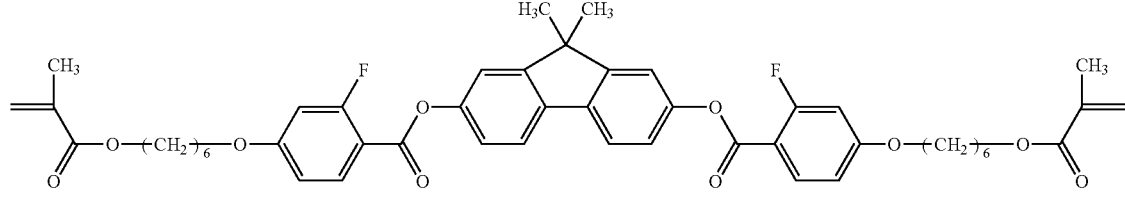
(3-1-E1)
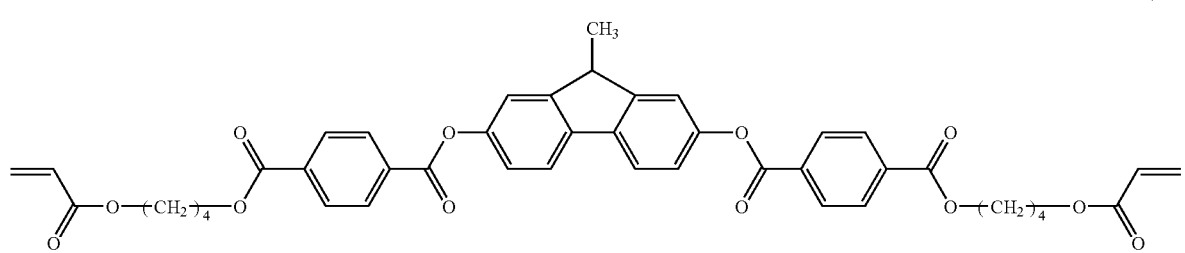

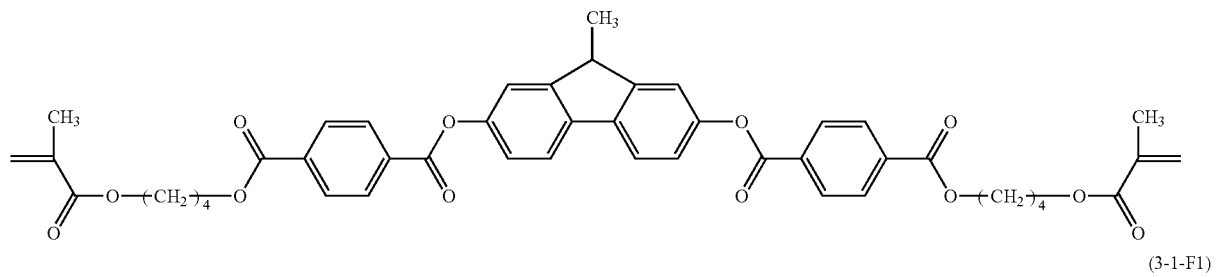
(3-1-E2)
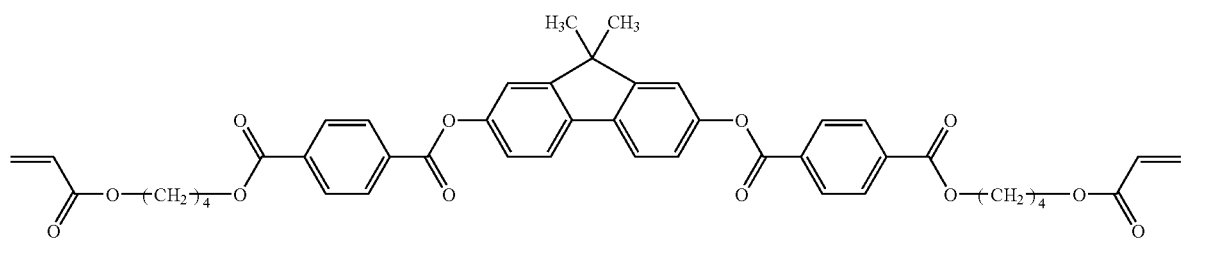
(3-1-F1)
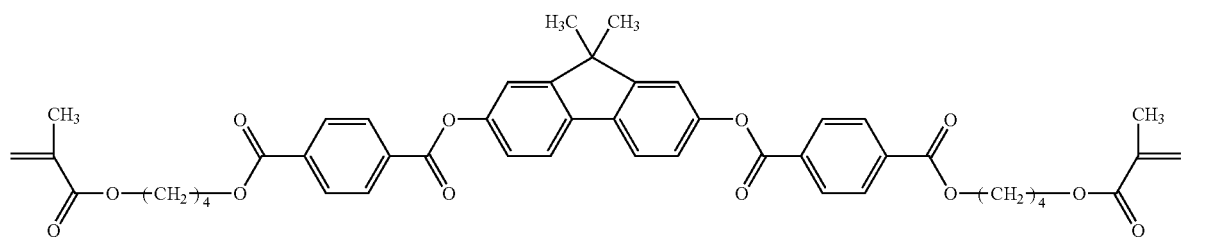
(3-1-F2)
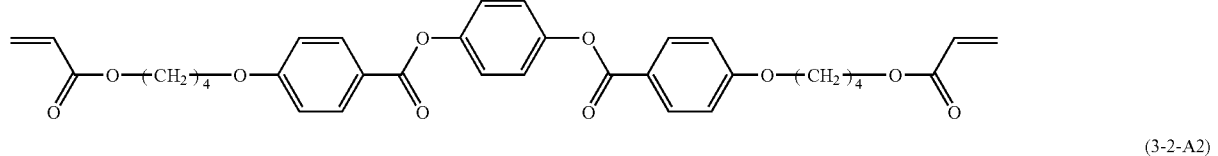
(3-2-A1)
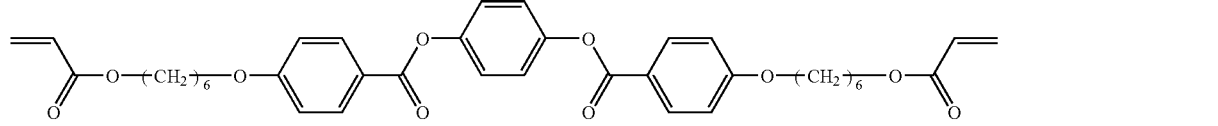
(3-2-A2)
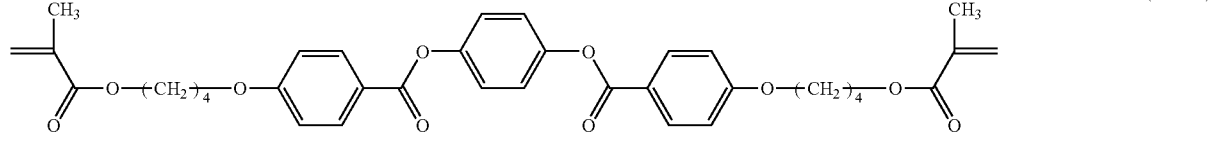
(3-2-A3)
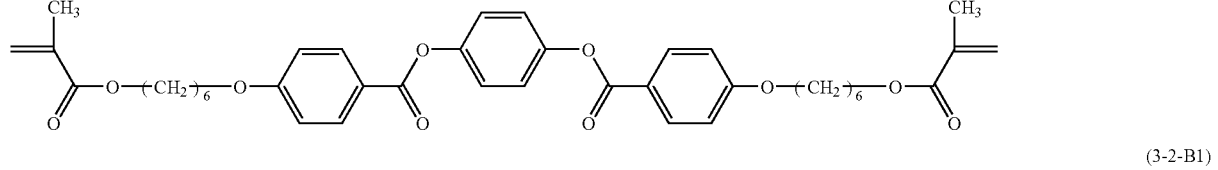
(3-2-A4)
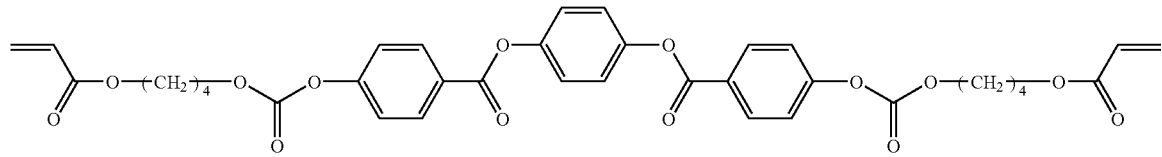
(3-2-B1)

-continued
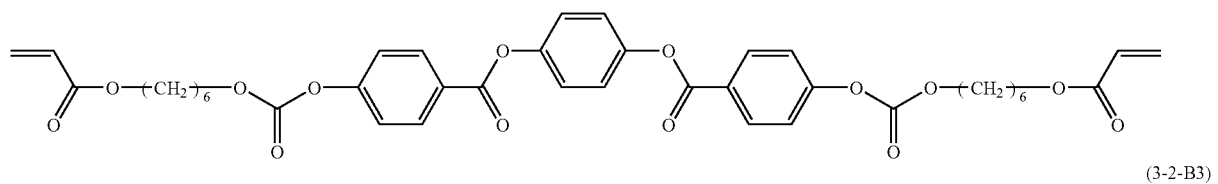
(3-2-B2)
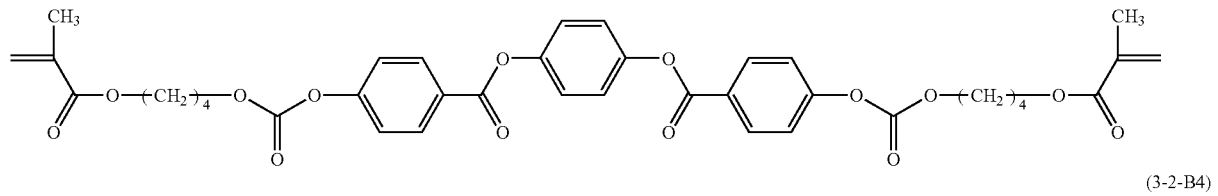
(3-2-B3)
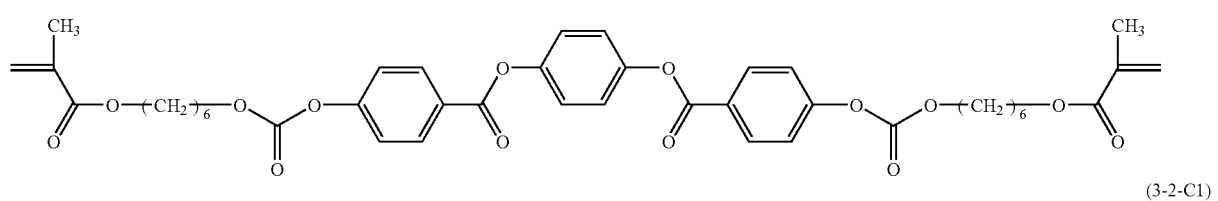
(3-2-B4)
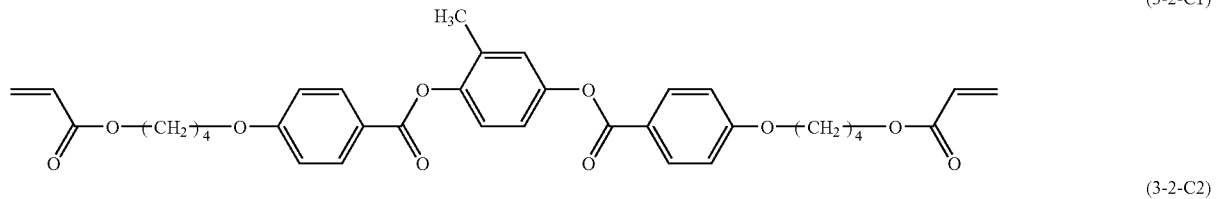
(3-2-C1)
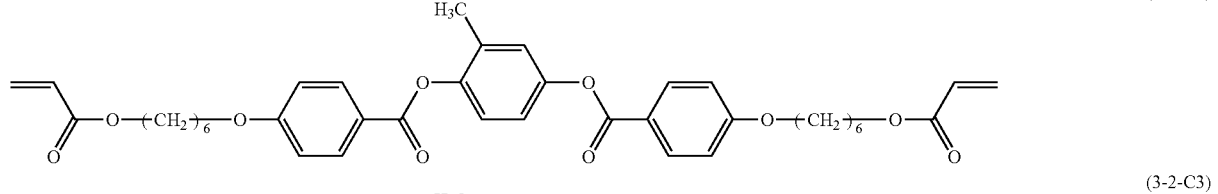
(3-2-C2)
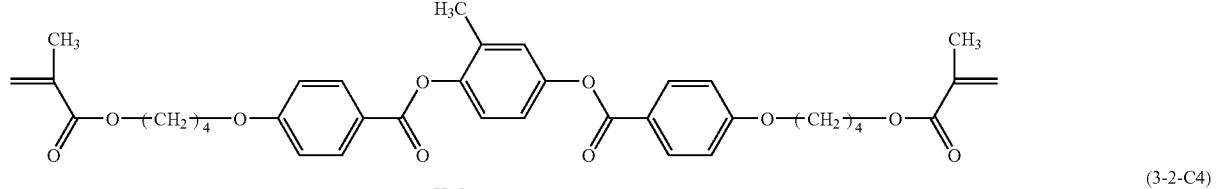
(3-2-C3)
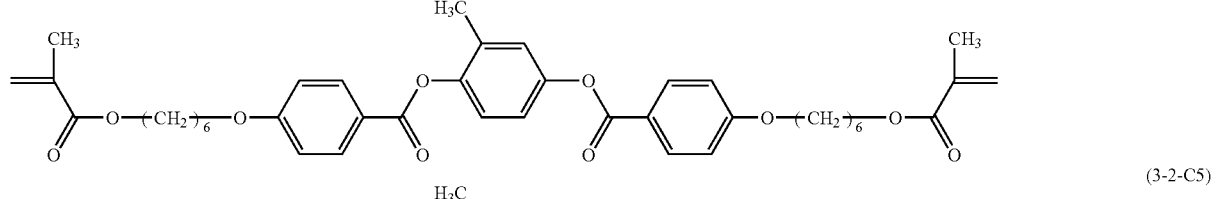
(3-2-C4)
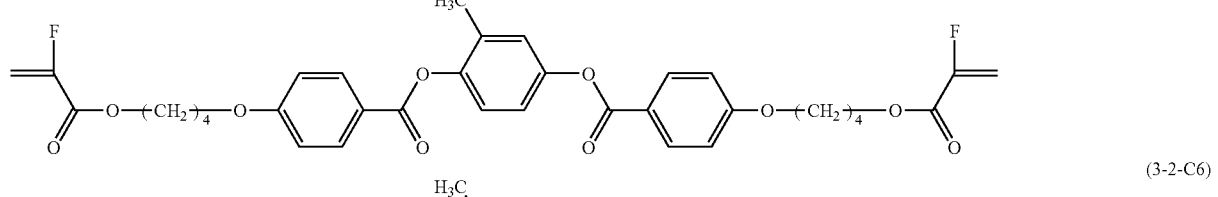
(3-2-C5)
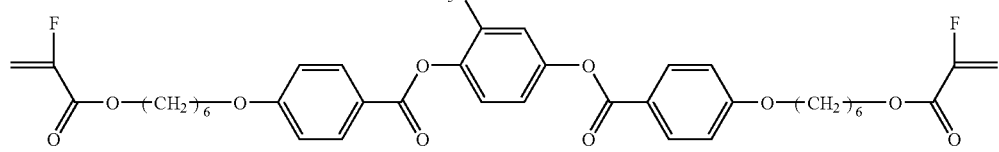
(3-2-C6)

-continued
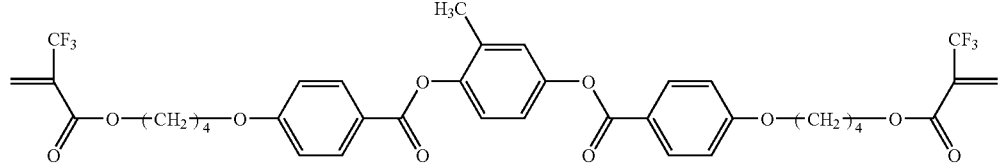
(3-2-C7)
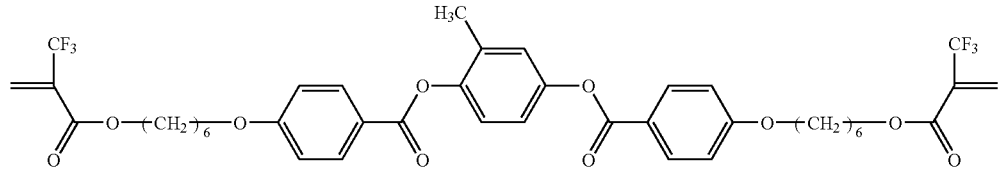
(3-2-C8)
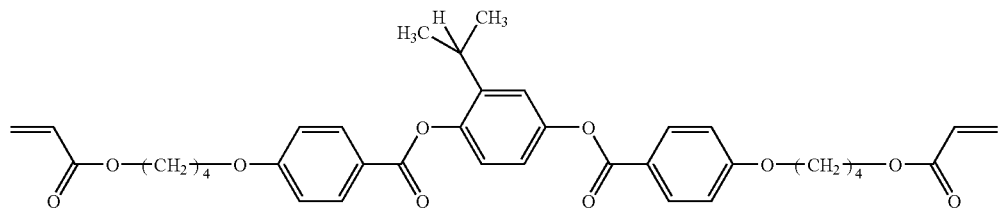
(3-2-C9)
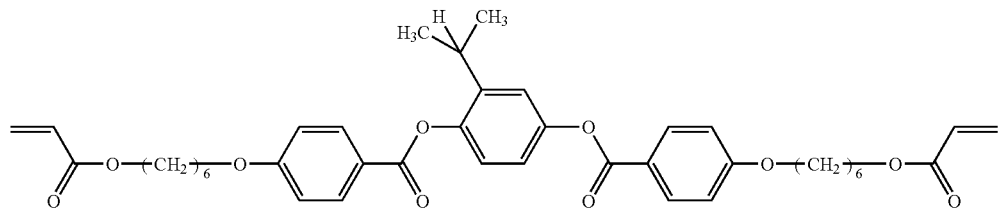
(3-2-C10)
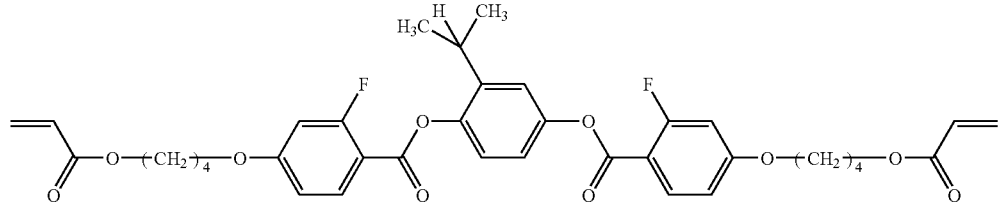
(3-2-C11)
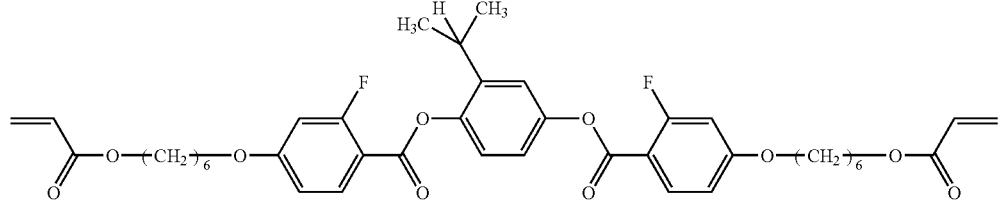
(3-2-C12)
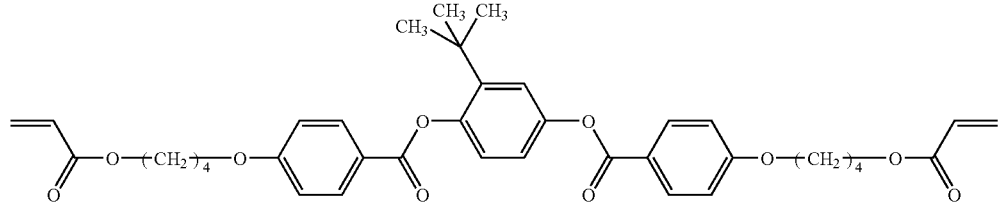
(3-2-C13)
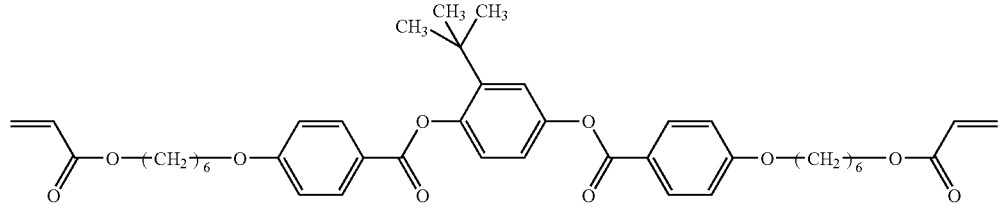
(3-2-C14)

-continued
(3-2-C15)
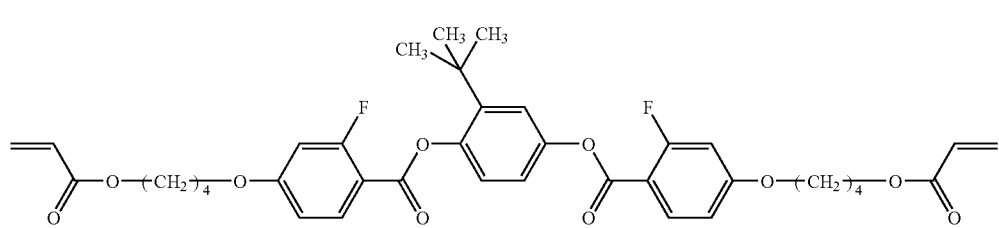
(3-2-C16)
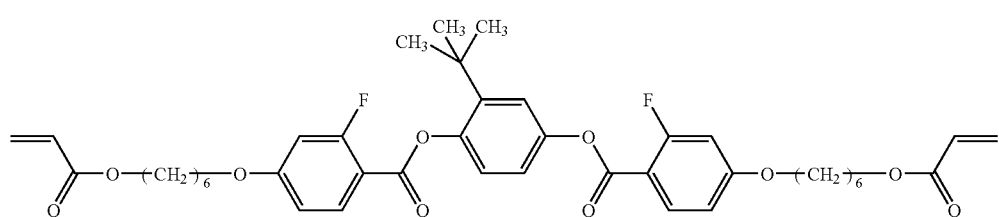
(3-2-D1)
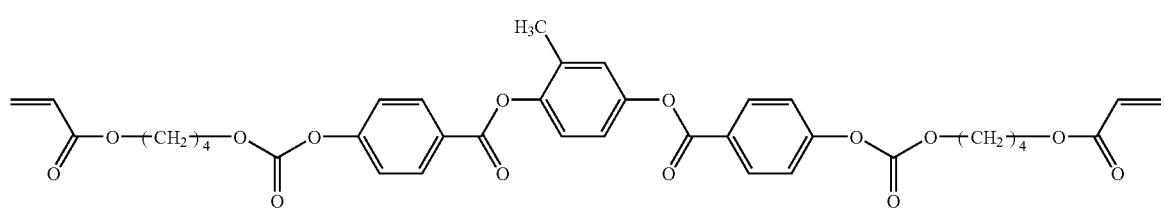
(3-2-D2)
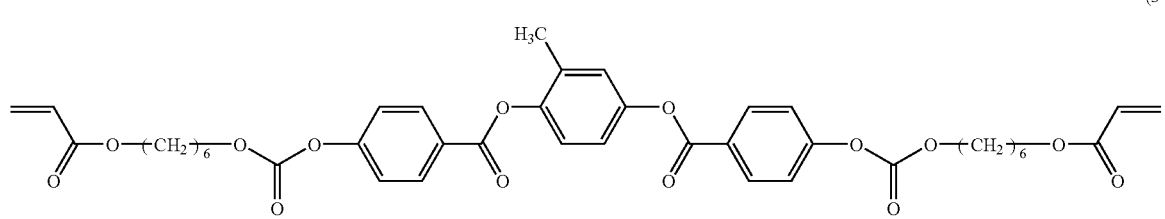
(3-3-A1)
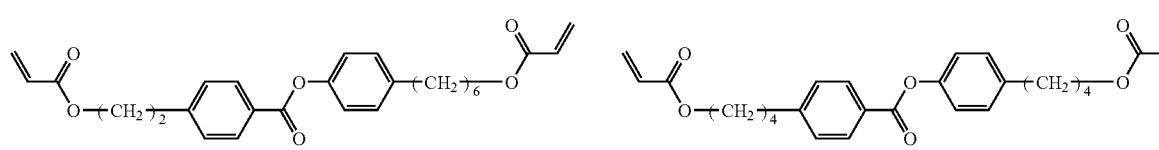
(3-3-A2)
(3-3-A3)
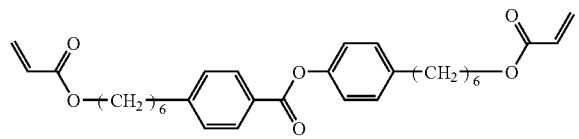
(3-3-B1)
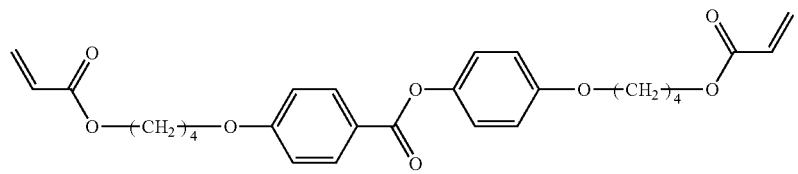
(3-3-B2)
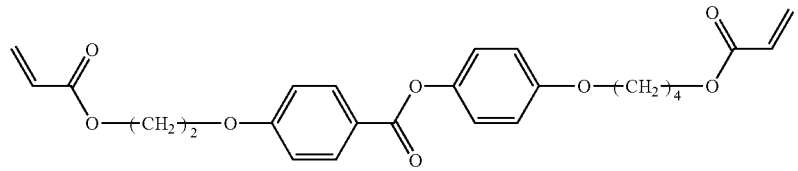

-continued
(3-3-C1)
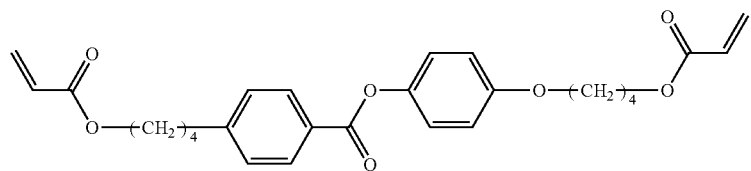
(3-3-C2)
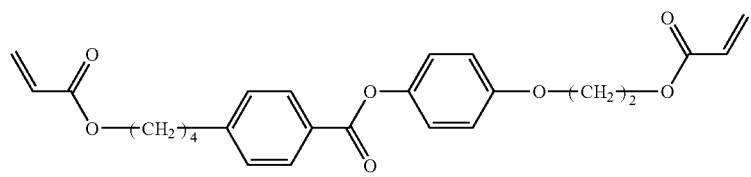
(3-3-C3)
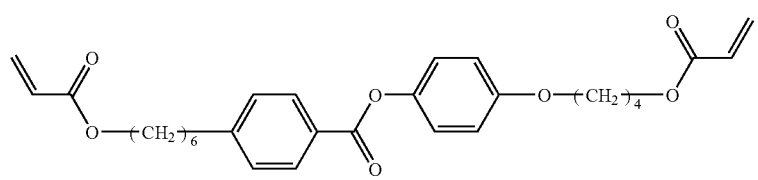
(3-3-D1)
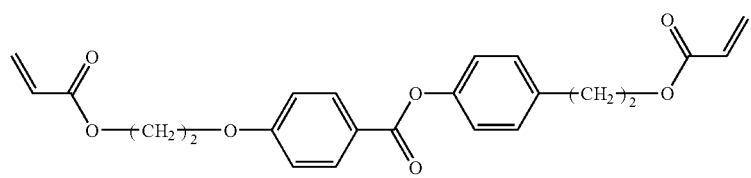
(3-3-D2)
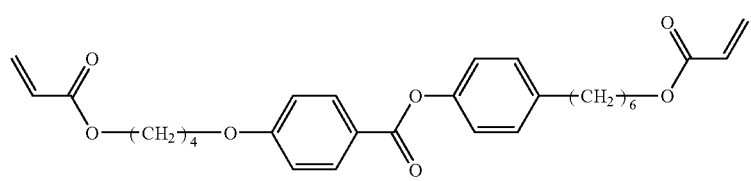
(3-3-E1)
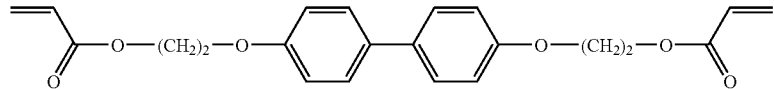
(3-3-E2)
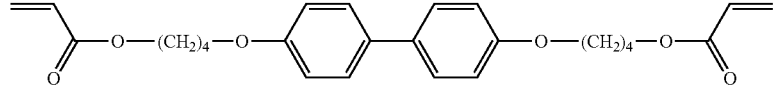
(3-3-E3)
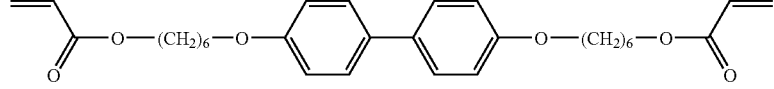
(3-3-E4)
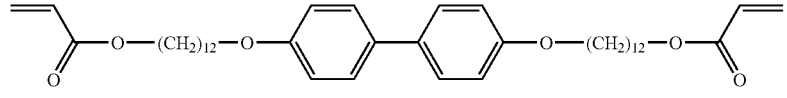
(3-3-E5)
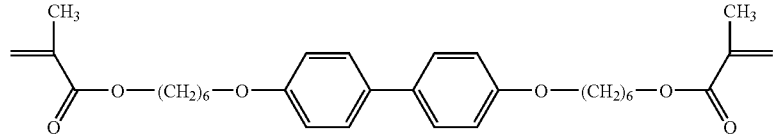
(3-3-F1)
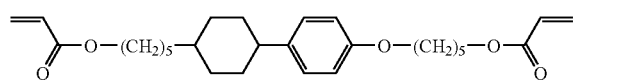
(3-3-H1)
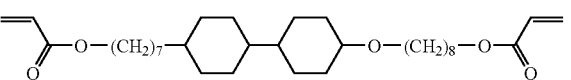

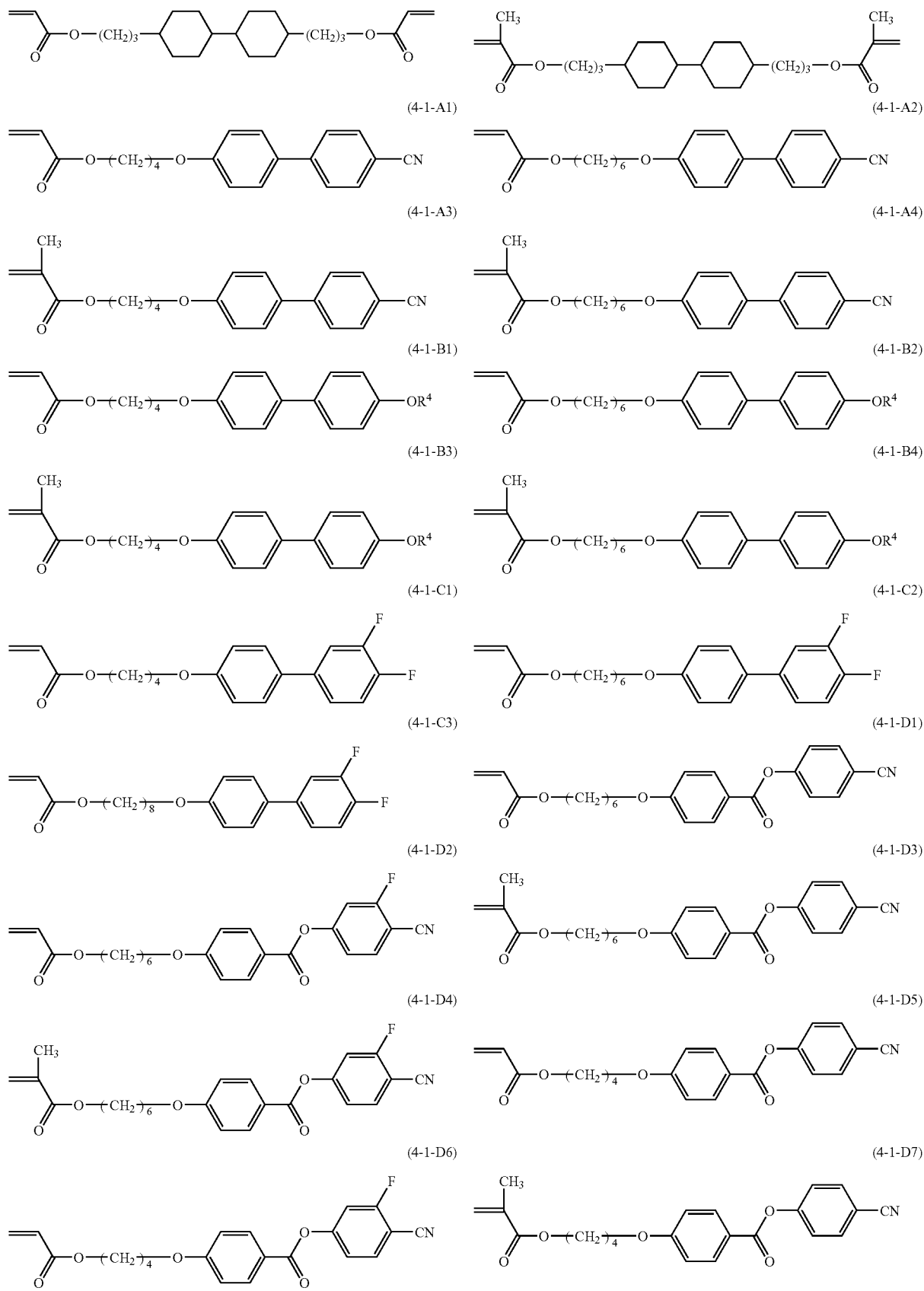

-continued
(4-1-D8)
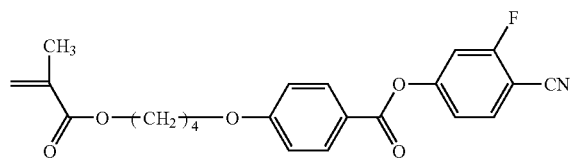
(4-1-E1)
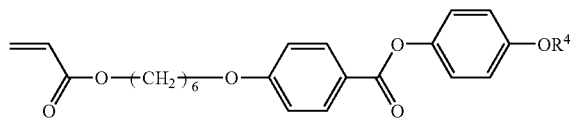
(4-1-E2)
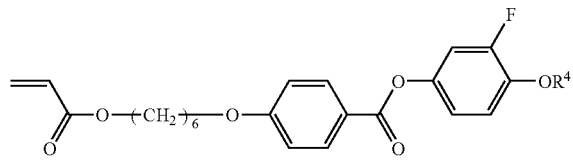
(4-1-E3)
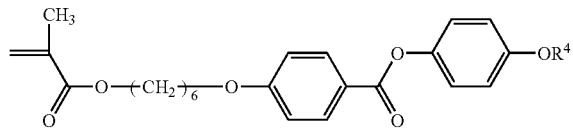
(4-1-E4)
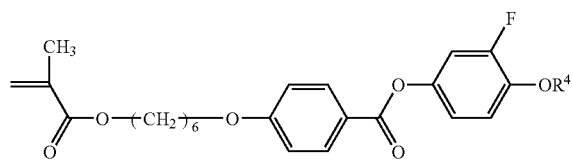
(4-1-E5)
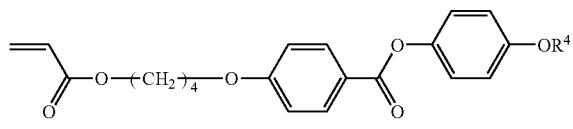
(4-1-E6)
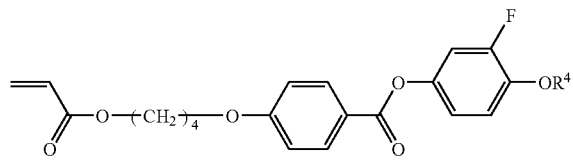
(4-1-E7)
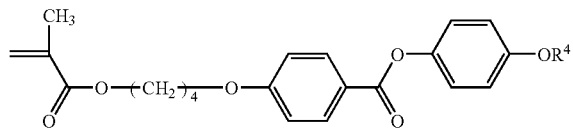
(4-1-E8)
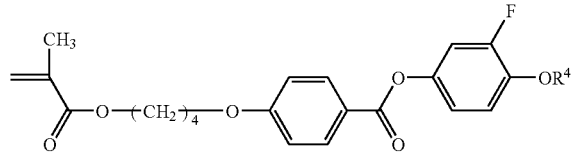
(4-1-F1)
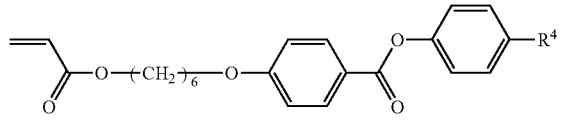
(4-1-F2)
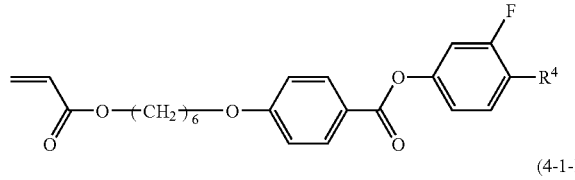
(4-1-F3)
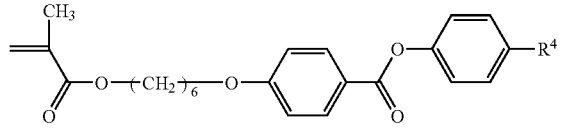
(4-1-F4)
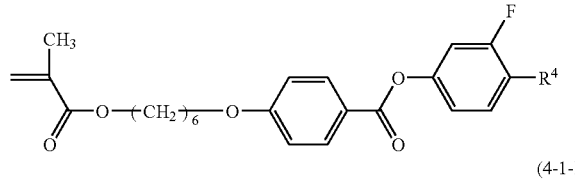
(4-1-F5)
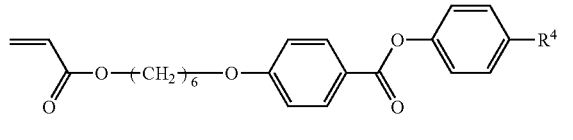
(4-1-F6)
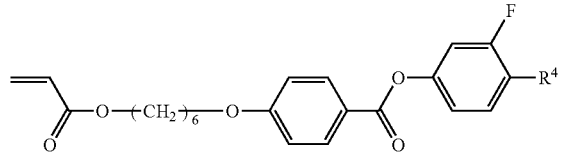
(4-1-F7)
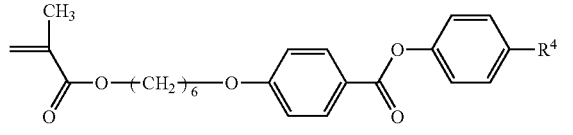
(4-1-F8)
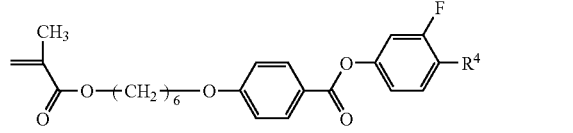
(4-1-G1)
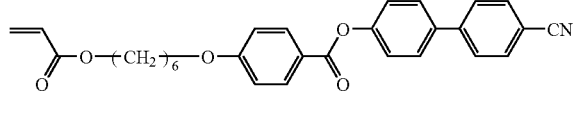

-continued
(4-1-G2)
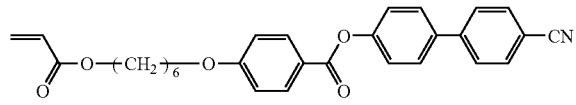
(4-1-G3)
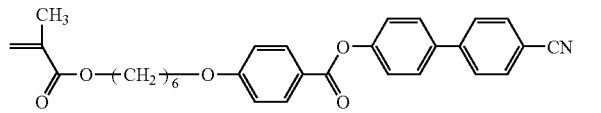
(4-1-G4)
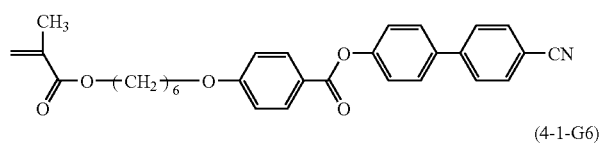
(4-1-G5)
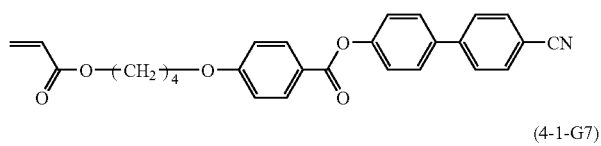
(4-1-G6)
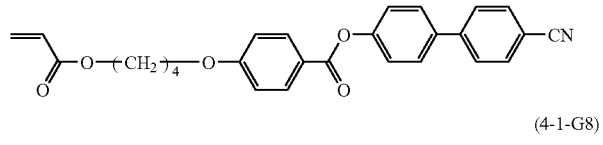
(4-1-G7)
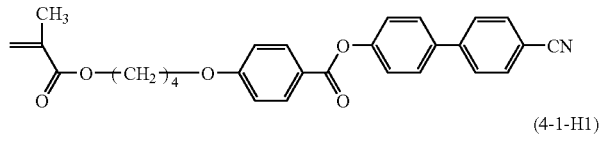
(4-1-G8)
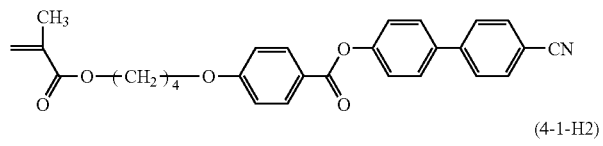
(4-1-H1)
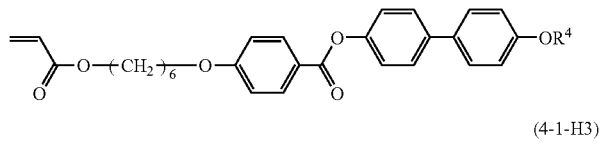
(4-1-H2)
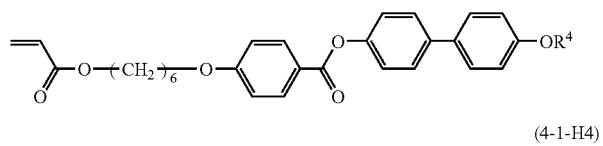
(4-1-H3)
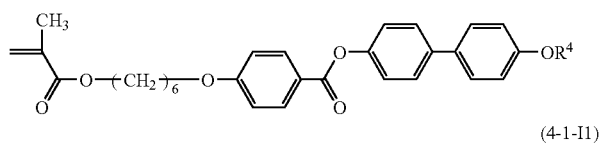
(4-1-H4)
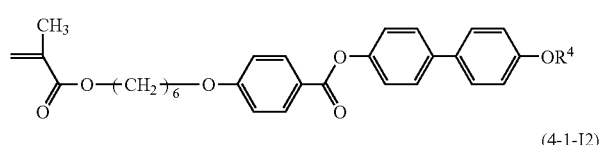
(4-1-I1)
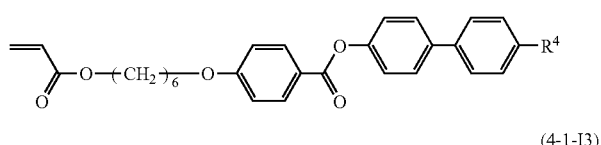
(4-1-I2)
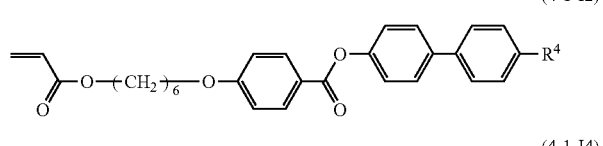
(4-1-I3)
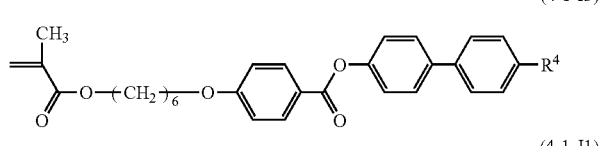
(4-1-I4)
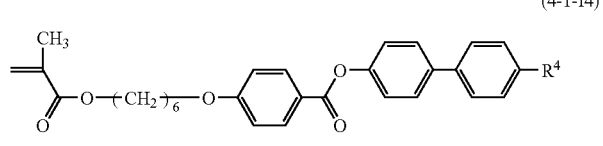
(4-1-J1)
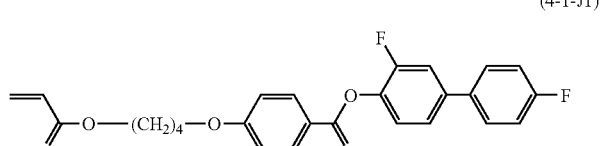
(4-1-J2)
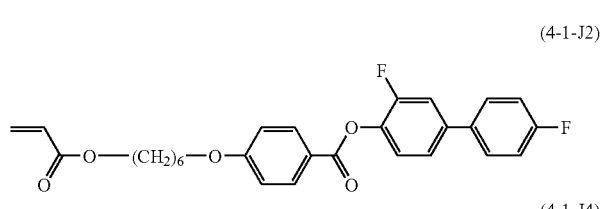
(4-1-J3)
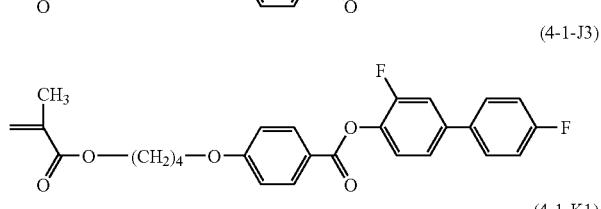
(4-1-J4)
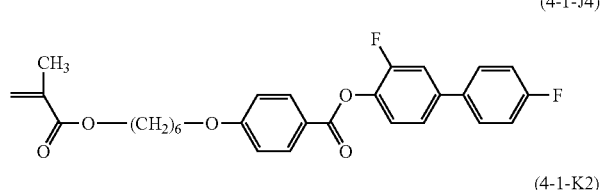
(4-1-K1)
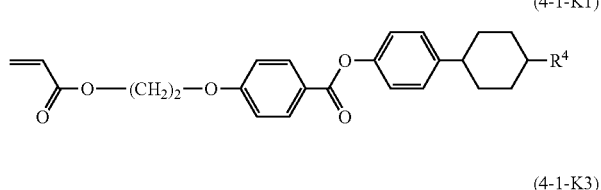
(4-1-K2)
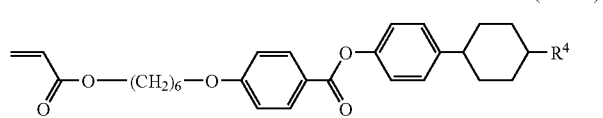
(4-1-K3)
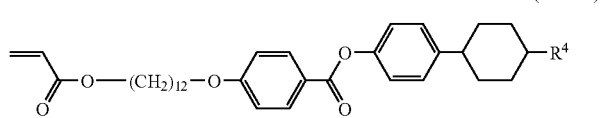

-continued
(4-1-L1)
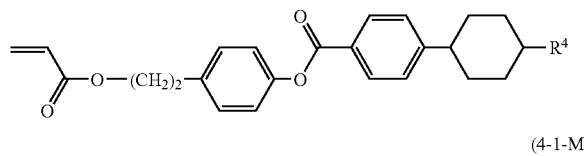
(4-1-L2)
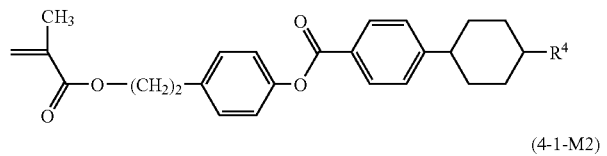
(4-1-M1)
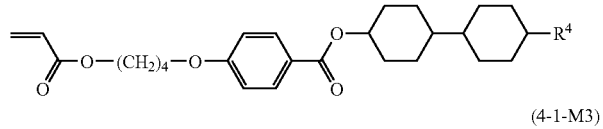
(4-1-M2)
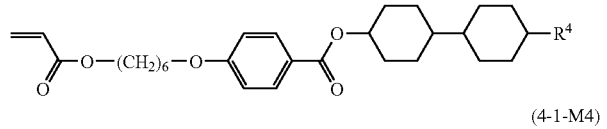
(4-1-M3)
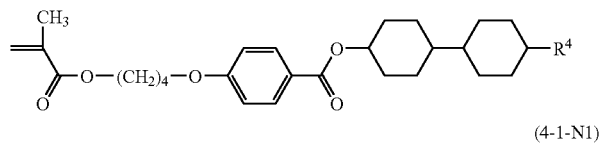
(4-1-M4)
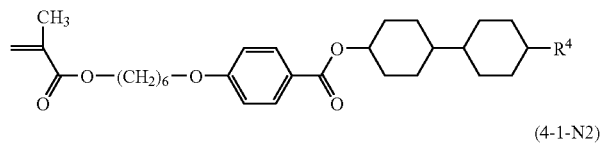
(4-1-N1)
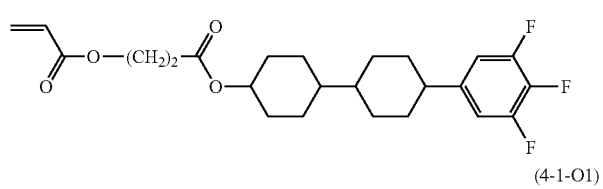
(4-1-N2)
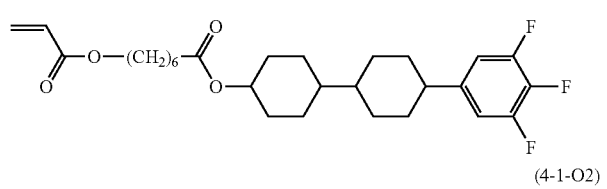
(4-1-O1)
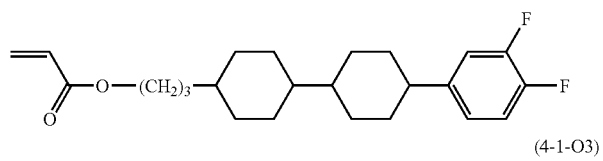
(4-1-O2)
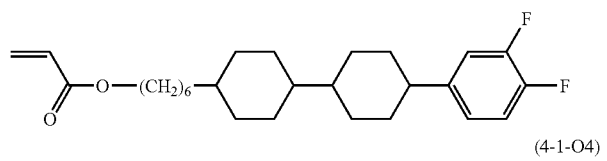
(4-1-O3)
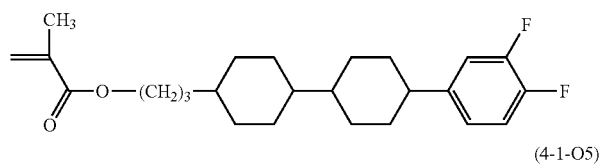
(4-1-O4)
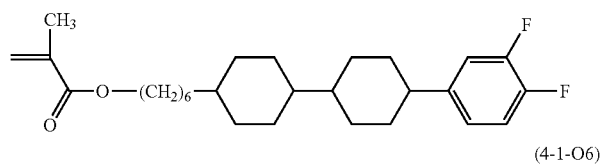
(4-1-O5)
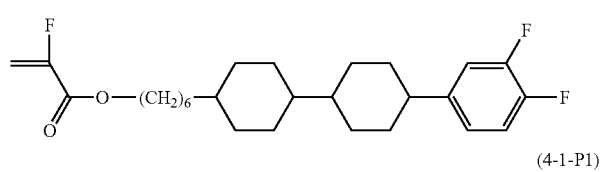
(4-1-O6)
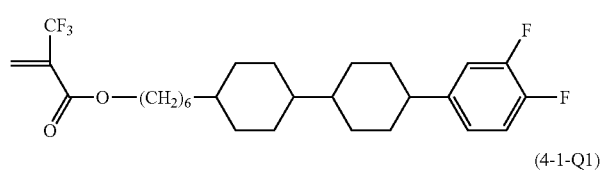
(4-1-P1)
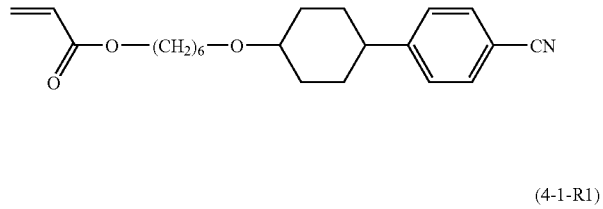
(4-1-Q1)
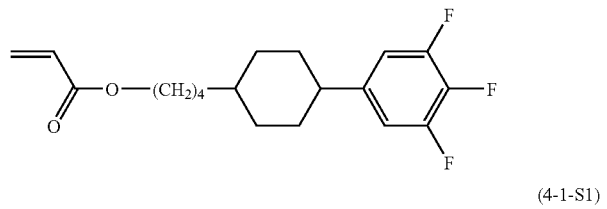
(4-1-R1)
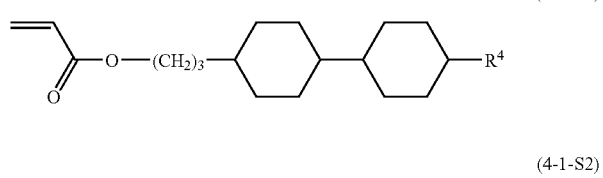
(4-1-S1)
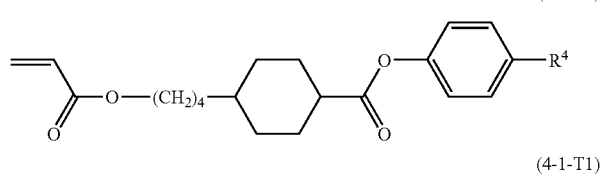
(4-1-S2)
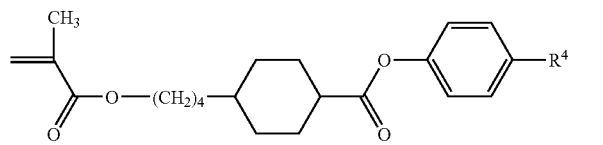
(4-1-T1)
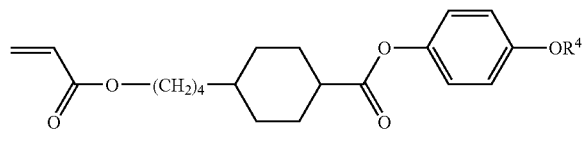

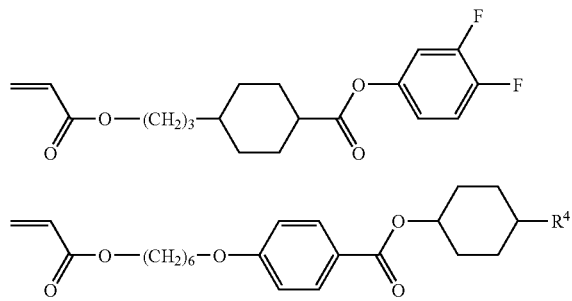

In the formulae (4-1-A1) to (4-1-V2), $R^4$ represents alkyl having from 1 to 12 carbon atoms or —$CF_3$.

The component E in the polymerizable liquid crystal composition of the invention is at least one selected from nonionic surfactants, the details of which are described below. Preferred examples of the nonionic surfactant include a silicone nonionic surfactant a fluorine nonionic surfactant and a hydrocarbon nonionic surfactant. Examples of the silicone nonionic surfactant include those containing modified silicone as a major component, e.g., Polyflow ATF-2, Glanol 100, Glanol 115, Glanol 400, Glanol 410, Glanol 435, Glanol 440, Glanol 450, Glanol B-1484, Polyflow KL-250, Polyflow KL-260, Polyflow KL-270 and Polyflow KL-280, available from Kyoeisha Chemical Co., Ltd., BYK-300, BYK-302, BYK-306, BYK-307, BYK-310, BYK-315, BYK-320, BYK-322, BYK-323, BYK-325, BYK-330, BYK-331, BYK-333, BYK-337, BYK-341, BYK-344, BYK-345, BYK-346, BYK-347, BYK-348, BYK-370, BYK-375, BYK-377, BYK-378, BYK-3500, BYK-3510 and BYK-3570.

Examples of the fluorine nonionic surfactant include BYK-340, Ftergent 251, Ftergent 221 MH, Ftergent 250, FTX-215M, FTX-218M, FTX-233M, FTX-245M, FTX-290M, FTX-209F, FTX-213F, Ftergent 222F, FTX-233F, FTX-245F, FTX-208G, FTX-218G, FTX-240G, FTX-206D, Ftergent 212D, FTX-218, FTX-220D, FTX-230D, FTX-240D, FTX-720C, FTX-740C, FTX-207S, FTX-211S, FTX-220S, FTX-230S, KB-L82, KB-L85, KB-L97, KB-L109, KB-L110, KB-F2L, KB-F2M, KB-F2S, KB-F3M and KB-FaM.

Examples of the hydrocarbon nonionic surfactant include those containing an acrylic polymer as a major component, e.g., Polyflow No. 3, Polyflow No. 50EHF, Polyflow No. 54N, Polyflow No. 75, Polyflow No. 77, Polyflow No. 85HF, Polyflow No. 90, Polyflow No. 95, BYK-350, BYK-352, BYK-354, BYK-355, BYK-358N, BYK-361N, BYK-380N, BYK-381, BYK-392 and BYK-Silclean3700.

"Polyflow" and "Glanol" are trade names of the products available from Kyoeisha Chemical Co., Ltd. "BYK" is a trade name of the products available from BYK Chemie Co., Ltd. "Ftergent", "FTX" and "KB" are trade names of the products available from Neos Co., Ltd.

Examples of the other polymerizable compound, the additive and the organic solvent are shown below. These compounds may commercially available products. The other polymerizable compound is a polymerizable compound that is different from the compound (1-1), the compound (2-1), the compounds (3-1) to (3-3) and the compound (4-1), as described above, and examples thereof include a compound having one polymerizable group, a compound having two polymerizable groups and a compound having three or more polymerizable groups.

Examples of the compound having one polymerizable group include styrene, nuclear-substituted styrene, acrylonitrile, vinyl chloride, vinylidene chloride, vinylpyridine, N-vinylpyrrolidone, vinylsulfonic acid, a vinyl fatty acid ester (such as vinyl acetate), an α,β-ethylenic unsaturated carboxylic acid (such as acrylic acid, methacrylic acid, maleic acid, fumaric acid and itaconic acid), an alkyl ester of (meth)acrylic acid (number of carbon atoms of the alkyl: 1 to 18), a hydroxyalkyl ester of (meth)acrylic acid (number of carbon atoms of the hydroxyalkyl: 1 to 18), an aminoalkyl ester of (meth)acrylic acid (carbon number of the aminoalkyl: 1 to 18), an ether oxygen-containing alkyl ester of (meth)acrylic acid (number of carbon atoms of the ether oxygen-containing alkyl: 3 to 18, such as methoxyethyl ester, ethoxyethyl ester, methoxypropyl ester, methylcarbyl ester, ethylcarbyl ester and butylcarbyl ester), N-vinylacetamide, vinyl p-t-butyl benzoate, vinyl N,N-dimethylaminobenzoate, vinyl benzoate, vinyl pivalate, vinyl 2,2-dimethylbutanoate, vinyl 2,2-dimethylpentanoate, vinyl 2-methyl-2-butanoate, vinyl propinoate, vinyl stearate, vinyl 2-ethyl-2-methylbutanoate, dicyclopentanyloxyethyl (meth)acrylate, isobornyloxyethyl (meth)acrylate, isobornyl (meth)acrylate, adamantyl (meth)acrylate, dimethyladamantyl (meth)acrylate, dicyclopentanyl (meth)acrylate, dicyclopentenyl (meth)acrylate, 2-acryloyloxyethylsuccinic acid, 2-acryloyloxyethylhexahydrophthalic acid, 2-acryloyloxyethylphthalic acid, 2-acryloyloxyethyl-2-hydroxyethylphthalic acid, 2-(meth)acryloyloxyethyl acid phosphate, a mono(meth)acrylate ester or a di(meth)acrylate ester of polyalkylene glycol having a polymerization degree of from 1 to 100, and a mono(meth)acrylate ester of polyalkylene glycol having a polymerization degree of from 1 to 100 having terminals capped with an alkyl group having from 1 to 6 carbon atoms. Examples of the polyalkylene glycol include polyethylene glycol, polypropylene glycol and a copolymer of ethylene oxide and propylene oxide.

Examples of the compound having two or more polymerizable groups include 1,4-butanediol diacrylate, 1,6-hexanediol diacrylate, 1,9-nonanediol diacrylate, neopentyl glycol diacrylate, dimethyloltricyclodecane diacrylate, triethylene glycol diacrylate, dipropylene glycol diacrylate, tripropylene glycol diacrylate, tetraethylene glycol diacrylate, bisphenol A ethylene oxide adduct diacrylate, bisphenol A glycidyl diacryalte (Biscoat V #700), polyethylene glycol diacryalte, methacrylate compounds of these compounds, and polymerizable bisphenol fluorenone derivatives having a cardo structure represented by the formulae (G-1) to (G-6). These compounds are suitable for enhancing the film forming capability of the polymer.

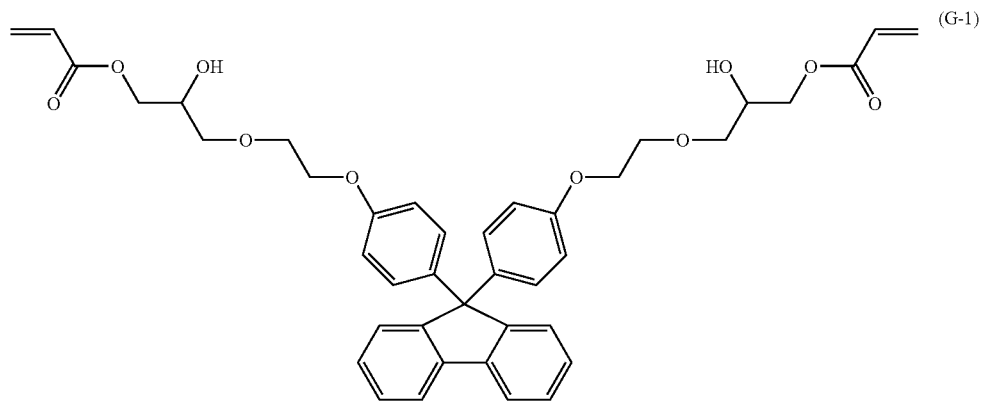
(G-1)
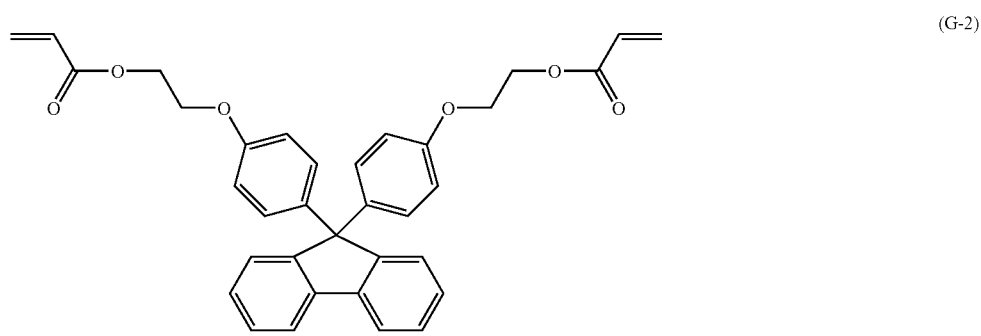
(G-2)
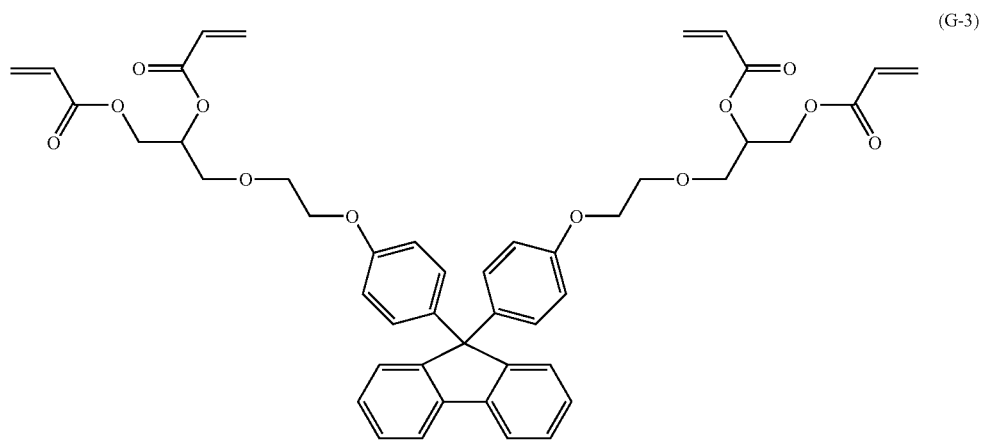
(G-3)
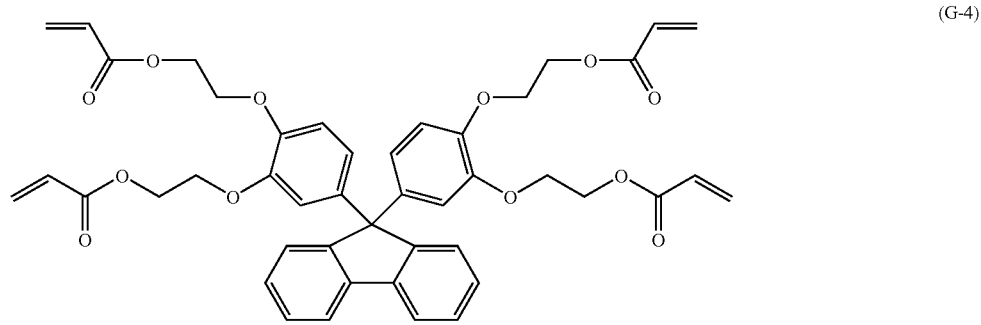
(G-4)

-continued

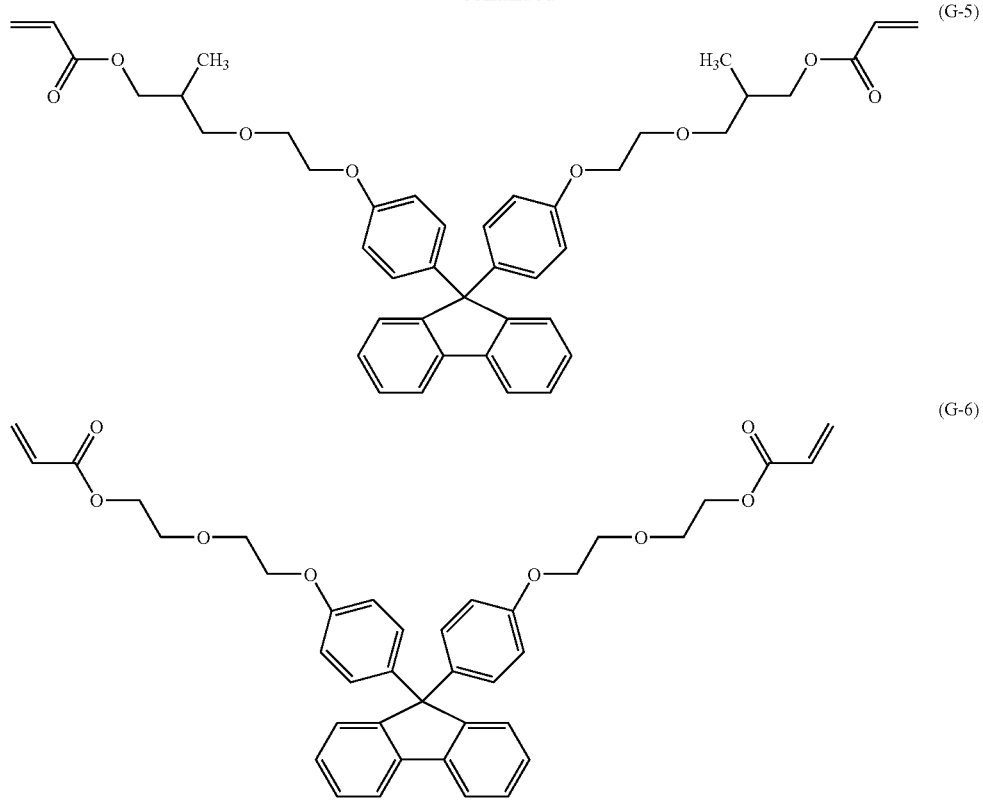

The polyfunctional compound is a non-liquid crystalline compound having from 3 to 70 polymerizable groups in one molecule. The compounds may be commercially available products. Preferred examples of the polyfunctional compound include pentaerythritol tri(meth)acrylate, trimethylolpropane tri(meth)acrylate, trimethylol ethylene oxide adduct tri(meth)acrylate, tris(meth)acryloyloxyethyl phosphate, tris ((meth)acryloyloxyethyl) isocyanurate, alkyl-modified dipentaerythritol (meth)acrylate, ethylene oxide-modified trimethylolpropane (meth)acrylate, propylene oxide-modified trimethylolpropane (meth)acrylate, pentaerythritol tetra (meth)acrylate, alkyl-modified dipentaerythritol tetra(meth) acrylate, ditrimethylolpropane tetra(meth)acrylate, dipentaerythritol hexa(meth)acrylate, dipentaerythritol monohydroxypenta(meth)acrylate, alkyl-modified dipentaerythritol penta(meth)acrylate, Biscoat V #802 (number of functional groups: 8) and Biscoat V #1000 (number of functional groups: 14 in average). "Biscoat" is a trade name of the products available from Osaka Organic Chemical Industry Ltd. The polyfunctional compound having 16 or more functional groups can be obtained by acrylating Boltorn H20 (number of functional groups: 16), Boltorn H30 (number of functional groups: 32) and Boltorn H40 (number of functional groups: 64), which are available from Perstorp Speciality Chemicals AB.

A known photopolymerization initiator may be used for optimizing the polymerization rate of the polymerizable liquid crystal composition. The amount of the photopolymerization initiator added is preferably from 0.0001 to 0.20, more preferably from 0.001 to 0.15, and further preferably from 0.01 to 0.15, in terms of a weight ratio based on the total amount of the components A to D. Examples of the photopolymerization initiator include 2-hydroxy-2-methyl-1-phenyl-propan-1-one (Darocure 1173), 1-hydroxycyclohexyl phenyl ketone, 2,2-dimethoxy-1,2-diphenylethan-1-one (Irgacure 651), 1-hydroxycyclohexyl phenyl ketone (Irgacure 184), Irgacure 127, Irgacure 500 (a mixture of Irgacure 184 and benzophenone), Irgacure 2959, Irgacure 907, Irgacure 369, Irgacure 379, Irgacure 754, Irgacure 1300, Irgacure 819, Irgacure 1700, Irgacure 1800, Irgacure 1850, Irgacure 1870, Darocure 4265, Darocure MBF, Darocure TPO, Irgacure 784, Irgacure 754, Irgacure OXE01, Irgacure OXE02. "Darocure" and "Irgacure" are trade names of the products available from Ciba Japan Co., Ltd. A known sensitizer may be added thereto, examples of which include isopropylthioxanthone, diethylthioxanthone, ethyl-4-dimethylaminobenzoate (Darocure EDB) and 2-ethylhexyl-4-dimethylaminobenzoate (Darocure EHA).

Examples of the photoradical polymerization initiator also include p-methoxyphenyl-2,4-bis(trichloromethyl)triazine, 2-(p-butoxystyryl)-5-trichloromethyl-1,3,4-oxadiazole, 9-phenylacridine, 9,10-benzphenazine, a mixture of benzophenone and Michler's ketone, a mixture of hexaarylbiimidazole and mercaptobenzimidazole, 1-(4-isopropylphenyl)-2-hydroxy-2-methylpropan-1-one, benzyldimethylketal, 2-methyl-1-(4-(methylthio)phenyl)-2-morpholinopropan-1-one, a mixture of 2,4-diethylxanthone and methyl p-dimethylaminobenzoate, and a mixture of benzophenone and methyltriethanolamine.

One or plural chain transfer agents may be added to the polymerizable liquid crystal composition to control the mechanical characteristics of the polymer. The use of a chain transfer agent enables to control the length of the polymer chain or the distance between two crosslinked polymer chains in the polymer film. These lengths can be controlled simultaneously. Increase of the amount of the chain transfer agent decreases the length of the polymer chain. Preferred examples of the chain transfer agent include a thiol compound. Examples of a monofunctional thiol compound include dodecanethiol and 2-ethylhexyl-(3-mercaptopropyonate). Examples of a polyfunctional thiol compound include trimethylolpropane tris(3-mercaptopropyonate), pentaerythritol tetrakis(3-mercaptopropyonate), 1,4-bis(3-mercaptobutyryloxy)butane (Karenz MT BD1), pentaerythritol tetrakis (3-mercaptobutyrate) (Karenz MT PE1), and 1,3,5-tris(3-mercaptobutyloxyethyl)-1,3,5-triazine-2,4,6(1H,3H,5H)-trione (Karenz MT NR1). "Karenz" is a trade name of the products available from Showa Denko Co., Ltd.

A polymerization inhibitor may be added to the polymerizable liquid crystal composition for preventing initiation of polymerization upon storing. A known polymerization inhibitor may be used, and preferred examples thereof include 2,5-di(t-butyl)hydroxytoluene (BHT), hydroquinone, Methylene Blue, diphenylpicric acid hydrazide (DPPH), benzothiadine, 4-nitrosodimethylaniline (NIDI) and o-hydroxybenzophenone.

An oxygen inhibitor may be added to the polymerizable liquid crystal composition for improving the storage stability thereof. A radical formed in the composition reacts with oxygen in the atmosphere to provide a peroxide radical, which accelerates unfavorable reaction with the polymerizable compound. An oxygen inhibitor is preferably added to prevent the phenomenon. Examples of the oxygen inhibitor include a phosphate ester compound.

In order to improve the weather resistance of the polymerizable liquid crystal composition, an ultraviolet ray absorbent, a light stabilizer (radical scavenger) and an antioxidant may be added. Examples of the ultraviolet ray absorbent include Tinuvin PS, Tinuvin P, Tinuvin 99-2, Tinuvin 109, Tinuvin 213, Tinuvin 234, Tinuvin 326, Tinuvin 328, Tinuvin 329, Tinuvin 384-2, Tinuvin 571, Tinuvin 900, Tinuvin 928, Tinuvin 1130, Tinuvin 400, Tinuvin 405, Tinuvin 460, Tinuvin 479, Tinuvin 5236, ADK STAB LA-32, ADK STAB LA-34, ADK STAB LA-36, ADK STAB LA-31, ADK STAB 1413 and ADK STAB LA-51. "Tinuvin" is a trade name of the products available from Ciba Japan Co., Ltd., and "ADK STAB" is a trade name of the products available from ADEKA Corporation.

Examples of the light stabilizer include Tinuvin 111FDL, Tinuvin 123, Tinuvin 144, Tinuvin 152, Tinuvin 292, Tinuvin 622, Tinuvin 770, Tinuvin 765, Tinuvin 780, Tinuvin 905, Tinuvin 5100, Tinuvin 5050, Tinuvin 5060, Tinuvin 5151, Chimassorb 119FL, Chimassorb 944FL, Chimassorb 944LD, ADK STAB LA-52, ADK STAB LA-57, ADK STAB LA-62, ADK STAB LA-67, ADK STAB LA-63P, ADK STAB LA-68LD, ADK STAB LA-77, ADK STAB LA-82, ADK STAB LA-87, Cyasorb UV-3346, available from Nihon Cytec Industries Inc., and Good-rite UV-3034, available from Goodrich Corp. "Chimassorb" is a trade name of a commercial product available from Ciba Japan Co., Ltd.

Examples of the antioxidant include ADK STAB AO-20, AO-30, AO-40, AO-50, AO-60 and AO-80 available from ADEKA, Sumilizer BHT, Sumilizer BBM-S and Sumilizer GA-80, available from Sumitomo Chemical Co., Ltd., and Irganox 1076, Irganox 1010, Irganox 3114 and Irganox 245, available from Ciba Japan Co., Ltd. These commercially available products may be used in the invention.

A silane coupling agent may be added to the polymerizable liquid crystal composition for controlling adhesion to the substrate. Specific examples of the silane coupling agent include vinyltrialkoxysilane, 3-isocyanatepropyltrialkoxysilane, N-(2-aminoethyl)-3-aminopropyltrialkoxysilane, 3-triethoxysilyl-N-(1,3-dimethylbutilydene)propylamine, 3-glycidoxypropyltrialkoxysilane, 3-chlorotrialkoxysilane, 3-acryloxypropyltrimethoxysilane and 3-methacryloxypropyltrialkoxysilane. Examples thereof also include dialkoxymethylsilane compounds obtained by replacing one of the three alkoxy groups of these compounds by methyl.

The polymerizable liquid crystal composition may be coated as it is on the surface of the substrate. However, in general, for facilitating the coating operation, the polymerizable liquid crystal composition is diluted with a solvent, or in alternative, the components of the polymerizable liquid crystal composition are each dissolved in a solvent, thereby preparing a solution of the polymerizable liquid crystal composition containing the polymerizable liquid crystal composition and the solvent, and the solution is coated. A solvent may be used solely or as a mixture of two or more thereof. Examples of the solvent include an ester solvent, an amide solvent, an alcohol solvent, an ether solvent, a glycol monoalkyl ether solvent, an aromatic hydrocarbon solvent, a halogenated aromatic hydrocarbon solvent, an aliphatic hydrocarbon solvent, a halogenated aliphatic hydrocarbon solvent, an alicyclic hydrocarbon solvent, a ketone solvent and an acetate solvent.

Preferred examples of the ester solvent include alkyl acetate (such as methyl acetate, ethyl acetate, propyl acetate, isopropyl acetate, butyl acetate, 3-methoxybutyl acetate, isobutyl acetate, pentyl acetate and isopentyl acetate), ethyl trifluoroacetate, alkyl propionate (such as methyl propionate, methyl 3-methoxypropyonate, ethyl propionate, propyl propionate and butyl propionate), alkyl butyrate (such as methyl butyrate, ethyl butyrate, butyl butyrate, isobutyl butyrate and propyl butyrate), dialkyl malonate (such as diethyl malonate), alkyl glycolate (such as methyl glycolate and ethyl glycolate), alkyl lactate (such as methyl lactate, ethyl lactate, isopropyl lactate, n-propyl lactate, butyl lactate and ethylhexyl lactate), monoacetin, γ-butyrolactone and γ-valerolactone.

Preferred examples of the amide solvent include N-methyl-2-pyrrolidone, N,N-diemthylacetamide, N-methylpropyonamide, N,N-dimethylormamide, N,N-diethylformamide, N,N-diethylacetamide, N,N-diemthylacetamide dimethylacetal, N-methylcaprolactam and dimethylimidazolidinone.

Preferred examples of the alcohol solvent include methanol, ethanol, 1-propanol, 2-propanol, 1-methoxy-2-propanol, t-butyl alcohol, sec-butyl alcohol, butanol, 2-ethylbutanol, n-hexanol, n-heptanol, n-octanol, 1-dodecanol, ethylhexanol, 3,5,5-trimethylhexanol, n-amyl alcohol, hexafluoro-2-propanol, glycerin, ethylene glycol, diethylene glycol, triethylene glycol, tetraethylene glycol, propylene glycol, dipropylene glycol, tripropylene glycol, hexylene glycol, 1,3-butanediol, 1,4-butanediol, 2,3-butanediol, 1,5-pentanediol, 2,4-pentanediol, 2,5-hexanediol, 3-methyl-3-methoxybutanol, cyclohexanol and methylcyclohexanol.

Preferred examples of the ether solvent include ethylene glycol dimethyl ether, diethylene glycol dimethyl ether, bis (2-propyl)ether, 1,4-dioxane, cyclopentyl methyl ether, terpinyl methyl ether, dihydroterpinyl methyl ether, 1,8-cineole, 1,4-cineole and tetrahydrofuran (THF).

Preferred examples of the glycol monoalkyl ether solvent include ethylene glycol monoalkyl ether (such as ethylene glycol monomethyl ether and ethylene glycol monobutyl ether), diethylene glycol monoalkyl ether (such as diethylene glycol monoethyl ether), triethylene glycol monoalkyl ether, propylene glycol monoalkyl ether (such as propylene glycol monobutyl ether), dipropylene glycol monoalkyl ether (such as dipropylene glycol monomethyl ether), ethylene glycol monoalkyl ether acetate (such as ethylene glycol monobutyl ether acetate), diethylene glycol monoalkyl ether acetate (such as diethylene glycol monoethyl ether acetate), triethylene glycol monoalkyl ether acetate, propylene glycol monoalkyl ether acetate (such as propylene glycol monomethyl ether acetate, propylene glycol monoethyl ether acetate and propylene glycol monobutyl ether acetate), dipropylene glycol monoalkyl ether acetate (such as dipropylene glycol monomethyl ether acetate), and diethylene glycol methyl ethyl ether.

Preferred examples of the aromatic hydrocarbon solvent include benzene, toluene, xylene, mesitylene, ethylbenzene, diethylbenzene, i-propylbenzene, n-propylbenzene, tert-butylbenzene, sec-butylbenzene, n-butylbenzene, anisole, p-cymene, limonene, terpinolene and tetralin. Preferred examples of the halogenated aromatic hydrocarbon solvent include chlorobenzene. Preferred examples of the aliphatic hydrocarbon solvent include hexane and heptane. Preferred examples of the halogenated aliphatic hydrocarbon solvent include chloroform, dichloromethane, carbon tetrachloride, dichloroethane, trichloroethylene and tetrachloroethylene. Preferred examples of the alicyclic hydrocarbon solvent include cyclohexane and decalin.

Preferred examples of the ketone solvent include acetone, methyl ethyl ketone, methyl isobutyl ketone, cyclohexanone, cyclopentanone, dihydrocarvone, menthone, piperitenone and methyl propyl ketone.

Preferred examples of the acetate solvent include ethylene glycol monomethyl ether acetate, propylene glycol monomethyl ether acetate, propylene glycol monoethyl acetate, methyl acetoacetate, α-terpinyl acetate, perillyl acetate, 3-octyl acetate, 2-octyl acetate, myrtenyl acetate, isobornyl acetate, dihydroterpinyl acetate, dihydrocarbyl acetate, carbyl acetate and 1-methoxy-2-propyl acetate.

An amide solvent, an aromatic hydrocarbon solvent and a ketone solvent are preferably used from the standpoint of solubility of the polymerizable liquid crystal compounds, and an ester solvent, an alcohol solvent, an ether solvent and a glycol monoalkyl ether solvent are also preferably used in combination therewith from the standpoint of the boiling point of the solvent. There is no particular limitation on selecting the solvent. In the case where a plastic substrate is used as the supporting substrate, it is necessary to lower the drying temperature to prevent the substrate from being deformed, and is also necessary to prevent the substrate from being damaged with the solvent. Preferred examples of the solvent used in this case include an aromatic hydrocarbon solvent, a ketone solvent, an ester solvent, an ether solvent, an alcohol solvent, an acetate solvent and a glycol monoalkyl acetate solvent.

The ratio of the solvent in the solution of the polymerizable liquid crystal composition is generally from 50 to 95% based on the total weight of the solution. The lower limit is determined in consideration of the solubility of the polymerizable liquid crystal compounds and the optimum viscosity upon coating the solution. The upper limit is determined in consideration of the economical issues, such as the cost for the solvent and the time and amount of heat necessary for evaporating the solvent. The ratio of the solvent is preferably from 60 to 90%, and more preferably from 70 to 85%.

In the following description, a liquid crystal film of the invention obtained from the polymerizable liquid crystal composition may be referred simply to as a liquid crystal film in some cases. The liquid crystal film can be produced in the following manner. The solution of the polymerizable liquid crystal composition is coated on a supporting substrate, and then dried to form a coated film. The coated film is then irradiated with light to polymerize the polymerizable liquid crystal composition, thereby fixing the nematic alignment formed by the composition in a liquid crystal state in the coated film. Examples of the supporting substrate that can be used herein include glass and a plastic film. Examples of the plastic film include films of polyimide, polyamideimide, polyamide, polyetherimide, polyetheretherketone, polyetherketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, an acrylic resin, polyvinyl alcohol, polypropylene, cellulose, triacetyl cellulose, a partially saponified product of triacetyl cellulose, an epoxy resin, a phenol resin and a cycloolefin resin.

Examples of the cycloolefin resin include a norbornene resin and a dicyclopentadiene resin, but the invention is not limited thereto. Among these, those having no unsaturated bond or having unsaturated bonds that have been hydrogenated are preferably used. Examples thereof include a hydrogenated product of a ring-opening (co)polymer of one or plural kinds of norbornene monomers, an addition (co)polymer of one or plural kinds of norbornene monomers, an addition copolymer of a norbornene monomer and an olefin monomer (such as ethylene and an α-olefin), an addition copolymer of a norbornene monomer and a cycloolefin monomer (such as cyclopentene, cyclooctene and 5,6-dihyroxycyclopentadiene), and modified products thereof. Specific examples thereof include Zeonex and Zeonor (available from Nippon Zeon Corp.), Arton (available from JSR Corporation), TOPAS (available from Ticona, Inc.), Apel (available from Mitsui Chemicals, Inc.), Escena (available from Sekisui Chemical Co., Ltd.) and Optorez (available from Hitachi Chemical Co., Ltd.).

The plastic film may be a uniaxially stretched film or a biaxially stretched film. The plastic film may be subjected to a surface treatment, such as a hydrophilic treatment, e.g., a corona treatment and a plasma treatment, and a hydrophobic treatment. While the method for the hydrophilic treatment is not particularly limited, a corona treatment and a plasma treatment are preferred, and a plasma treatment is particularly preferred. The plasma treatment can be effected by a method disclosed, for example, in JP-A-2002-226616 and JP-A-2002-121648. An anchor coating layer may be formed for improving adhesion between the liquid crystal film and the plastic film. The anchor coating layer may be formed of an inorganic material or an organic material as far as the layer improves adhesion between the liquid crystal film and the plastic film. The plastic film may be a laminated film. Instead of the plastic film, a metallic substrate, such as aluminum, iron and copper, having slit grooves formed on the surface thereof, and a glass substrate, such as alkali glass, borosilicate glass and flint glass, having been etched to form grooves in a slit form may also be used.

The supporting substrate, such as the glass substrate and the plastic film, is subjected to a physical or mechanical surface treatment, such as rubbing, before forming a coated film of the polymerizable liquid crystal composition. The rubbing treatment may be carried out by an arbitrary method, and in general, the following methods may be employed. A rubbing cloth formed of such a material as rayon, cotton or polyamide is wound on a metallic roll or the like, and the roll is rotated and moved in a state where the roll is in contact with the supporting substrate or the polymer film, or the supporting substrate is moved with the rotated roll staying. The rubbing treatment may be carried out directly on the supporting substrate, or on the plastic film that is formed on the supporting substrate in advance. Depending on the species of the supporting substrate, the surface of the substrate may be enhanced in wettability by performing a corona treatment or a plasma treatment in advance. In this case, the treatment is preferably performed before performing the rubbing treatment.

Examples of a coating method for obtaining a coated film having a uniform thickness upon coating the polymerizable liquid crystal composition or a solution thereof include a spin coating method, a microgravure coating method, a gravure coating method, a wire bar coating method, a dip coating method, a spray coating method, a meniscus coating method and a die coating method. In particular, a wire bar coating method and the like, in which a shearing force is applied to the liquid crystal composition upon coating, may be employed in the case where the alignment of the liquid crystal composition is controlled without a surface treatment, such as rubbing, on the substrate.

Upon preparing the solution of the polymerizable liquid crystal composition, the nonionic surfactant may be used after dissolving with a solvent. The solvent is selected from such solvents that have sufficient solubility with the polymerizable liquid crystal compounds and do not impair the uniformity of the homogeneous alignment state of the polymerizable liquid crystal composition, which is an advantage of the invention. Examples of the solvent include those solvents that have been described for preparation of the solution of the polymerizable liquid crystal composition. The amount of the solvent used may be set within such a range that the stability of the polymerizable liquid crystal composition is not impaired.

Upon coating the solution of the polymerizable liquid crystal composition of the invention, the solvent is removed after coating to form a polymerizable liquid crystal layer, i.e., a layer of the polymerizable liquid crystal composition, having a uniform thickness on the supporting substrate. The conditions for removing the solvent are not particularly limited, and the coated film may be dried to such an extent that the solvent has been substantially removed, and the coated film of the polymerizable liquid crystal composition loses flowability. The solvent can be removed by air drying at room temperature, drying with a hot plate, drying in a drying furnace, blowing warm air or hot air, or the like. The polymerizable liquid crystal composition in the coated film may complete a nematic alignment during the drying operation of the coated film in some cases, depending on the kinds and the compositional ratios of the compounds used in the polymerizable liquid crystal composition. In this case, accordingly, the coated film after completing the drying step can be subjected to a polymerizing step without subjecting to a heat-treating step described later.

Preferred ranges of the conditions, such as the temperature and time for the heat treatment of the coated film, the wavelength of light used for light irradiation, the amount of light radiated from a light source, vary depending on the kinds and compositional ratios of the compounds used in the polymerizable liquid crystal composition, the presence or absence and the addition amount of the photopolymerization initiator, and the like. Accordingly, the conditions including the temperature and time for the heat treatment of the coated film, the wavelength of light used for light irradiation, and the amount of light radiated from a light source described later are considered to be approximate ranges.

The heat treatment of the coated film is preferably carried out under such conditions that the solvent is removed, and a homogeneous alignment of the polymerizable liquid crystal is obtained. The heat treatment may be carried out at a temperature higher than the liquid crystal phase transition temperature of the polymerizable liquid crythtal composition.

One example of the heat-treating method is a method of heating the coated film to a temperature where the polymerizable liquid crystal composition exhibits a nematic liquid crystal phase, whereby the polymerizable liquid crystal composition in the coated film forms a nematic alignment. A nematic alignment may be formed by changing the temperature of the coated film within a temperature range where the polymerizable liquid crystal composition exhibits a nematic liquid crystal phase. In this method, the coated film is heated to a high temperature region within the aforementioned temperature range to complete substantially a nematic alignment of the coated film, and then the temperature is decreased to make an alignment with higher regularity. In both cases using the heat-treating methods, the heat-treating temperature may be from room temperature to 120° C., preferably room temperature to 100° C., more preferably from room temperature to 90° C., and further preferably from room temperature to 85° C. The heat-treating time is generally from 5 seconds to 2 hours, preferably from 10 seconds to 40 minutes, and more preferably from 20 seconds to 20 minutes. In order to increase the temperature of the layer containing the polymerizable liquid crystal composition to the prescribed temperature, the heat-treating time is preferably 5 seconds or more. In order to prevent the productivity from being deteriorated, the heat-treating time is preferably 2 hours or less. The polymerizable liquid crystal layer of the invention is thus completed in this manner.

The nematic alignment state of the polymerizable liquid crystal compounds formed in the polymerizable liquid crystal layer is fixed by polymerizing the polymerizable liquid crystal composition through irradiation of light. The wavelength of the light used for the light irradiation is not particularly limited, and an electron beam, an ultraviolet ray, a visible ray, an infrared ray (heat ray) and the like may be used. In general, an ultraviolet ray or a visible ray may be used. The wavelength is generally in a range of from 150 to 500 nm, preferably in a range of from 250 to 450 nm, and more preferably in a range of from 300 to 400 nm. Examples of the light source include a low pressure mercury lamp (such as a bactericidal lamp, a fluorescent chemical lamp and a black light lamp), a high pressure discharge lamp (such as a high pressure mercury lamp and a metal halide lamp), and a short arc discharge lamp (such as a super high pressure mercury lamp, a xenon lamp and a mercury xenon lamp). Preferred examples of the light source include a metal halide lamp, a xenon lamp, a super high pressure mercury lamp and a high pressure mercury lamp. The wavelength range of the light source used for irradiation may be selected by inserting a filter between the light source and the polymerizable liquid crystal layer to pass the specific wavelength range. The amount of light radiated from the light source is generally from 2 to 5,000 mJ/cm$^2$, preferably from 10 to 3,000 mJ/cm$^2$, and more preferably from 100 to 2,000 mJ/cm$^2$. The temperature condition upon irradiation of light is preferably set similarly to the heat-treating temperature. The atmosphere upon polymerization may be any of a nitrogen atmosphere, an inert gas atmosphere and an air atmosphere, and a nitrogen atmosphere and an inert gas atmosphere are preferred from the standpoint of enhancement of the curing property.

In the case where the polymerizable liquid crystal layer of the invention and a liquid crystal film obtained by polymerizing it through light or heat are used in various optical devices, and in the case where they are used as an optical compensation device used in a liquid crystal display device, it is considerably important to control the distribution of the tilt angle thereof in the thickness direction.

In a homogeneous alignment, the tilt angle is close to 0°, and particularly is distributed from 0 to 5° over the substrate interface to the free interface. This alignment state is obtained by forming a coated film by using the polymerizable liquid crystal composition of the invention that contains the component A, which is at least one of the compound (1-1), the component B, which is at least one of the compound (2-1), and the component E, which is at least one of the nonionic surfactant, as essential components, and a coated film of the composition is formed on the surface of the supporting substrate. For providing a uniform homogeneous alignment in the invention, it is preferred to use the component A in a ratio of from 10 to 60% by weight in the mixture of polymerizable liquid crystal compounds as described above. Particularly preferred examples of the compound (1-1) include the compounds (1-1-A1) and (1-1-A2). The ratio of from 1 to 20% by weight for the preferred ratio of the component B is also determined owing to the same factors. Particularly preferred examples of the compound (2-1) include the compounds (2-1-A1), (2-1-A2), (2-1-D1), (2-1-D2), (2-1-G1) and (2-1-G2). The ratio of the component E is preferably from 0.0001 to 0.03 in terms of weight ratio based on the mixture of polymerizable compounds. Preferred examples of the nonionic surfactant include a fluorine nonionic surfactant, a silicone nonionic surfactant and a hydrocarbon nonionic surfactant.

In the case where a uniform homogeneous alignment is difficult to be provided due to a tilted alignment tendency strengthened depending on the kinds of the polymerizable liquid crystal compounds and the composition of the polymerizable liquid crystal composition, a uniform homogeneous alignment can be obtained through such optimization as increase of the amount of the component C and increase of the amount of the component E.

The ratios of the component A and the component B used are adjusted for controlling the birefringence. A polymerizable liquid crystal layer having a low birefringence is liable to be provided by increasing the ratios, and a polymerizable liquid crystal layer having a high birefringence is liable to be provided by decreasing the ratios.

A suitable thickness of the liquid crystal film varies depending on the retardation and the birefringence of the liquid crystal film corresponding to the target device. Therefore, the suitable range thereof cannot be determined strictly and may be generally from 0.05 to 50 µm, preferably from 0.1 to 20 µm, and more preferably from 0.5 to 10 µm. The liquid crystal film preferably has a haze of 1.5% or less, and more preferably 1.0% or less, and a transmittance of 80% or more, and more preferably 95% or more. The conditions of transmittance are preferably satisfied in the visible ray region.

The liquid crystal film can be effectively utilized as an optical compensation device applied to a liquid crystal display device (particularly, a liquid crystal display device of an active matrix type or a passive matrix type). Examples of the type of the liquid crystal display device, to which the liquid crystal film is suitably applied as an optical compensation film, include an IPS (in-plane switching) type, a display having switch in an optically isotropic phase (described, for example, in WO 02/93244), a TN (twisted nematic) type, an STN (super twisted nematic) type, an ECB (electrically controlled birefringence) type, a DAP (deformation of aligned phases) type, a CSH (color super homeotropic) type, a VA (vertical alignment) type, a VAN/VAC (vertically aligned nematic/cholesteric) type, an MVA (multi-domain vertical alignment) type, a PVA (patterned vertical alignment) type, an OCB (optically compensated birefringence) type, an R-OCB (reflective optically compensated birefringence) type, an HAN (hybrid aligned nematic) type, an OMI (optical mode interference) type and SBE (super birefringence effect) type. Furthermore, the liquid crystal film can be used as a phase retarder for a display device of a guest-host type, a ferroelectric type, antiferroelectric type or the like. Preferred examples of the type of the liquid crystal display device include a TN type, an STN type, a VA type and an IPS type, and particularly an active matrix type display. The optimum values of the parameters demanded for the anisotropic polymer, such as the distribution of tilt angle in the thickness direction and the thickness, strongly depend on the kind and the optical parameters of the liquid crystal display device that is to be compensated, and thus vary depending on the kind of the device.

The liquid crystal film can be used as an optical device having a polarizing plate and the like integrated therewith, and in this case, the liquid crystal film is disposed outside the liquid crystal cell. The liquid crystal film as an optical compensation device can be disposed inside the liquid crystal cell since it suffers no or less elution of impurities into the liquid crystal charged in the cell. For example, by applying the techniques disclosed in JP-A-2006-285014, the polymerizable liquid crystal layer of the invention can be formed on a color filter to enhance the function of the color filter.

EXAMPLES

The invention will be described in more detail below with reference to Examples, but the invention is not construed as being limited to the examples. Evaluation methods used in the Examples are shown below. The term "polymerizable liquid crystal composition" in the Examples means the solution of the polymerizable liquid crystal composition.

<Polymerization Conditions>

A polymerizable composition was irradiated with light having an intensity of 30 mW/cm$^2$ (365 nm) by using a 250 W super high pressure mercury lamp at room temperature under a nitrogen atmosphere for 30 seconds.

<Preparation of Glass Substrate with Rubbed Alignment Film>

An alignment agent for a low pre-tilt angle (horizontal alignment mode) (Lixon Aligner PIA-5310 or PIA-5370, available from Chisso Corporation) was spin-coated on a glass substrate having a thickness of 1.1 mm, and after removing the solvent by heating, the coated film was baked at 210° C. for 30 minutes and then subjected to a rubbing treatment.

<Confirmation of Alignment State of Liquid Crystal>

The substrate having the liquid crystal film was observed with a polarization microscope to confirm the presence of alignment defects.

<Measurement with Ellipsometer>

The substrate having the liquid crystal film was irradiated with light having a wavelength of 550 nm with Optipro Ellipsometer, available from Shintech Co., Ltd. The retardation was measured by decreasing the incident angle of the light with respect to the film surface from 90°. The retardation is expressed by $\Delta n \times d$, wherein $\Delta n$ represents the optical anisotropy, and d represents the thickness of the polymer film.

<Measurement of Thickness of Film>

A glass substrate having a liquid crystal film formed thereon was ground for only the liquid crystal film, and the step thus formed was measured with a minute shape measuring apparatus (Alfastep IQ, available from KLA-Tencor Corporation).

<Evaluation of Birefringence (Δn)>
A liquid crystal film having a homogeneous alignment was measured for retardation and thickness, and the birefringence was calculated as a value obtained by dividing a retardation by the thickness.
The compounds used in the Examples are shown below.
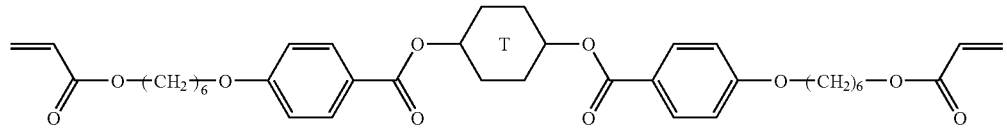
(1-1-A2)
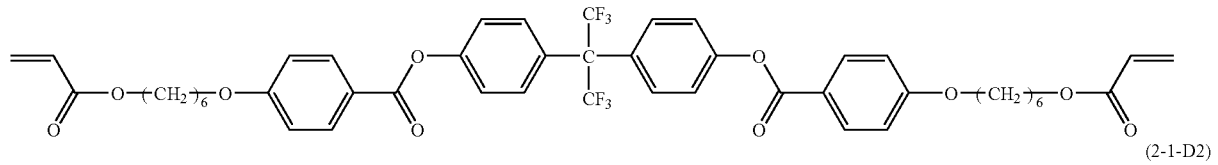
(2-1-A2)
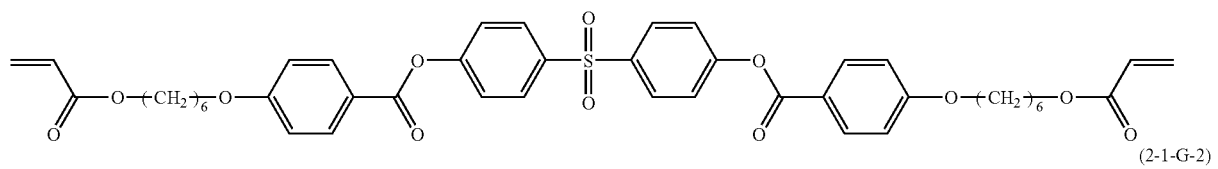
(2-1-D2)
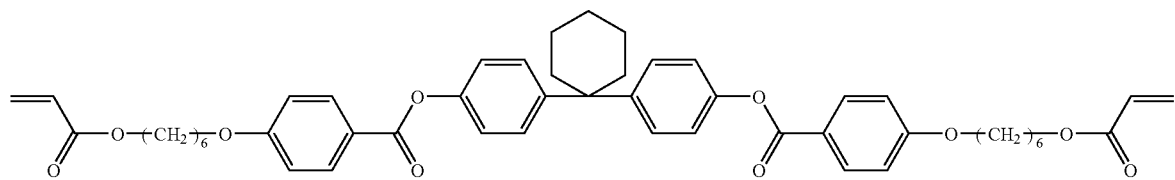
(2-1-G-2)
In the formula (1-1-A2), T represents triptycen-1,4-diyl.
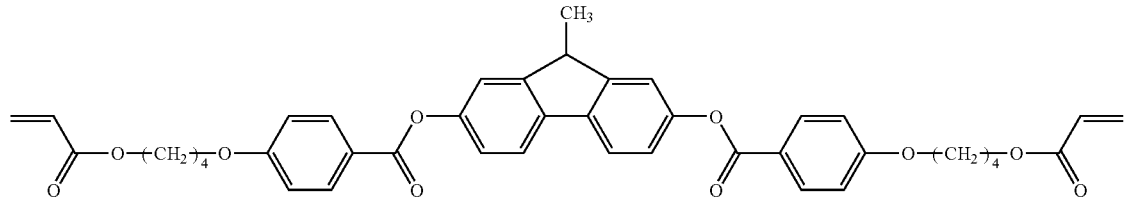
(3-1-A1)
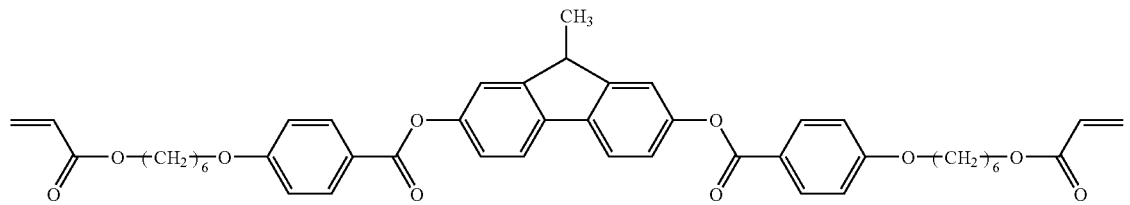
(3-1-A3)
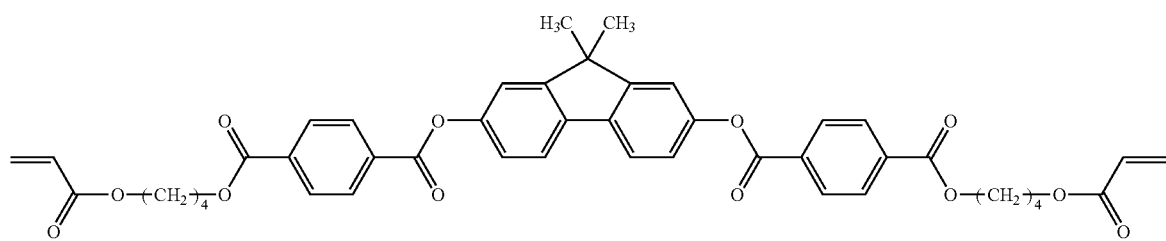
(3-1-F1)

-continued

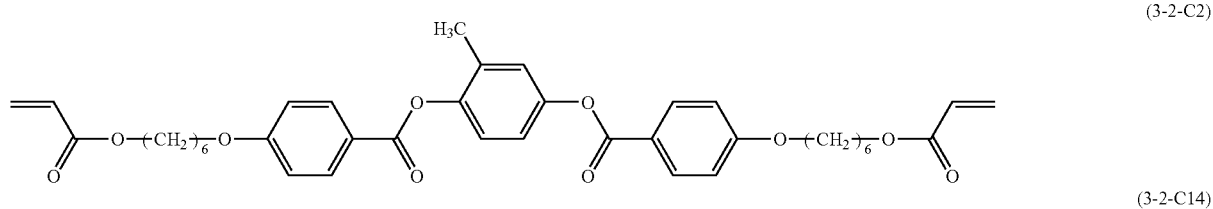
(3-2-C2)

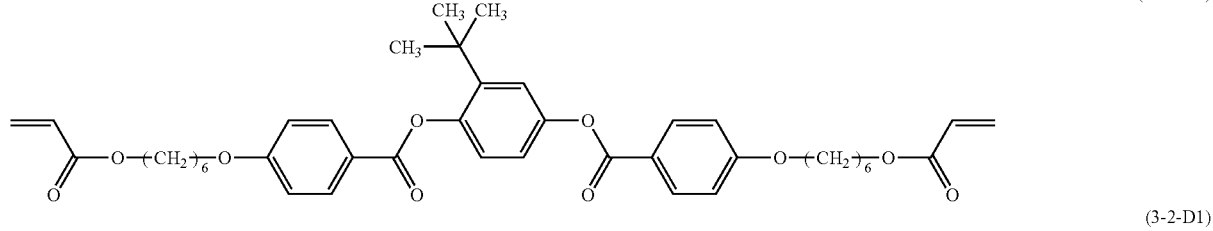
(3-2-C14)

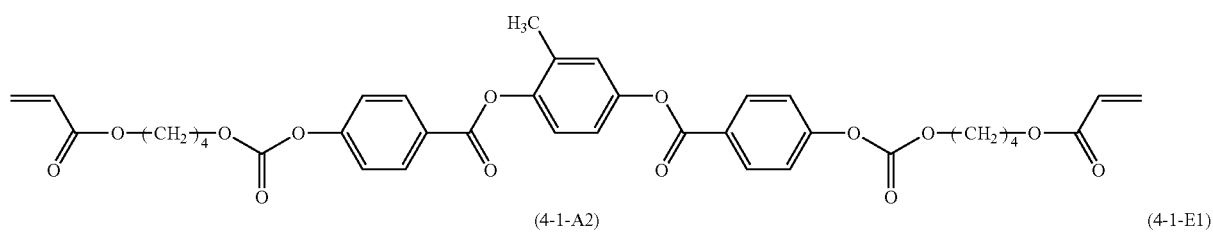
(3-2-D1)

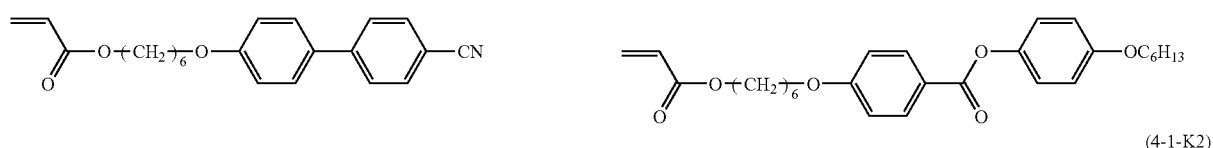
(4-1-A2)  (4-1-E1)

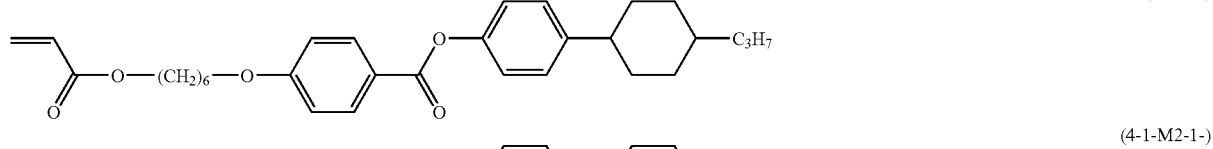
(4-1-K2)

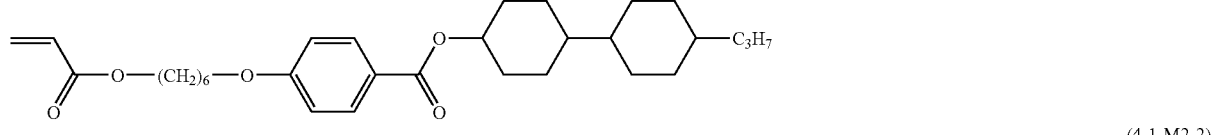
(4-1-M2-1-)

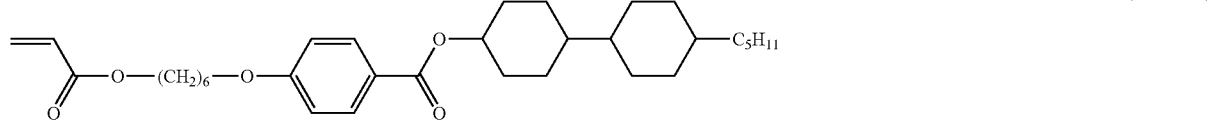
(4-1-M2-2)

The compound (1-1-A2) was synthesized according to the method disclosed in JP-A-2006-111571.

The compounds (2-1-A2) and (2-1-D2) were synthesized according to the method disclosed in JP-A-2007-16213.

The compound (2-1-G2) was synthesized according to the method disclosed in JP-A-2008-133344.

The compounds (3-1-A1) and (3-1-A3) were synthesized according to the method disclosed in JP-A-2003-238491.

The compound (3-1-F1) was synthesized according to the method disclosed in WO 2008/136265.

The compounds (3-2-C2) and (3-2-C14) were synthesized according to the method disclosed in Makromol. Chem., vol. 190, pp. 2255-2268 (1989).

The compound (3-2-D1) was synthesized according to the method disclosed in WO 97/00600.

The compound (4-1-A2) was synthesized according to the method disclosed in Macromolecules, vol. 26, pp. 6132-6134 (1993).

The compound (4-1-E1) was synthesized according to the method disclosed in Macromol. Chem., vol. 179, pp. 273-276 (1978).

The compounds (4-1-K2), (4-1-M2-1) and (4-1-M2-2) were synthesized according to the method disclosed in WO 97/34862.

The polymerization initiators, Irgacure 907 and Irgacure 369, were the products available from Ciba Japan Co., Ltd.

Example 1

Preparation of Polymerizable Liquid Crystal Composition (1)

The compounds (1-1-A2), (2-1-D2), (3-1-A3) and (4-1-A2) were mixed at a ratio (1-1-A2)/(2-1-D2)/(3-1-A3)/(4-1-A2)=40/10/25/25 by weight. The resulting mixture was designated as MIX 1. A fluorine nonionic surfactant (Ftergent FTX-218, available from Neos Co., Ltd.) in a weight ratio of 0.002 and a polymerization initiator (Irgacure 907) in a weight ratio of 0.03 were added to MIX 1. Cyclopentanone was added to the resulting composition to prepare a polymerizable liquid crystal composition (1) having a solvent ratio of 80% by weight.

Polyamic acid for a low pre-tilt angle (horizontal alignment mode) (Lixon Aligner PIA-5310, available from Chisso Corporation) was coated on a glass substrate (S-1112, available from Matsunami Glass Industries, Ltd.), and after drying at 80° C. for 3 minutes, the coated film was baked at 210° C. for 30 minutes, and then subjected to a rubbing treatment. The polymerizable liquid crystal composition (1) was coated by a spin coating method on the glass substrate having the rubbed polyamic acid film. The substrate was heated to 80° C. for 3 minutes and cooled at room temperature for 3 minutes, and the coated film, from which the solvent was removed, was polymerized with an ultraviolet ray under a nitrogen stream to provide a liquid crystal film. The observation of the liquid crystal film revealed that the liquid crystal film had a uniform alignment without alignment defect. The measurement of retardation of the film provided the results shown in FIG. 1, which revealed a homogeneous alignment. The measured retardation value at 90° with respect to the film surface was 117 nm, and the thickness was 975 nm. Accordingly, the birefringence Δn calculated was 0.12.

Example 2

Preparation of Polymerizable Liquid Crystal Composition (2)

A polymerizable liquid crystal composition (2) was prepared in the same manner as in Example 1 except that the compounds (1-1-A2), (2-1-A2), (3-1-A3) and (3-1-A1) were mixed at a ratio (1-1-A2)/(2-1-A2)/(3-1-A3)/(3-1-A1)=35/5/30/30 by weight to prepare MIX 2. A liquid crystal film was produced in the same manner as in Example 1 except that the polymerizable liquid crystal composition (2) was used, and the liquid crystal film had a uniform homogeneous alignment without alignment defect. The measurement of retardation of the film revealed a homogeneous alignment having the same tendency as in FIG. 1. The birefringence Δn of the liquid crystal film was 0.15.

Example 3

Preparation of Polymerizable Liquid Crystal Composition (3)

A polymerizable liquid crystal composition (3) was prepared in the same manner as in Example 1 except that the compounds (1-1-A2), (2-1-D2) and (3-1-A3) were mixed at a ratio (1-1-A2)/(2-1-D2)/(3-1-A3)=40/5/55 by weight to prepare MIX 3. A liquid crystal film was produced in the same manner as in Example 1 except that the polymerizable liquid crystal composition (3) was used, and the liquid crystal film had a uniform homogeneous alignment without alignment defect. The measurement of retardation of the film revealed a homogeneous alignment having the same tendency as in FIG. 1. The birefringence Δn of the liquid crystal film was 0.14.

Example 4

Preparation of Polymerizable Liquid Crystal Composition (4)

A polymerizable liquid crystal composition (4) was prepared in the same manner as in Example 1 except that the compounds (1-1-A2), (2-1-A2), (3-2-C2) and (3-2-D1) were mixed at a ratio (1-1-A2)/(2-1-A2)/(3-2-C2)/(3-2-D1)=35/5/30/30 by weight to prepare MIX 4. A liquid crystal film was produced in the same manner as in Example 1 except that the polymerizable liquid crystal composition (4) was used, and the liquid crystal film had a uniform homogeneous alignment without alignment defect. The measurement of retardation of the film revealed a homogeneous alignment having the same tendency as in FIG. 1. The birefringence Δn of the liquid crystal film was 0.11.

Example 5

Preparation of Polymerizable Liquid Crystal Composition (5)

A polymerizable liquid crystal composition (5) was prepared in the same manner as in Example 1 except that MIX 2 prepared in Example 2 was used, and a silicone nonionic surfactant (BYK-315, a trade name, available from BYK Chemie Co., Ltd.) was added in a weight ratio of 0.002 to MIX 2. A liquid crystal film was produced in the same manner as in Example 1 except that the polymerizable liquid crystal composition (5) was used, and the liquid crystal film had a uniform homogeneous alignment without alignment defect. The measurement of retardation of the film revealed a homogeneous alignment having the same tendency as in FIG. 1. The birefringence Δn of the liquid crystal film was 0.15.

Example 6

Preparation of Polymerizable Liquid Crystal Composition (6)

A polymerizable liquid crystal composition (6) was prepared in the same manner as in Example 1 except that MIX 2 prepared in Example 2 was used, and a hydrocarbon nonionic surfactant (Polyflow No. 75, a trade name, available from Kyoeisha Chemical Co., Ltd.) was added in a weight ratio of 0.004 to MIX 2. A liquid crystal film was produced in the same manner as in Example 1 except that the polymerizable liquid crystal composition (6) was used, and the liquid crystal film had a uniform homogeneous alignment without alignment defect. The measurement of retardation of the film revealed a homogeneous alignment having the same tendency as in FIG. 1. The birefringence Δn of the liquid crystal film was 0.15.

Example 7

Preparation of Polymerizable Liquid Crystal Composition (7)

The compounds (1-1-A2), (2-1-D2), (3-1-A3) and (3-1-F1) were mixed at a ratio (1-1-A2)/(2-1-D2)/(3-1-A3)/(3-1-F1)=35/2/28/35 by weight. The resulting mixture was designated as MIX 7. A fluorine nonionic surfactant (Ftergent FTX-218, available from Neos Co., Ltd.) in a weight ratio of 0.02, a polymerization initiator (Irgacure 907) in a weight ratio of 0.03 and a polymerization initiator (Irgacure 369) in a weight ratio of 0.03 were added to MIX 1. A mixed solvent of cyclopentanone and PGMEA (cyclopentanone/PGMEA=1/1 by weight) was added to the resulting composition to prepare a polymerizable liquid crystal composition (7) having a solvent ratio of 80% by weight.

Polyamic acid for a low pre-tilt angle (horizontal alignment mode) (Lixon Aligner PIA-5370, available from Chisso Corporation) was coated on a glass substrate (S-1112, available from Matsunami Glass Industries, Ltd.), and after drying at 80° C. for 3 minutes, the coated film was baked at 210° C. for 30 minutes, and then subjected to a rubbing treatment. The polymerizable liquid crystal composition (7) was coated by a spin coating method on the glass substrate having the rubbed polyamic acid film. The substrate was heated to 80° C. for 3 minutes and cooled at room temperature for 3 minutes, and the coated film, from which the solvent was removed, was polymerized with an ultraviolet ray under an air atmosphere to provide a liquid crystal film. The observation of the liquid crystal film revealed that the liquid crystal film had a uniform alignment without alignment defect. The measurement of retardation of the film revealed a homogeneous alignment having the same tendency as in FIG. 1. The birefringence Δn of the liquid crystal film was 0.13.

Example 8

Preparation of Polymerizable Liquid Crystal Composition (8)

A polymerizable liquid crystal composition (8) was prepared in the same manner as in Example 7 except that the compounds (1-1-A2), (2-1-D2) and (3-1-A3) were mixed at a ratio (1-1-A2)/(2-1-D2)/(3-1-A3)=40/10/50 by weight to prepare MIX 8. A liquid crystal film was produced in the same manner as in Example 7 except that the polymerizable liquid crystal composition (8) was used, and the liquid crystal film had a uniform homogeneous alignment without alignment defect. The measurement of retardation of the film revealed a homogeneous alignment having the same tendency as in FIG. 1. The birefringence Δn of the liquid crystal film was 0.12.

Example 9

Preparation of Polymerizable Liquid Crystal Composition (9)

A polymerizable liquid crystal composition (9) was prepared in the same manner as in Example 7 except that the compounds (1-1-A2), (2-1-D2), (3-1-A3) and (3-1-F1) were mixed at a ratio (1-1-A2)/(2-1-D2)/(3-1-A3)/(3-1-F1)=40/2/28/30 by weight to prepare MIX 9. A liquid crystal film was produced in the same manner as in Example 7 except that the polymerizable liquid crystal composition (9) was used, and the liquid crystal film had a uniform homogeneous alignment without alignment defect. The measurement of retardation of the film revealed a homogeneous alignment having the same tendency as in FIG. 1. The birefringence Δn of the liquid crystal film was 0.12.

Example 10

Preparation of Polymerizable Liquid Crystal Composition (10)

A polymerizable liquid crystal composition (10) was prepared in the same manner as in Example 7 except that the compounds (1-1-A2), (2-1-A2) and (3-1-A3) were mixed at a ratio (1-1-A2)/(2-1-A2)/(3-1-A3)=40/10/50 by weight to prepare MIX 10. A liquid crystal film was produced in the same manner as in Example 7 except that the polymerizable liquid crystal composition (10) was used, and the liquid crystal film had a uniform homogeneous alignment without alignment defect. The measurement of retardation of the film revealed a homogeneous alignment having the same tendency as in FIG. 1. The birefringence Δn of the liquid crystal film was 0.13.

Example 11

Preparation of Polymerizable Liquid Crystal Composition

A polymerizable liquid crystal composition (11) was prepared in the same manner as in Example 7 except that the compounds (1-1-A2), (2-1-A2) and (3-2-C2) were mixed at a ratio (1-1-A2)/(2-1-A2)/(3-2-C2)=35/5/60 by weight to prepare MIX 11. A liquid crystal film was produced in the same manner as in Example 7 except that the polymerizable liquid crystal composition (11) was used, and the liquid crystal film had a uniform homogeneous alignment without alignment defect. The measurement of retardation of the film revealed a homogeneous alignment having the same tendency as in FIG. 1. The birefringence Δn of the liquid crystal film was 0.12.

Example 12

Preparation of Polymerizable Liquid Crystal Composition (12)

A polymerizable liquid crystal composition (12) was prepared in the same manner as in Example 7 except that the compounds (1-1-A2), (2-1-A2) and (3-2-D1) were mixed at a ratio (1-1-A2)/(2-1-A2)/(3-2-D1)=35/5/60 by weight to prepare MIX 12. A liquid crystal film was produced in the same manner as in Example 7 except that the polymerizable liquid crystal composition (12) was used, and the liquid crystal film had a uniform homogeneous alignment without alignment defect. The measurement of retardation of the film revealed a homogeneous alignment having the same tendency as in FIG. 1. The birefringence Δn of the liquid crystal film was 0.10.

Example 13

Preparation of Polymerizable Liquid Crystal Composition (13)

A polymerizable liquid crystal composition (13) was prepared in the same manner as in Example 7 except that the compounds (1-1-A2), (2-1-D2) and (3-2-C2) were mixed at a ratio (1-1-A2)/(2-1-D2)/(3-2-C2)=40/2/58 by weight to prepare MIX 13. A liquid crystal film was produced in the same manner as in Example 7 except that the polymerizable liquid crystal composition (13) was used, and the liquid crystal film had a uniform homogeneous alignment without alignment defect. The measurement of retardation of the film revealed a homogeneous alignment having the same tendency as in FIG. 1. The birefringence Δn of the liquid crystal film was 0.13.

Example 14

Preparation of Polymerizable Liquid Crystal Composition (14)

A polymerizable liquid crystal composition (14) was prepared in the same manner as in Example 7 except that the compounds (1-1-A2), (2-1-D2), (3-1-A1) and (3-2-C2) were mixed at a ratio (1-1-A2)/(2-1-D2)/(3-1-A1)/(3-2-C2)=40/2/10/48 by weight to prepare MIX 14. A liquid crystal film was produced in the same manner as in Example 7 except that the polymerizable liquid crystal composition (14) was used, and the liquid crystal film had a uniform homogeneous alignment without alignment defect. The measurement of retardation of the film revealed a homogeneous alignment having the same tendency as in FIG. 1. The birefringence Δn of the liquid crystal film was 0.12.

Example 15

Preparation of Polymerizable Liquid Crystal Composition (15)

A polymerizable liquid crystal composition (15) was prepared in the same manner as in Example 7 except that the compounds (1-1-A2), (2-1-G2), (4-1-E1) and (4-1-K2) were mixed at a ratio (1-1-A2)/(2-1-G2)/(4-1-E1)/(4-1-K2)=30/2/34/34 by weight to prepare MIX 15. A liquid crystal film was produced in the same manner as in Example 7 except that the polymerizable liquid crystal composition (15) was used, and the liquid crystal film had a uniform homogeneous alignment without alignment defect. The measurement of retardation of the film revealed a homogeneous alignment having the same tendency as in FIG. 1. The birefringence Δn of the liquid crystal film was 0.13.

Example 16

Preparation of Polymerizable Liquid Crystal Composition (16)

A polymerizable liquid crystal composition (16) was prepared in the same manner as in Example 7 except that the compounds (1-1-A2), (2-1-D2), (3-2-C2), (4-1-M2-1) and (4-1-M2-2) were mixed at a ratio (1-1-A2)/(2-1-D2)/(3-2-C2)/(4-1-M2-1)/(4-1-M2-2)=30/2/10/29/29 by weight to prepare MIX 16, and the solvent was a mixed solvent of cyclohexanone and PGMEA (cyclohexanone/PGMEA=9/1 by weight). A liquid crystal film was produced in the same manner as in Example 7 except that the polymerizable liquid crystal composition (16) was used, and the liquid crystal film had a uniform homogeneous alignment without alignment defect. The measurement of retardation of the film revealed a homogeneous alignment having the same tendency as in FIG. 1. The birefringence Δn of the liquid crystal film was 0.12.

Example 17

Preparation of Polymerizable Liquid Crystal Composition (17)

A polymerizable liquid crystal composition (17) was prepared in the same manner as in Example 7 except that the compounds (1-1-A2), (2-1-D2), (3-2-C2), (3-2-C14) and (4-1-M2-2) were mixed at a ratio (1-1-A2)/(2-1-D2)/(3-2-C2)/(3-2-C14)/(4-1-M2-2)=30/2/20/23/25 by weight to prepare MIX 17, and the solvent was a mixed solvent of cyclohexanone and PGMEA (cyclohexanone/PGMEA=9/1 by weight). A liquid crystal film was produced in the same manner as in Example 7 except that the polymerizable liquid crystal composition (17) was used, and the liquid crystal film had a uniform homogeneous alignment without alignment defect. The measurement of retardation of the film revealed a homogeneous alignment having the same tendency as in FIG. 1. The birefringence Δn of the liquid crystal film was 0.12.

Example 18

Preparation of Polymerizable Liquid Crystal Composition (18)

A polymerizable liquid crystal composition (18) was prepared in the same manner as in Example 7 except that the compounds (1-1-A2), (2-1-D2), (3-2-C2), (3-2-C14) and (4-1-M2-2) were mixed at a ratio (1-1-A2)/(2-1-D2)/(3-2-C2)/(4-1-M2-2)=40/2/28/30 by weight to prepare MIX 18, and the solvent was a mixed solvent of cyclohexanone and PGMEA (cyclohexanone/PGMEA=9/1 by weight). A liquid crystal film was produced in the same manner as in Example 7 except that the polymerizable liquid crystal composition (18) was used, and the liquid crystal film had a uniform homogeneous alignment without alignment defect. The measurement of retardation of the film revealed a homogeneous alignment having the same tendency as in FIG. 1. The birefringence Δn of the liquid crystal film was 0.12.

Example 19

Preparation of Polymerizable Liquid Crystal Composition (19)

A polymerizable liquid crystal composition (19) was prepared in the same manner as in Example 7 except that the compounds (1-1-A2), (2-1-D2), (3-2-C2) and (4-1-M2-2) were mixed at a ratio (1-1-A2)/(2-1-D2)/(3-2-C2)/(4-1-M2-2)=32/10/28/30 by weight to prepare MIX 19, and the solvent was a mixed solvent of cyclohexanone and PGMEA (cyclohexanone/PGMEA=9/1 by weight). A liquid crystal film was produced in the same manner as in Example 7 except that the polymerizable liquid crystal composition (19) was used, and the liquid crystal film had a uniform homogeneous alignment without alignment defect. The measurement of retardation of the film revealed a homogeneous alignment having the same tendency as in FIG. 1. The birefringence Δn of the liquid crystal film was 0.10.

Comparative Example 1

Preparation of Polymerizable Liquid Crystal Composition (A)

A polymerizable liquid crystal composition (A) was prepared in the same manner as in Example 1 except that only a polymerization initiator (Irgacure 907) in a weight ratio of 0.03 was added to MIX 1 in Example 1. A liquid crystal film was produced in the same manner as in Example 1 except that the polymerizable liquid crystal composition (A) was used, and it was confirmed that the liquid crystal film had defects derived from a nonuniform tilted alignment, and had a white turbid appearance.

Comparative Example 2

Preparation of Polymerizable Liquid Crystal Composition (B)

A polymerizable liquid crystal composition (B) was prepared in the same manner as in Example 1 except that only a polymerization initiator (Irgacure 907) in a weight ratio of 0.03 was added to MIX 2 in Example 2. A liquid crystal film was produced in the same manner as in Example 1 except that the polymerizable liquid crystal composition (B) was used, and it was confirmed that the liquid crystal film had defects derived from a nonuniform tilted alignment, and had a white turbid appearance.

Comparative Example 3

Preparation of Polymerizable Liquid Crystal Composition (C)

A polymerizable liquid crystal composition (C) was prepared in the same manner as in Example 1 except that only a polymerization initiator (Irgacure 907) in a weight ratio of 0.03 was added to MIX 3 in Example 3. A liquid crystal film was produced in the same manner as in Example 1 except that the polymerizable liquid crystal composition (C) was used, and it was confirmed that the liquid crystal film had defects derived from a nonuniform tilted alignment, and had a white turbid appearance.

Comparative Example 4

Preparation of Polymerizable Liquid Crystal Composition (D)

A polymerizable liquid crystal composition (D) was prepared in the same manner as in Example 1 except that only a polymerization initiator (Irgacure 907) in a weight ratio of 0.03 was added to MIX 4 in Example 4. A liquid crystal film was produced in the same manner as in Example 1 except that the polymerizable liquid crystal composition (D) was used, and it was confirmed that the liquid crystal film had defects derived from a nonuniform tilted alignment, and had a white turbid appearance.

Comparative Example 5

Preparation of Polymerizable Liquid Crystal Composition (E)

A polymerizable liquid crystal composition (E) was prepared in the same manner as in Example 7 except that only a polymerization initiator (Irgacure 907) in a weight ratio of 0.03 and a polymerization initiator (Irgacure 369) in a weight ratio of 0.03 were added to MIX 7 in Example 7. A liquid crystal film was produced in the same manner as in Example 7 except that the polymerizable liquid crystal composition (E) was used, and it was confirmed that the liquid crystal film had defects derived from a nonuniform tilted alignment, and had a white turbid appearance.

Comparative Example 6

Preparation of Polymerizable Liquid Crystal Composition (F)

A polymerizable liquid crystal composition (F) was prepared in the same manner as in Example 8 except that only a polymerization initiator (Irgacure 907) in a weight ratio of 0.03 and a polymerization initiator (Irgacure 369) in a weight ratio of 0.03 were added to MIX 8 in Example 8. A liquid crystal film was produced in the same manner as in Example 7 except that the polymerizable liquid crystal composition (F) was used, and it was confirmed that the liquid crystal film had defects derived from a nonuniform tilted alignment, and had a white turbid appearance.

Comparative Example 7

Preparation of Polymerizable Liquid Crystal Composition (G)

A polymerizable liquid crystal composition (G) was prepared in the same manner as in Example 9 except that only a polymerization initiator (Irgacure 907) in a weight ratio of 0.03 and a polymerization initiator (Irgacure 369) in a weight ratio of 0.03 were added to MIX 9 in Example 9. A liquid crystal film was produced in the same manner as in Example 7 except that the polymerizable liquid crystal composition (G) was used, and it was confirmed that the liquid crystal film had defects derived from a nonuniform tilted alignment, and had a white turbid appearance.

Comparative Example 8

Preparation of Polymerizable Liquid Crystal Composition (H)

A polymerizable liquid crystal composition (H) was prepared in the same manner as in Example 10 except that only a polymerization initiator (Irgacure 907) in a weight ratio of 0.03 and a polymerization initiator (Irgacure 369) in a weight ratio of 0.03 were added to MIX 10 in Example 10. A liquid crystal film was produced in the same manner as in Example 7 except that the polymerizable liquid crystal composition (H) was used, and it was confirmed that the liquid crystal film had defects derived from a nonuniform tilted alignment, and had a white turbid appearance.

Comparative Example 9

Preparation of Polymerizable Liquid Crystal Composition (I)

A polymerizable liquid crystal composition (I) was prepared in the same manner as in Example 11 except that only a polymerization initiator (Irgacure 907) in a weight ratio of 0.03 and a polymerization initiator (Irgacure 369) in a weight ratio of 0.03 were added to MIX 11 in Example 11. A liquid crystal film was produced in the same manner as in Example 7 except that the polymerizable liquid crystal composition (I) was used, and it was confirmed that the liquid crystal film had defects derived from a nonuniform tilted alignment, and had a white turbid appearance.

Comparative Example 10

Preparation of Polymerizable Liquid Crystal Composition (J)

A polymerizable liquid crystal composition (J) was prepared in the same manner as in Example 12 except that only a polymerization initiator (Irgacure 907) in a weight ratio of 0.03 and a polymerization initiator (Irgacure 369) in a weight ratio of 0.03 were added to MIX 12 in Example 12. A liquid crystal film was produced in the same manner as in Example 7 except that the polymerizable liquid crystal composition (J) was used, and it was confirmed that the liquid crystal film had defects derived from a nonuniform tilted alignment, and had a white turbid appearance.

Comparative Example 11

Preparation of Polymerizable Liquid Crystal Composition (K)

A polymerizable liquid crystal composition (K) was prepared in the same manner as in Example 13 except that only a polymerization initiator (Irgacure 907) in a weight ratio of 0.03 and a polymerization initiator (Irgacure 369) in a weight ratio of 0.03 were added to MIX 13 in Example 13. A liquid crystal film was produced in the same manner as in Example 7 except that the polymerizable liquid crystal composition (K) was used, and it was confirmed that the liquid crystal film had defects derived from a nonuniform tilted alignment, and had a white turbid appearance.

Comparative Example 12

Preparation of Polymerizable Liquid Crystal Composition (L)

A polymerizable liquid crystal composition (L) was prepared in the same manner as in Example 14 except that only a polymerization initiator (Irgacure 907) in a weight ratio of 0.03 and a polymerization initiator (Irgacure 369) in a weight ratio of 0.03 were added to MIX 14 in Example 14. A liquid crystal film was produced in the same manner as in Example 7 except that the polymerizable liquid crystal composition (L) was used, and it was confirmed that the liquid crystal film had defects derived from a nonuniform tilted alignment, and had a white turbid appearance.

Comparative Example 13

Preparation of Polymerizable Liquid Crystal Composition (M)

A polymerizable liquid crystal composition (M) was prepared in the same manner as in Example 15 except that only a polymerization initiator (Irgacure 907) in a weight ratio of 0.03 and a polymerization initiator (Irgacure 369) in a weight ratio of 0.03 were added to MIX 15 in Example 15. A liquid crystal film was produced in the same manner as in Example 7 except that the polymerizable liquid crystal composition (M) was used, and it was confirmed that the liquid crystal film had defects derived from a nonuniform tilted alignment, and had a white turbid appearance.

Comparative Example 14

Preparation of Polymerizable Liquid Crystal Composition (N)

A polymerizable liquid crystal composition (N) was prepared in the same manner as in Example 16 except that only a polymerization initiator (Irgacure 907) in a weight ratio of 0.03 and a polymerization initiator (Irgacure 369) in a weight ratio of 0.03 were added to MIX 16 in Example 16. A liquid crystal film was produced in the same manner as in Example 7 except that the polymerizable liquid crystal composition (N) was used, and it was confirmed that the liquid crystal film had defects derived from a nonuniform tilted alignment, and had a white turbid appearance.

Comparative Example 15

Preparation of Polymerizable Liquid Crystal Composition (O)

A polymerizable liquid crystal composition (O) was prepared in the same manner as in Example 17 except that only a polymerization initiator (Irgacure 907) in a weight ratio of 0.03 and a polymerization initiator (Irgacure 369) in a weight ratio of 0.03 were added to MIX 17 in Example 17. A liquid crystal film was produced in the same manner as in Example 7 except that the polymerizable liquid crystal composition (O) was used, and it was confirmed that the liquid crystal film had defects derived from a nonuniform tilted alignment, and had a white turbid appearance.

Comparative Example 16

Preparation of Polymerizable Liquid Crystal Composition (P)

A polymerizable liquid crystal composition (P) was prepared in the same manner as in Example 18 except that only a polymerization initiator (Irgacure 907) in a weight ratio of 0.03 and a polymerization initiator (Irgacure 369) in a weight ratio of 0.03 were added to MIX 18 in Example 18. A liquid crystal film was produced in the same manner as in Example 7 except that the polymerizable liquid crystal composition (P) was used, and it was confirmed that the liquid crystal film had defects derived from a nonuniform tilted alignment, and had a white turbid appearance.

Comparative Example 17

Preparation of Polymerizable Liquid Crystal Composition (O)

A polymerizable liquid crystal composition (O) was prepared in the same manner as in Example 19 except that only a polymerization initiator (Irgacure 907) in a weight ratio of 0.03 and a polymerization initiator (Irgacure 369) in a weight ratio of 0.03 were added to MIX 19 in Example 19. A liquid crystal film was produced in the same manner as in Example 7 except that the polymerizable liquid crystal composition (O) was used, and it was confirmed that the liquid crystal film had defects derived from a nonuniform tilted alignment, and had a white turbid appearance.

It is understood from the results of Examples and Comparative Examples that the liquid crystal films obtained from the polymerizable liquid crystal compositions of the invention show a uniform homogeneous alignment.

According to the invention, a polymerizable liquid crystal composition containing a combination of a triptycene derivative, a polymerizable compound having a bisphenol skeleton, and a nonionic surfactant provides a liquid crystal film exhibiting a uniform homogeneous alignment, and the birefringence thereof can be controlled.

The invention claimed is:

1. A polymerizable liquid crystal composition comprising a mixture of polymerizable compounds containing at least one compound selected from a group of compounds represented by the formula (1-1) as a component A, at least one compound selected from a group of compounds represented by the formula (2-1) as a component B, at least one compound selected from a group of compounds represented by the formulae (3-2) and (3-3) as a component C and optionally at least one compound selected from a group of compounds represented by the formula (4-1) as a component D, and at least a nonionic surfactant as a component E, wherein a birefringence (Δn) of a liquid crystal film obtained by polymerizing the polymerizable liquid crystal composition is in a range of 0.10 to 0.13:

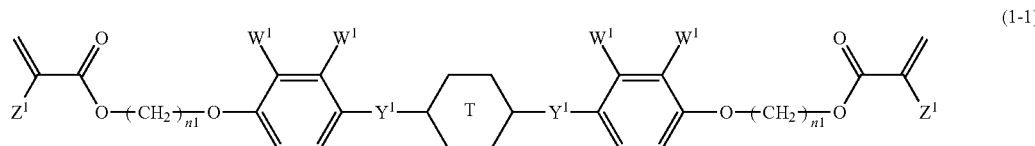
(1-1)

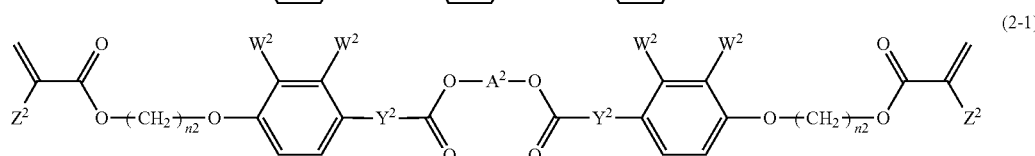
(2-1)

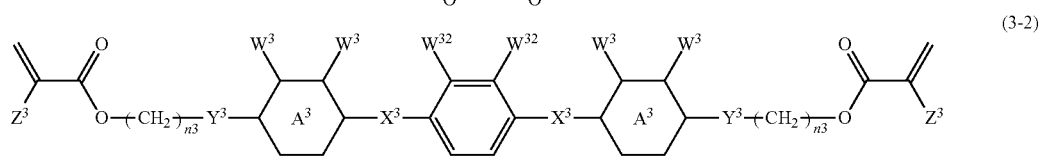
(3-2)

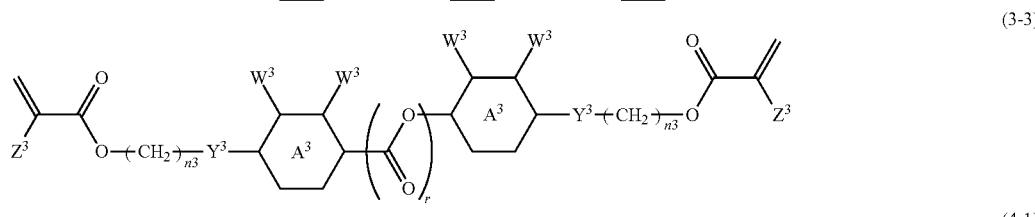
(3-3)

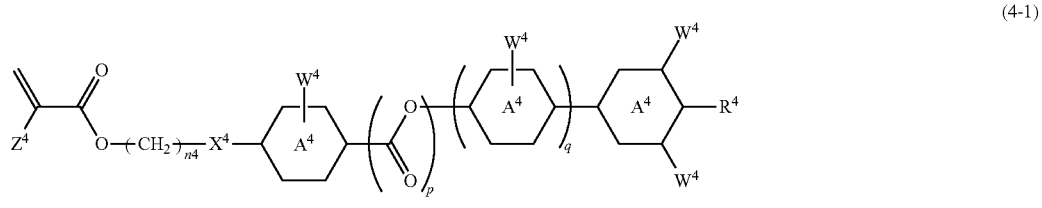
(4-1)

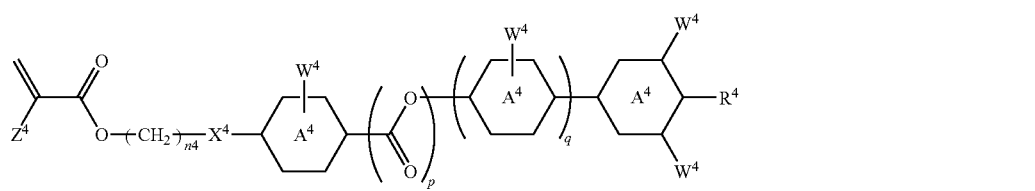
(4-1)

wherein
in the formula (1-1),
ring T represents triptycen-1,4-diyl; $Z^1$ independently represents hydrogen, fluorine, chlorine, methyl or trifluoromethyl; $W^1$ independently represents hydrogen, halogen, alkyl having from 1 to 3 carbon atoms or fluoroalkyl having from 1 to 3 carbon atoms; $Y^1$ independently represents a single bond, —COO—, —OCO—, —CH=CH—COO—, —OCO—CH=CH—, —(CH$_2$)$_2$—COO— or —OCO—(CH$_2$)$_2$—; and n1 independently represents an integer of from 2 to 15, in the formula (2-1),
$Z^2$ independently represents hydrogen, fluorine, methyl or trifluoromethyl; $W^2$ independently represents hydrogen, halogen, alkyl having from 1 to 3 carbon atoms or fluoroalkyl having from 1 to 3 carbon atoms; $Y^2$ independently represents a single bond, —CH=CH— or —(CH$_2$)$_2$—; and n2 independently represents an integer of from 2 to 15, in the formulae (3-2) and (3-3), $Z^3$ independently represents hydrogen, fluorine, methyl or trifluoromethyl; $W^3$ independently represents hydrogen, halogen, alkyl having from 1 to 3 carbon atoms or fluoroalkyl having from 1 to 3 carbon atoms; $W^{32}$ independently represents hydrogen, halogen, alkyl having from 1 to 8 carbon atoms or fluoroalkyl having from 1 to 8 carbon atoms; ring $A^3$ independently represents 1,4-phenylene or 1,4-cyclohexylene; $X^3$ independently represents a single bond, —COO—, —OCO—, —CH=CH—COO—, —OCO—CH=CH—, —(CH$_2$)$_2$—COO—, —OCO—(CH$_2$)$_2$—, —(CH$_2$)$_2$—, —C≡C—, —CH$_2$O— or —OCH$_2$—; $Y^3$ independently represents a single bond, alkylene having from 1 to 20 carbon atoms, —O—, —COO—, —OCO— or —OCOO—; r represents 0 or 1; and n3 independently represents an integer of from 0 to 20, provided that when n3 is 0, $Y^3$ represents a single bond or alkylene having from 1 to 20 carbon atoms, in the formula (4-1),
Z$^4$ represents hydrogen, fluorine, methyl or trifluoromethyl; W$^4$ independently represents hydrogen, halogen, alkyl having from 1 to 3 carbon atoms or fluoroalkyl having from 1 to 3 carbon atoms; X$^4$ represents a single bond, —O—, alkylene having from 1 to 20 carbon atoms, —COO— or —OCO—; ring A$^4$ independently represents 1,4-phenylene or 1,4-cyclohexylene; R$^4$ represents hydrogen, fluorine, chlorine, cyano, alkyl having from 1 to 20 carbon atoms or alkoxy having from 1 to 20 carbon atoms, in which in the alkyl and the alkoxy, arbitrary hydrogen may be replaced by halogen; n4 represents an integer of from 0 to 20; and p and q each independently represent 0 or 1, provided that when n4 is 0, X$^4$ represents a single bond or alkylene having from 1 to 20 carbon atoms, and in the formula (2-1),
A$^2$ represents a divalent group represented by one of the formulae (A2-10), (A2-11) and (A2-16)

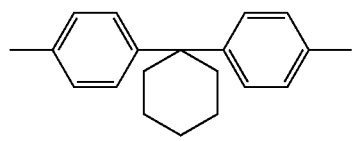

(A2-10)

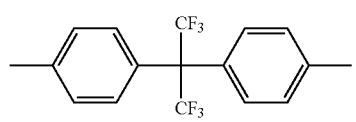

(A2-11)

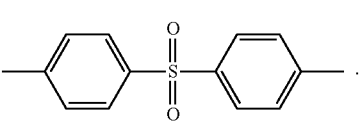

(A2-16)

2. The polymerizable liquid crystal composition according to claim 1, wherein:
in the formula (1-1),
ring T represents triptycen-1,4-diyl; Z$^1$ independently represents hydrogen, fluorine, methyl or trifluoromethyl; W$^1$ independently represents hydrogen, fluorine, methyl or trifluoromethyl; Y$^1$ independently represents —COO—, —OCO—, —CH=CH—COO—, —OCO—CH=CH—, —(CH$_2$)$_2$—COO— or —OCO—(CH$_2$)$_2$—; and n1 independently represents an integer of from 2 to 10,
in the formula (2-1),
A$^2$ represents a divalent group represented by one of the formulae (A2-10), (A2-11) and (A2-16); Z$^2$ independently represents hydrogen, fluorine, methyl or trifluoromethyl; W$^2$ independently represents hydrogen or fluorine; Y$^2$ independently represents a single bond, —CH=CH— or —(CH$_2$)$_2$—; and n2 independently represents an integer of from 2 to 10,
in the formulae (3-2) and (3-3),
Z$^3$ independently represents hydrogen, fluorine, methyl or trifluoromethyl; W$^3$ independently represents hydrogen, fluorine, methyl or trifluoromethyl; W$^{32}$ independently represents hydrogen, methyl, isopropyl, tert-butyl or trifluoromethyl; ring A$^3$ independently represents 1,4-phenylene or 1,4-cyclohexylene; X$^3$ independently represents a single bond, —COO—, —OCO—, —CH=CH—COO—, —OCO—CH=CH—, —(CH$_2$)$_2$—COO— or —OCO—(CH$_2$)$_2$—; Y$^3$ independently represents a single bond, —O—, —COO—, —OCO— or —OCOO—; r represents 0 or 1; and n3 independently represents an integer of from 2 to 12,
in the formula (4-1),
Z$^4$ represents hydrogen, fluorine, methyl or trifluoromethyl; W$^4$ independently represents hydrogen, fluorine, methyl or trifluoromethyl; X$^4$ represents a single bond or —O—; ring A$^4$ represents 1,4-phenylene or 1,4-cyclohexylene; R$^4$ represents cyano, fluorine, alkyl having from 1 to 10 carbon atoms or alkoxy having from 1 to 10 carbon atoms, in which in the alkyl and the alkoxy, arbitrary hydrogen may be replaced by halogen; n4 represents an integer of from 2 to 12; and p and q each independently represent 0 or 1,
a ratio of the component A is from 10 to 60% by weight, a ratio of the component B is from 1 to 20% by weight, a ratio of the component C is from 23 to 89% by weight, and a ratio of the component D is from 25 to 89% by weight, based on a total weight of the mixture of polymerizable compounds, and
a ratio of the component E is from 0.0001 to 0.03 in terms of weight ratio based on the mixture.

3. The polymerizable liquid crystal composition according to claim 1, wherein:
in the formula (1-1),
ring T represents triptycen-1,4-diyl; Z$^1$ independently represents hydrogen, fluorine, methyl or trifluoromethyl; W$^1$ independently represents hydrogen or fluorine; Y$^1$ independently represents —COO— or —OCO—; and n1 independently represents an integer of from 2 to 8,
in the formula (2-1),
A$^2$ represents a divalent group represented by one of the formulae (A2-10), (A2-11) and (A2-16); Z$^2$ independently represents hydrogen or methyl; W$^2$ independently represents hydrogen or fluorine; Y$^2$ independently represents a single bond, —CH=CH— or —(CH$_2$)$_2$—; and n2 independently represents an integer of from 2 to 8,
in the formulae (3-2) and (3-3),
Z$^3$ independently represents hydrogen or methyl; W$^3$ independently represents hydrogen, fluorine, methyl or trifluoromethyl; W$^{32}$ independently represents hydrogen, methyl, isopropyl, tert-butyl or trifluoromethyl; ring A$^3$ independently represents 1,4-phenylene or 1,4-cyclohexylene; X$^3$ independently represents —COO—, —OCO—, —CH=CH—COO—, —OCO—CH=CH—, —(CH$_2$)$_2$—COO— or —OCO—(CH$_2$)$_2$—; Y$_3$ independently represents a single bond, —O—, —COO—, —OCO— or —OCOO—; r represents 0 or 1; and n3 independently represents an integer of from 2 to 12,
in the formula (4-1),
Z$^4$ represents hydrogen or methyl; W$^4$ independently represents hydrogen, fluorine, methyl or trifluoromethyl; X$^4$ represents a single bond or —O—; ring A$^4$ represents 1,4-phenylene or 1,4-cyclohexylene; R$^4$ represents cyano, fluorine, alkyl having from 1 to 8 carbon atoms or alkoxy having from 1 to 8 carbon atoms, in which in the alkyl and the alkoxy, arbitrary hydrogen may be replaced by halogen; n4 represents an integer of from 2 to 12; and p and q each independently represent 0 or 1,
a ratio of the component A is from 15 to 55% by weight, a ratio of the component B is from 1 to 17% by weight, a ratio of the component C is from 23 to 84% by weight, and a ratio of the component D is from 25 to 84% by weight, based on a total weight of the mixture of polymerizable compounds, and a ratio of the component E is from 0.0003 to 0.02 in terms of weight ratio based on the mixture.

4. The polymerizable liquid crystal composition according to claim 1, wherein:
in the formula (1-1),
ring T represents triptycen-1,4-diyl; $Z^1$ represents hydrogen; $W^1$ independently represents hydrogen or fluorine; $Y^1$ independently represents —COO— or —OCO—; and n1 independently represents an integer of from 4 to 6,
in the formula (2-1),
$A^2$ represents a divalent group represented by one of the formulae (A2-10), (A2-11) and (A2-16); $Z^2$ represents hydrogen; $W^2$ independently represents hydrogen or fluorine; $Y^2$ independently represents a single bond, —CH═CH— or —(CH$_2$)$_2$—; and n2 independently represents an integer of from 4 to 6,
in the formulae (3-2) and (3-3),
$Z^3$ represents hydrogen; $W^3$ independently represents hydrogen, fluorine or methyl; $W^{32}$ independently represents hydrogen, methyl, isopropyl, tert-butyl or trifluoromethyl; ring $A^3$ represents 1,4-phenylene; $X^3$ independently represents —COO—, —OCO—, —CH═CH—COO—, —OCO—CH═CH—, —(CH$_2$)$_2$—COO— or —OCO—(CH$_2$)$_2$—; $Y^3$ independently represents a single bond or —O—; r represents 0 or 1; and n3 independently represents an integer of from 2 to 12,
in the formula (4-1),
$Z^4$ represents hydrogen; $W^4$ represents hydrogen; $X^4$ represents a single bond or —O—; ring $A^4$ represents 1,4-phenylene or 1,4-cyclohexylene; $R^4$ represents cyano, fluorine, alkyl having from 1 to 8 carbon atoms or alkoxy having from 1 to 8 carbon atoms; n4 represents an integer of from 2 to 10; and p and q each independently represent 0 or 1,
a ratio of the component A is from 20 to 50% by weight, a ratio of the component B is from 1 to 15% by weight, a ratio of the component C is from 23 to 79% by weight, and a ratio of the component D is from 25 to 79% by weight, based on a total weight of the mixture of polymerizable compounds, and
a ratio of the component E is from 0.0005 to 0.02 in terms of weight ratio based on the mixture.

5. The polymerizable liquid crystal composition according to claim 4, wherein:
a ratio of the component A is from 25 to 45% by weight, a ratio of the component B is from 1 to 13% by weight, a ratio of the component C is from 23 to 74% by weight, and a ratio of the component D is from 25 to 74% by weight, based on a total weight of the mixture of polymerizable compounds, and
a ratio of the component E is from 0.0005 to 0.01 in terms of weight ratio based on the mixture.

6. A polymerizable liquid crystal layer having a homogeneous alignment comprising the polymerizable liquid crystal composition according to claim 1 having been coated on a supporting substrate having been subjected to an alignment treatment.

7. The polymerizable liquid crystal layer according to claim 6, wherein the supporting substrate is a glass substrate.

8. The polymerizable liquid crystal layer according to claim 6, wherein the supporting substrate is a glass substrate having coated thereon a plastic thin film, or a plastic film substrate.

9. The polymerizable liquid crystal layer according to claim 6, wherein the supporting substrate is a glass substrate having coated thereon a plastic thin film having a surface subjected to a rubbing treatment, or a plastic film substrate having a surface subjected to a rubbing treatment.

10. The polymerizable liquid crystal layer according to claim 6, wherein the supporting substrate is a glass substrate having coated thereon a plastic thin film, or a plastic film substrate, and a surface of the substrate is subjected to a corona treatment or a plasma treatment, and is further subjected to a rubbing treatment.

11. The polymerizable liquid crystal layer according to claim 8, wherein a plastic material constituting the plastic thin film or the plastic film is one selected from the group consisting of polyimide, polyamideimide, polyamide, polyetherimide, polyetheretherketone, polyetherketone, polyketonesulfide, polyethersulfone, polysulfone, polyphenylene sulfide, polyphenylene oxide, polyethylene terephthalate, polybutylene terephthalate, polyethylene naphthalate, polyacetal, polycarbonate, polyarylate, an acrylic resin, polyvinyl alcohol, polypropylene, cellulose, triacetyl cellulose, a partially saponified product of triacetyl cellulose, an epoxy resin, a phenol resin and a cycloolefin resin.

12. The polymerizable liquid crystal layer according to claim 11, wherein a plastic material constituting the plastic thin film or the plastic film is one selected from the group consisting of polyimide, polyvinyl alcohol, triacetyl cellulose, a partially saponified product of triacetyl cellulose and a cycloolefin resin.

13. A homogeneous-aligned liquid crystal film obtained by polymerizing the polymerizable liquid crystal layer according to claim 6.

14. An optical compensation device comprising the liquid crystal film according to claim 13.

15. An optical device comprising the liquid crystal film according to claim 13 and a polarizing plate.

16. A liquid crystal display device comprising the optical compensation device according to claim 14 on an inner surface or an outer surface of a liquid crystal cell.

17. A liquid crystal display device comprising the optical device according to claim 15 on an outer surface of a liquid crystal cell.

* * * * *